US012270968B2

(12) United States Patent
Qiu et al.

(10) Patent No.: US 12,270,968 B2
(45) Date of Patent: *Apr. 8, 2025

(54) WEEKLY AND MONTHLY DISPOSABLE WATER GRADIENT CONTACT LENSES

(71) Applicant: Alcon Inc., Fribourg (CH)

(72) Inventors: Yongxing Qiu, Suwanee, GA (US); John Dallas Pruitt, Suwanee, GA (US); Newton T. Samuel, Suwanee, GA (US); Chung-Yuan Chiang, Johns Creek, GA (US); Robert Carey Tucker, Johns Creek, GA (US); Yuan Chang, Chicago, IL (US); Ethan Leveillee, Atlanta, GA (US)

(73) Assignee: Alcon Inc., Fribourg (CH)

(*) Notice: Subject to any disclaimer, the term of this patent is extended or adjusted under 35 U.S.C. 154(b) by 0 days.

This patent is subject to a terminal disclaimer.

(21) Appl. No.: 18/436,094

(22) Filed: Feb. 8, 2024

(65) Prior Publication Data

US 2024/0176047 A1    May 30, 2024

Related U.S. Application Data

(63) Continuation of application No. 17/572,794, filed on Jan. 11, 2022, now Pat. No. 11,933,941, which is a
(Continued)

(51) Int. Cl.
  *G02B 1/04* (2006.01)
  *B05D 5/00* (2006.01)
  (Continued)

(52) U.S. Cl.
  CPC .............. *G02B 1/043* (2013.01); *B05D 5/00* (2013.01); *B29D 11/00038* (2013.01);
  (Continued)

(58) Field of Classification Search
  CPC ............ B05D 3/002; B05D 3/00; B05D 3/02; B05D 1/38; B05D 1/18; B29D 11/00038;
  (Continued)

(56) References Cited

U.S. PATENT DOCUMENTS

2014/0275434 A1    9/2014  Mahadevan
2014/0349061 A1*  11/2014  Sikka ................. B29C 37/0032
                                                                 428/98

FOREIGN PATENT DOCUMENTS

TW         201500799 A        1/2015

OTHER PUBLICATIONS

Mechanical properties of contact lenses: The contribution of measurement techniques and clinical feedback to 50 years of materials development. Cont Lens Anterior Eye. Apr. 2017; 40(2):70-81 (Year: 2017).*

* cited by examiner

Primary Examiner — Travis S Fissel
(74) Attorney, Agent, or Firm — Jian Zhou

(57) ABSTRACT

The invention is related to contact lenses that not only comprise the much desired water gradient structural configurations, but also have a minimized uptakes of polycationic antimicrobials and a long-lasting surface hydrophilicity and wettability even after going through a 30-days lens care regime. Because of the water gradient structural configuration and a relatively-thick, extremely-soft and water-rich hydrogel surface layer, a contact lens of the invention can provide superior wearing comfort. Further, a contact lens of the invention is compatible with multipurpose lens care solutions present in the market and can endure the harsh lens care handling conditions (e.g., digital rubbings, accidental inversion of contact lenses, etc.) encountered in a daily lens care regime. As such, they are suitable to be used
(Continued)

as weekly- or monthly-disposable water gradient contact lenses.

24 Claims, 5 Drawing Sheets

Related U.S. Application Data continuation of application No. 16/204,641, filed on Nov. 29, 2018, now Pat. No. 11,256,003.

(60) Provisional application No. 62/598,028, filed on Dec. 13, 2017, provisional application No. 62/598,025, filed on Dec. 13, 2017, provisional application No. 62/598,029, filed on Dec. 13, 2017, provisional application No. 62/598,018, filed on Dec. 13, 2017.

(51) Int. Cl.
| | |
|---|---|
| *B29D 11/00* | (2006.01) |
| *B29K 105/00* | (2006.01) |
| *B65B 55/22* | (2006.01) |
| *C08L 33/02* | (2006.01) |
| *C08L 79/04* | (2006.01) |
| *C08L 83/04* | (2006.01) |
| *C09D 133/02* | (2006.01) |
| *G02B 1/18* | (2015.01) |
| *G02C 7/04* | (2006.01) |
| *B05D 1/18* | (2006.01) |
| *B05D 1/38* | (2006.01) |
| *B05D 3/00* | (2006.01) |
| *B05D 3/02* | (2006.01) |
| *B05D 5/10* | (2006.01) |
| *B29K 83/00* | (2006.01) |

(52) U.S. Cl.
CPC .. *B29D 11/00125* (2013.01); *B29D 11/00865* (2013.01); *B65B 55/22* (2013.01); *C08L 33/02* (2013.01); *C08L 79/04* (2013.01); *C08L 83/04* (2013.01); *C09D 133/02* (2013.01); *G02B 1/18* (2015.01); *G02C 7/049* (2013.01); *B05D 1/18* (2013.01); *B05D 1/38* (2013.01); *B05D 3/002* (2013.01); *B05D 3/02* (2013.01); *B05D 5/10* (2013.01); *B29K 2083/00* (2013.01); *B29K 2105/0061* (2013.01); *C08L 2201/10* (2013.01); *C08L 2201/54* (2013.01); *G02B 2207/109* (2013.01)

(58) Field of Classification Search
CPC ........ B29D 11/00865; B29D 11/00125; G02C 7/049; G02B 1/18; G02B 1/043; G02B 2207/109; B65B 55/22; C08L 33/02; C08L 2201/51; C08L 2201/10; C09D 133/02; B29K 2207/109
USPC ............. 351/159.33, 159.02, 159.73, 159.74
See application file for complete search history.

WEEKLY AND MONTHLY DISPOSABLE WATER GRADIENT CONTACT LENSES

This application is a continuation of application Ser. No. 17/572,794 filed 11 Jan. 2022, which is a continuation of application Ser. No. 16/204,641 filed 29 Nov. 2018, now U.S. Pat. No. 11,256,003, which claims the benefit under 35 USC § 119 (e) of U.S. provisional application Nos. 62/598,018, 62/598,025, 62/598,028, 62/598,029, all filed on 13 Dec. 2017, incorporated by references in their entireties.

The present invention generally relates to weekly- or monthly-disposable water gradient contact lenses, in particular silicone hydrogel contact lenses, having a durable, water-rich, soft, digital-rubbing-resistant, and relatively-thick hydrogel coating thereon and having a relative high resistance to uptakes of polycationic antimicrobials.

BACKGROUND

A new class of soft contact lenses, water gradient silicone hydrogel contact lenses, have been developed and successfully introduced as daily-disposable contact lenses, DAILIES® TOTAL1® (Alcon), in the market. This new class of silicone hydrogel contact lenses is characterized by having a water-gradient structural configuration, an increase from 33% to over 80% water content from core to surface (see, U.S. Pat. No. 8,480,227). This unique design can deliver a highly-lubricious and extremely-soft, water-rich lens surface that in turn provide superior wearing comfort to patients.

Such soft contact lenses can be produced according to a cost-effective approach that is described in U.S. Pat. No. 8,529,057. Water gradient silicone hydrogel contact lenses can be produced by forming an anchoring layer on each contact lens by dipping the contact lenses in a coating solution of a polyanionic polymer and then covalently attaching a water-soluble highly-branched hydrophilic polymeric material onto the anchoring layer directly in a lens package during autoclave. The water-soluble highly-branched hydrophilic polymeric material is prepared by partially reacting a polyamidoamine-epichlorohydrin (PAE) with a wetting agent, at various concentration ratio of PAE to the wetting agent and at a reaction temperature for a given reaction time, to achieve a desired lubricity of the surface gels while minimizing or eliminating surface defects (e.g., surface cracking, etc.).

Although the newly-developed water-gradient silicone hydrogel contact lenses can provide superior wearing comfort to patients due to their extremely-soft, water-rich and relatively-thick hydrogel coatings, they may not be compatible with all lens care solutions in the market. For instance, these new contact lenses may not be compatible with some multipurpose lens care solutions existed in the market, because they are likely to uptake (absorb) a significant amount of polycationic antimicrobials (e.g., polyhexamethylene biguanide, Polyquaternium-1 (aka Polyquad®), or the like, which are commonly found in most multipurpose lens care solutions), due to the presence of the anchoring layer of a polyanionic material. Those polycationic antimicrobials adsorbed by the contact lenses may be released into the eye and may cause undesirable clinical symptoms in some persons, such as diffuse corneal staining and product intolerance, when the lenses are worn by patients. Because of the incompatibility with some multipurpose lens care solutions, the newly-developed water gradient silicone hydrogel contact lenses may not be suitable to be used as weekly or monthly disposable contact lenses which must be cleaned and disinfected almost on the daily basis with a lens care solution.

U.S. Pat. App. Nos. 2015/0166205A1 and 2016/0326046A1 discloses approaches for reducing water gradient contact lenses' susceptibility to deposition and accumulation of polycationic antimicrobials by adding one step involving use of a polyamidoamine-epichlorohydrin (PAE). However, there are some disadvantages associated with those approaches. For example, although the susceptibility to deposition and accumulation of polycationic antimicrobials of a contact lens with a hydrogel coating can be reduced according to those approaches, the lubricity, wettability and/or hydrophilicity of the resultant contact lens will be reduced simultaneously and the reduction in deposition and accumulation of polycationic antimicrobials may not be sufficient to render the contact lenses compatible with all multipurpose lens care solutions in the market. Further, the contact lenses obtained according to those approaches may not be able to survive digital rubbings required in the lens care regimes involving a multipurpose lens care solution or accidental lens inversion during lens manufacturing or handling, because the digital rubbings of the contact lenses and lens inversion can cause damages to the hydrogel coating on the contact lenses as evidenced by cracking lines visible under dark field after the contact lens is inversed or rubbed between fingers.

Therefore, there is still a need for weekly or monthly disposable water gradient contact lenses which are compatible with all lens care solution including multipurpose lens care solutions while having a high resistance to digital rubbings.

SUMMARY OF THE INVENTION

The invention provides, in some aspects, contact lenses that not only comprise the much desired water gradient structural configurations but also have a polyquaternium-1 uptake ("PU") of about 0.4 micrograms/lens or less and a long-lasting surface hydrophilicity and wettability as characterized by having a water-break-up time (WBUT) of at least 10 seconds after 30 cycles of digital rubbing treatment (i.e., simulating a 30 days of lens care regime) or after simulated abrasion cycling treatment. Because a contact lens of the invention has the desired water gradient structural configuration and a relatively-thick, extremely-soft and water-rich hydrogel surface layer, it can provide superior wearing comfort. More importantly, water gradient contact lenses of the invention are compatible with multipurpose lens care solutions present in the market and can endure the harsh lens care handling conditions (e.g., digital rubbings, accidental inversion of contact lenses, etc.) encountered in a daily lens care regime. As such, they are suitable to be used as weekly- or monthly-disposable contact lenses.

The invention provides, in other aspects, contact lenses that not only comprise an outer surface layer with a desired softness but also have a polyquaternium-1 uptake ("PU") of about 0.4 micrograms/lens or less and a long-lasting surface hydrophilicity and wettability as characterized by having a water-break-up time (WBUT) of at least 10 seconds after 30 cycles of digital rubbing treatment (i.e., simulating a 30 days of lens care regime). Because a contact lens of the invention has a relatively-thick, extremely-soft surface layer, it can provide superior wearing comfort. More importantly, contact lenses of the invention are compatible with multipurpose lens care solutions present in the market and can endure the harsh lens care handling conditions (e.g., digital rubbings, accidental inversion of contact lenses, etc.) encountered in a daily lens care regime. As such, they are suitable to be used as weekly- or monthly-disposable contact lenses.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effectuated without departing from the spirit and scope of the novel concepts of the disclosure.

DETAILED DESCRIPTION OF EMBODIMENTS OF THE INVENTION

Figure 1:
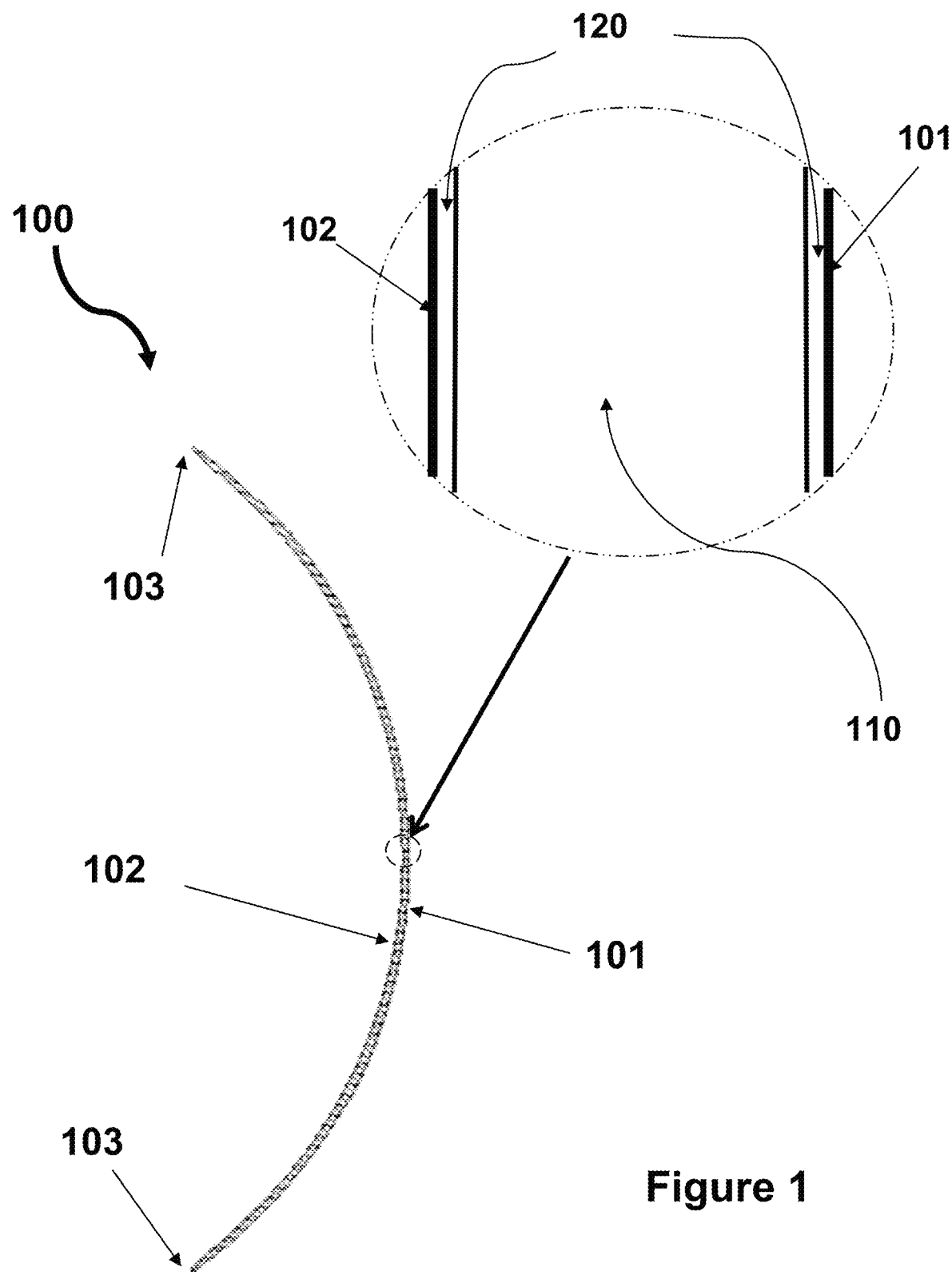
FIG. 1 schematically depicts a sectional view of the structural configuration of a contact lens according to a preferred embodiment of the invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein in this application means that a number, which is referred to as "about", comprises the recited number plus or minus 1-10% of that recited number.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a hard lens, a rigid gas permeable lens, a soft lens, or a hybrid lens.

A "hard contact lens" refers a contact lens comprising a hard plastics (e.g., polymethylmethacrylate) as bulk (core) material.

A "rigid gas permeable contact lens" refers to a contact lens comprising a gas permeable material (e.g., a material made from fluorosilicone acrylates) as bulk (core) material.

A soft contact lens can be a non-silicone hydrogel lens, a silicone hydrogel lens or a silicone lens. A "hydrogel contact lens" refers to a contact lens comprising a non-silicone hydrogel bulk (core) material. A "silicone hydrogel contact lens" refers to a contact lens comprising a silicone hydrogel bulk (core) material. A "silicone contact lens" refers to a contact lens made of a crosslinked silicone material as its bulk (or core or base) material which has three-dimensional polymer networks (i.e., polymer matrix), is insoluble in water, and can hold less than about 7.5% (preferably less than about 5%, more preferably less than about 2.5%, even more preferably less than about 1%) by weight of water when fully hydrated.

A hybrid contact lens has a central optical zone that is made of a gas permeable lens material, surrounded by a peripheral zone made of silicone hydrogel or regular hydrogel lens material.

A "hydrogel" or "hydrogel material" refers to a cross-linked polymeric material which is insoluble in water, but can hold at least 10 percent by weight of water in its three-dimensional polymer networks (i.e., polymer matrix) when it is fully hydrated.

As used in this application, the term "non-silicone hydrogel" refers to a hydrogel that is theoretically free of silicon.

As used in this application, the term "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

"Hydrophilic," as used herein, describes a material or portion thereof that will more readily associate with water than with lipids.

A "vinylic monomer" refers to a compound that has one sole ethylenically unsaturated group, is soluble in a solvent, and can be polymerized actinically or thermally.

The term "soluble", in reference to a compound or material in a solvent, means that the compound or material can be dissolved in the solvent to give a solution with a concentration of at least about 0.05% by weight at room temperature (i.e., 25±3° C.).

The term "insoluble", in reference to a compound or material in a solvent, means that the compound or material can be dissolved in the solvent to give a solution with a concentration of less than 0.005% by weight at room temperature (as defined above).

As used in this application, the term "ethylenically unsaturated group" is employed herein in a broad sense and is intended to encompass any groups containing at least one >C=C< group. Exemplary ethylenically unsaturated groups include without limitation (meth)acryloyl

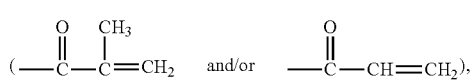

allyl, vinyl, styrenyl, or other C=C containing groups.

The term "(meth)acrylamide" refers to methacrylamide and/or acrylamide.

The term "(meth)acrylate" refers to methacrylate and/or acrylate.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

A "hydrophilic vinylic monomer", as used herein, refers to a vinylic monomer which as a homopolymer typically yields a polymer that is water-soluble or can absorb at least 10 percent by weight of water.

A "hydrophobic vinylic monomer", as used herein, refers to a vinylic monomer which as a homopolymer typically yields a polymer that is insoluble in water and can absorb less than 10 percent by weight of water.

A "blending vinylic monomer" refers to a vinylic monomer capable of dissolving both hydrophilic and hydrophobic polymerizable components of a polymerizable composition to form a solution.

An "acrylic monomer" refers to a vinylic monomer having one sole (meth)acryloyl group. An "N-vinyl amide monomer" refers to an amide compound having a vinyl group (—CH=CH$_2$) that is directly attached to the nitrogen atom of the amide group.

A "macromer" or "prepolymer" refers to a compound or polymer comprising ethylenically unsaturated groups and having a number average molecular weight of greater than 700 Daltons.

As used in this application, the term "vinylic crosslinker" refers to a compound having at least two ethylenically unsaturated groups. A "vinylic crosslinking agent" refers to a subclass of vinylic crosslinkers each having a number average molecular weight of 700 Daltons or less.

As used in this application, the term "polymer" means a material formed by polymerizing or crosslinking one or more monomers, macromers, prepolymers and/or combinations thereof.

As used in this application, the term "molecular weight" of a polymeric material (including monomeric or macromeric materials) refers to the number average molecular weight unless otherwise specifically noted or unless testing conditions indicate otherwise.

A "polysiloxane segment" refers to a polymer chain consisting of at least three consecutively- and directly-linked siloxane units (divalent radical) each independent of one another having a formula of

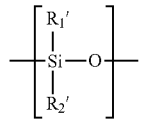

in which $R_1'$ and $R_2'$ are two substituents independently selected from the group consisting of $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, -alk-(OC$_2$H$_4$)$_{\gamma 1}$—OR° (in which alk is $C_1$-$C_6$ alkyl diradical, R° is H or $C_1$-$C_4$ alkyl and $\gamma 1$ is an integer from 1 to 10), a $C_2$-$C_{40}$ organic radical having at least one functional group selected from the group consisting of hydroxyl group (—OH), carboxyl group (—COOH), —NR$_3'$R$_4'$, amino linkages of —NR$_3'$—, amide linkages of —CONR$_3'$—, amide of —CONR$_3'$R$_4'$, urethane linkages of —OCONH—, and $C_1$-$C_4$ alkoxy group, or a linear hydrophilic polymer chain, in which R$_3'$ and R$_4'$ independent of each other are hydrogen or a $C_1$-$C_{15}$ alkyl.

A "polysiloxane vinylic monomer" refers to a compound comprising at least one polysiloxane segment and one sole ethylenically-unsaturated group.

A "polysiloxane vinylic crosslinker" refers to a compound comprising at least one polysiloxane segment and at least two ethylenically-unsaturated groups.

A "chain-extended polysiloxane vinylic crosslinker" refers to a compound comprising at least two ethylenically-unsaturated groups and at least two polysiloxane segments each pair of which is linked by one divalent radical.

A "polycarbosiloxane" refers to a compound containing at least one polycarbosiloxane segment which is a polymer chain consisting of at least three consecutively- and directly-linked siloxane units (divalent radical) each independent of one another having a formula of

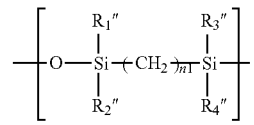

in which n1 is an integer of 2 or 3, $R_1''$, $R_2''$, $R_3''$, and $R_4''$ independent of one another are a $C_1$-$C_6$ alkyl radical (preferably methyl).

A "polycarbosiloxane vinylic monomer" refers to a compound comprising at least one polycarbosiloxane segment and one sole ethylenically-unsaturated group.

A "polycarbosiloxane vinylic crosslinker" refers to a compound comprising at least one polycarbosiloxane segment and at least two ethylenically-unsaturated groups.

The term "fluid" as used herein indicates that a material is capable of flowing like a liquid.

As used in this application, the term "clear" in reference to a polymerizable composition means that the polymerizable composition is a transparent solution or liquid mixture (i.e., having a light transmissibility of 85% or greater in the range between 400 to 700 nm).

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. An alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

As used in this application, the term "amino group" refers to a primary or secondary amino group of formula —NHR', where R' is hydrogen or a $C_1$-$C_{20}$ unsubstituted or substituted, linear or branched alkyl group, unless otherwise specifically noted.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxy (—OH), carboxy (—COOH), —NH$_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

In this application, an "oxazoline" refers to a compound of

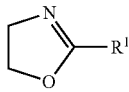

in which: $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); and m3 is an integer from 1 to 10 (preferably 1 to 5).

In this application, the term "polyoxazoline" refers to a polymer or polymer segment of

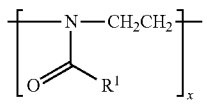

in which: $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500.

In this application, the term "poly(2-oxazoline-co-ethyleneimine)" refers to a statistical copolymer or a polymer segment thereof having a formula of

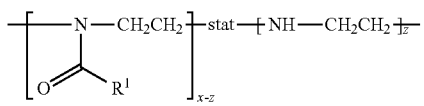

in which: $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500; z is an integer equal to or less than x. A poly(2-oxazoline-co-ethyleneimine) is obtained by hydrolyzing a polyoxazoline.

In this application, the term "poly(2-oxazoline-co-ethyleneimine)-epichlorohydrin" refers to a polymer obtained by reacting a poly(2-oxazoline-co-ethyleneimine) with epichlorohydrin to convert all or substantial percentage (≥90%) of the secondary amine groups of the poly(2-oxazoline-co-ethyleneimine) into azetidinium groups. Examples of poly(2-oxazoline-co-ethyleneimine)-epichlorohydrin are disclosed in a copending U.S. pat. Appl. No. 2016/0061995A1.

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of the secondary amine groups of the polyamine or polyamidoamine into azetidinium groups.

The term "polyamidoamine-epichlorohydrin" refers to an epichlorohydrin-functionalized adipic acid-diethylenetriamine copolymer.

In this application the term "azetidinium" or "3-hydroxyazetidinium" refers to a positively-charged (i.e., cationic), divalent radical (or group or moiety) of

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at a temperature of from about 5° C. to about 15° C., to an extend detectable for a period of about one hour.

The term "azlactone" refers to a mono-valent radical of formula

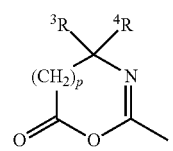

in which p is 0 or 1; $^3R$ and $^4R$ independently of each other is $C_1$-$C_8$ alkyl (preferably methyl).

The term "aziridine group" refers to a mono-valent radical of formula

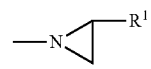

in which R1 is hydrogen, methyl or ethyl.

As used in this application, the term "phosphorylcholine" refers to a zwitterionic group of

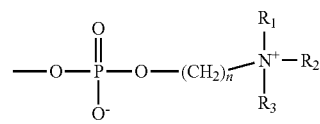

in which n is an integer of 1 to 5 and $R_1$, $R_2$ and $R_3$ independently of each other are $C_1$-$C_8$ alkyl or $C_1$-$C_8$ hydroxyalkyl.

As used in this application, the term "reactive vinylic monomer" refers to any vinylic monomer having at least one reactive functional group selected from the group consisting of carboxyl group, primary amino group, and secondary amino group.

As used in this application, the term "non-reactive vinylic monomer" refers to any vinylic monomer (either hydrophilic or hydrophobic vinylic monomer) free of carboxyl group, primary amino group, secondary amino group, epoxide group, isocyanate group, azlactone group, or aziridine group.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

A "spatial limitation of actinic radiation" refers to an act or process in which energy radiation in the form of rays is directed by, for example, a mask or screen or combinations thereof, to impinge, in a spatially restricted manner, onto an area having a well-defined peripheral boundary. A spatial limitation of UV radiation is obtained by using a mask or screen having a radiation (e.g., UV) permeable region, a radiation (e.g., UV) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6). The mask or screen allows to spatially projects a beam of radiation (e.g., UV radiation) having a cross-sectional profile defined by the projection contour of the mask or screen. The projected beam of radiation (e.g., UV radiation) limits radiation (e.g., UV radiation) impinging on a lens formulation located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV beam (i.e., a spatial limitation of radiation). The radiation used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

The intrinsic "oxygen permeability", $Dk_i$, of a material is the rate at which oxygen will pass through a material. As used in this application, the term "oxygen permeability (Dk)" in reference to a hydrogel (silicone or non-silicone) or a contact lens means a corrected oxygen permeability ($Dk_c$) which is measured at about 34-35° C. and corrected for the surface resistance to oxygen flux caused by the boundary layer effect according to the procedures described in Example 1 of U.S. patent application publication No. 2012/0026457 A1. Oxygen permeability is conventionally expressed in units of barrers, where "barrer" is defined as $[(cm^3 \text{ oxygen})(mm)/(cm^2)(sec)(mm\ Hg)] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm\ Hg)] \times 10^{-9}$.

"Ophthalmically compatible", as used herein, refers to a material or surface of a material which may be in intimate contact with the ocular environment for an extended period of time without significantly damaging the ocular environment and without significant user discomfort.

The term "ophthalmically safe" with respect to a packaging solution for sterilizing and storing contact lenses is meant that a contact lens stored in the solution is safe for direct placement on the eye without rinsing after autoclave and that the solution is safe and sufficiently comfortable for daily contact with the eye via a contact lens. An ophthalmically-safe packaging solution after autoclave has a tonicity and a pH that are compatible with the eye and is substantially free of ocularly irritating or ocularly cytotoxic materials according to international ISO standards and U.S. FDA regulations.

As used in this application, the term "water gradient" in reference to a contact lens means that there is an increase in water content observed in passing from the core to the surface of the contact lens, reaching the highest water content in the region near and including the surface of the contact lens. It is understood that the increase in water content from the core to the surface of the contact lens can be continuous and/or step-wise, so long as the water content is highest in the region near and including the surface of the contact lens.

As used in this application, the term "cross section" of a contact lens refers to a lens section obtained by cutting through the lens with a knife or cutting tool at an angle substantially normal to either of the anterior and posterior surfaces of the lens. A person skilled in the art knows well to cut manually (i.e., hand cut), or with Cryosta Microtome or with a lath, a contact lens to obtain a cross section of the contact lens. A resultant cross section of a contact lens can be polished by using ion etching or similar techniques.

The term "modulus" or "elastic modulus" in reference to a contact lens or a material means the tensile modulus or Young's modulus which is a measure of the stiffness of a contact lens or a material. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

The terms "surface modulus", "surface softness", "surface elastic modulus", "surface Young' modulus", or "surface compression modulus" are used interchangeably in this application to means a nanomechanical property (elastic property) which is measured by atomic force microscopy (AFM) on a surface of a material or a cross section of a contact lens in fully hydrated state (in a phosphate buffered solution, pH~7.3±0.2), using nanoindentation method, as known to a person skilled in the art. Jan Domke and Manfred Radmacher reported that the elastic properties of thin films can be measured with AFM (*Langmuir* 1998, 14, 3320-3325). AFM nanoindentation can be performed according to the experimental protocol described by González-Méijome J M, Almeida JB and Parafita MA in Microscopy: Science, Technology, Applications and Education, "Analysis of Surface Mechanical Properties of Unworn and Worn Silicone Hydrogel Contact Lenses Using Nanoindentation with AFM", pp 554-559, A. Méndez-Vilas and J. Díaz (Eds.), Formatex Research Center, Badajoz, Spain (2010). It is noted that the surface of a cross section of a contact lens, not the anterior or posterior surface of a contact lens (as done by González-Méijome J M, Almeida JB and Parafita MA in their article), is analyzed using nanoindentation with AFM. Nanoindentation method, Peakforce QNM method and Harmonic Force method are described in the paper by Kim Sweers, et al. in Nanoscale Research Letters 2011, 6:270, entitled "Nanomechanical properties of a-synuclein amyloid fibrils: a comparative study by nanoindentation, harmonic force microscopy, and Peakforce QNM". It is also understood that when measurements of surface elastic modulus is carried out with AFM across a cross section of a fully hydrated contact lens from the anterior surface to the bulk or from the bulk to the posterior surface (or vice versa), a surface modulus profile across a cross section of a contact lens can be established along a shortest line between the anterior and posterior surfaces on the surface of the cross section of the contact lens. It is further understood that as a good approximation, any experimentally and directly measured quantity can be used to represent the surface modulus so long as the measured quantity is proportional to the surface modulus. Alternatively, a microindentation or nanoindentation method could be used, where colloid spheres of different sizes are used to measure the surface modulus.

As used in this application, the term "inner layer" or "bulk material" in reference to a contact lens interchangeably means a layer that has a 3-dimensional shape of a contact lens and includes a central curved plane (which divides the contact lens into two parts, one containing the anterior surface and the other containing the posterior surface) and has a variable thickness.

As used in this application, the term "outer surface hydrogel layer" in reference to a contact lens means an outmost hydrogel layer on the surface of the contact lens, which consists of an anterior outer hydrogel layer and a posterior outer hydrogel layer and which fully covers the inner layer (or lens bulk material).

As used in this application, the term "anterior outer hydrogel layer" in reference to a contact lens means a hydrogel layer that includes the anterior surface of the contact lens, is substantially uniform in thickness (i.e., variation in thickness is not more than about 20% from the average thickness of that layer), and has an average thickness of at least about 0.25 µm.

As used in this application, the term "posterior outer hydrogel layer" in reference to a contact lens means a hydrogel layer that includes the posterior surface of the contact lens, is substantially uniform in thickness (i.e., variation in thickness is not more than about 20% from the average thickness of that layer), and has an average thickness of at least about 0.25 µm.

As used in this application, the term "transition layer" in reference to a contact lens means a layer polymeric material that is located between the inner layer (or the lens bulk material) and one of the anterior and posterior outer hydrogel layers. Each transition layer is substantially uniform in thickness (i.e., variation in thickness is not more than about 20% from the average thickness of that layer).

In this application, the "average thickness" of an anterior or outer hydrogel layer or a transition layer is simply referred to as the "thickness of an anterior outer hydrogel layer", "thickness of a posterior outer hydrogel layer" or "thickness of a transition layer", as measured with AFM on a cross section of the contact lens in an indicated state, e.g., in fully hydrated state or when being fully hydrated (i.e., in a phosphate buffered solution, pH~7.3±0.2), or in dry state (e.g., fully oven-dried).

FIG. 1 schematically illustrates a contact lens of the invention, according to a preferred embodiment. In accordance with this preferred embodiment of the invention, the contact lens 100 has an anterior surface (or front curve or convex surface) 101 and an opposite posterior surface (or base curve or concave surface) 102 which is rest on the cornea of the eye when worn by a user. The contact lens 100 comprises an inner (or middle) layer (or lens bulk material) 110 and the anterior and posterior outer hydrogel layers 120. The inner layer 110 is the bulk material of the contact lens 100 and has a 3-dimensional shape very close to the contact lens 100. The anterior and posterior outer hydrogel layers 120 are substantially uniform in thickness and made of a hydrogel material substantially free of silicone (preferably totally free of silicone) having a higher water content relative to that of the inner layer 110. The anterior and posterior outer hydrogel layers 120 merge at the peripheral edge 103 of the contact lens 100 and cover completely the inner layer 110.

Figure 2:
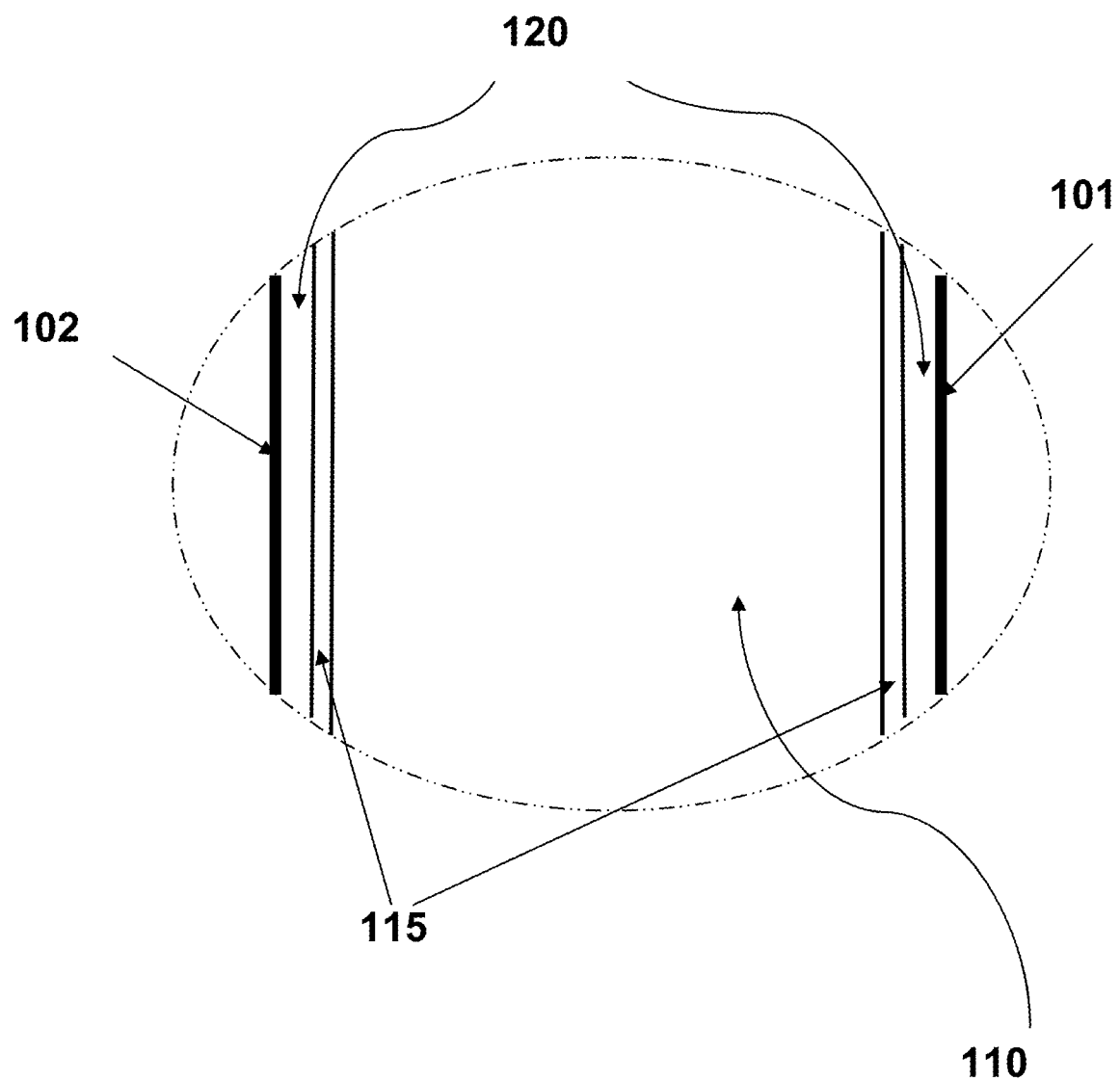
FIG. 2 schematically depicts a sectional view of the structural configuration of a contact lens according to another preferred embodiment of the invention.

FIG. 2 schematically illustrates a contact lens of the invention, according to another preferred embodiment. The contact lens 100 comprises an inner (or middle) layer (or lens bulk material) 110, the anterior and posterior outer hydrogel layers 120, and two transition layers 115. Each of the two transition layers 115 is located between the inner layer 110 and one of the two outer hydrogel layers 120.

As used in this application, the term "equilibrium water content" in reference to a contact lens or a polymeric material means the amount (expressed as percent by weight) of water present in the contact lens or the polymeric material when being fully hydrated (equilibrated) in saline solution (ca. 0.79 wt % NaCl) and determined at room temperature (as defined above).

As used in this application, the term "crosslinked coating" or "hydrogel coating" or "hydrogel layer" on a contact lens interchangeably is used to describe a crosslinked polymeric material having a three-dimensional network that can contain water when fully hydrated. The three-dimensional network of a crosslinked polymeric material can be formed by crosslinking of two or more linear or branched polymers through crosslinkages.

As used in this application, the term "water-swelling ratio," in reference to an anterior or posterior outer hydrogel layer of a contact lens of the invention, means a value determined with AFM according to $$WSR = \frac{L_{Wet}}{L_{Dry}} \times 100\%$$

in which WSR is the water-swelling ratio of one of the anterior and posterior outer hydrogel layer, $L_{Wet}$ is the average thickness of that anterior or posterior outer hydrogel layer of the contact lens in fully hydrated state (when being fully hydrated) as measured with AFM on a cross section of the contact lens in fully hydrated state (i.e., in a phosphate buffered solution, pH~7.3±0.2), and $L_{Dry}$ is the average thickness of that anterior or posterior outer hydrogel layer of the contact lens in dry state as measured with AFM on a cross section of the contact lens in dry state (oven dried).

It is believed that a water-swelling ratio of the outer surface hydrogel layer of a contact lens is proportional to the equilibrium water content possessed by the outer surface hydrogel layer. The higher a water-swelling ratio of the outer surface hydrogel layer is, the higher the equilibrium water content of the outer surface hydrogel layer is. Furthermore, it is believed that a water-swelling ratio of the outer surface hydrogel layer is proportional to the mesh size of the outer surface hydrogel layer and thereby is proportional to the softness of the outer surface hydrogel layer. The mesh size of a hydrogel is inversely proportional to the crosslinking density of the hydrogel while being proportional to the lengths of crosslinking chains. The higher a water-swelling ratio of the outer surface hydrogel layer, the softer the outer surface hydrogel layer is. Therefore, a water swelling ratio can be a good indicator for both equilibrium water content and softness of an outer surface hydrogel layer.

As used in this application, the term "surface compression force at an indentation depth of 400 nm" or "indentation force at an indentation depth of 400 nm" refers to the averaged normal force at an indentation depth along a loading curve as determined in a micro-indentation or nano-indentation test described in Example 1.

As used in this application, the term "reduction in indentation force" or "$\Delta(IF)_{400\ nm}$" in reference to a contact lens means the difference between the indentation force (μN) at an indentation depth of 400 nm predicted based on the bulk elastic modulus (MPa) of a contact lens and the measured indentation force (μN) at an indentation depth of 400 nm for the contact lens in a microindentation or nanoindentation test as described in Example 1, and can be calculated by the following equation $$\Delta(IF)_{400\,nm} = 1 - \frac{(IF)_t}{(IF)_0} = 1 - \frac{(IF)_t}{kE' + b}$$

in which: $(IF)_t$ is the indentation force at an indentation depth of 400 nm measured in a micro-indentation or nano-indentation test of the contact lens; $(IF)_0$ is the indentation force at an indentation depth of 400 nm predicted based on the relationship, $(IF)_0 = kE' + b$, between the bulk elastic modulus and the indentation force at an indentation depth of 400 nm as measured in a microindentation or nano-indentation test; "k" and "b" are the correlation coefficient and the experimental correction factor respectively, which are established in a series of micro-indentation or nano-indentation tests with several contact lenses without any hydrogel coating thereon and having different bulk elastic modulus. Where the micro-indentation tests described in Example 1 are used, "k" is 13.98 and "b" is 0.62. Where the nano-indentation tests described in Example 1 are used, "k" is 2.12 and "b" is −0.38.

All contact lenses can have different mechanical properties at their surfaces. In particular, where a contact lens having a soft hydrogel coating thereon. The mechanical properties of a contact lens in the region near the surface and including the surface can be characterized by measuring surface compression force or indentation forces as function of displacement in a micro-indentation or nano-indentation test.

It is discovered that the indentation force at a given displacement or indentation depth (e.g., 400 nm) correlates well with the bulk elastic (Young's) modulus for contact lenses without any soft hydrogel coating thereon (i.e., there is a linear bulk elastic modulus-indentation force relationship between the bulk elastic modulus and the indentation force at an indentation depth of 400 nm), whereas, for contact lenses having a soft hydrogel coating thereon, the indentation force at an indentation depth of 400 nm is much smaller than what is predicted based on the linear bulk elastic modulus-indentation force relationship, namely a reduction in indentation force at an indentation depth of 400 nm. It is believed that the reduction in indentation force at an indentation depth of 400 nm, $\Delta(IF)_{400\ nm}$, can be used to quantitatively characterize a contact lens having a water gradient structural configuration. If a contact lens has an adequately thick (≥0.25 μm) outer surface hydrogel layer thereon, it would have a reduction in indentation force at an indentation depth of 400 nm, $\Delta(IF)_{400\ nm}$, of about 40% or larger. It is also believed that the value of the $\Delta(IF)_{400\ nm}$ for a water gradient contact lens depends upon both softness and thickness of the outer surface hydrogel layer on the contact lens. Reduction in indentation force at an indentation depth of 400 nm ($\Delta(IF)_{400\ nm}$) is proportional to the softness and/or thickness of the outer surface hydrogel layer (or outer surface layer) of a contact lens. The larger the $\Delta(IF)_{400\ nm}$ is, the softer and/or thicker the outer surface hydrogel layer (or outer surface layer) is, and the less force is induced to the corneal surface. Therefore, $\Delta(IF)_{400\ nm}$ can be a good measure for the combination effects of the softness and thickness of an outer surface hydrogel layer (or outer surface layer) on a water gradient contact lens.

As used in this application, the term "normalized surface compression force" or "NSCF" in reference to a contact lens means the ratio of the surface compression force or indentation force at an indentation depth of 400 nm (which is determined in a microindentation test with a probe size of 1 mm as described in Example 1), of the contact lens, to the elastic modulus of the contact lens, and has a unit of μN/MPa, i.e., $$NSCF\,(\mu N/MPa) = \frac{\text{Surface compression force }(\mu N)}{\text{Elastic modulus (MPa)}} \text{ or}$$

$$NSCF\,(\mu N/MPa) = \frac{\text{Indentation force }(\mu N)\text{ at an indentation depth of 400 nm}}{\text{Elastic modulus (MPa)}} \text{ or}$$

It is discovered that when a contact lens does not have an outer surface hydrogel layer thereon, it would have a normalized surface compression force which is about 14 μN/MPa or slightly higher, regardless of the bulk elastic modulus of the contact lenses, when measured with a colloid probe of 1 mm. It is therefore believed that the normalization of surface compression force over the elastic modulus of the contact lens is intended to equalize the contribution of the contact lens bulk material to the surface compression force. However, when a contact lens has an adequately thick outer surface hydrogel layer thereon, it would have a normalized surface compression force (at an indentation depth of 400 nm) of less than about 14 μN/MPa. It is believed that, like $\Delta(IF)_{400\ nm}$, the normalized surface compression force at an indentation depth of 400 nm can be used to qualitatively and quantitatively characterize a contact lens having a water gradient structural configuration. If a contact lens has an adequately thick (≥0.25 μm) outer surface hydrogel layer thereon, it would have a normalized surface compression force (at an indentation depth of 400 nm) of about 12 μN/MPa or lower. It is also understood that the normalized surface compression force (NSCF) at an indentation depth of 400 nm of a water gradient contact lens depends upon both softness and thickness of the outer surface hydrogel layer on the contact lens. Its NSCF is proportional to the softness of the outer surface hydrogel layer (or outer surface layer) of a contact lens. The smaller the normalized surface compression force at an indentation depth of 400 nm is, the softer the outer surface hydrogel layer (or outer surface layer) is, and the less force is induced to the corneal surface. Its NSCF is inversely proportional to the thickness of the outer surface hydrogel layer (or the outer surface layer). The thicker the outer surface hydrogel layer (or outer surface layer) is, the smaller the normalized surface compression force at an indentation depth of 400 nm is. Therefore, a normalized surface compression force at an indentation depth of 400 nm can be a good measure for the combination effects of the softness and thickness of an outer surface hydrogel layer (or outer surface layer) on a water gradient contact lens.

As used in this application, the term "polyquaternium-1 uptake" or "PU" in reference to a contact lens means the amount of polyquaternium-1 absorbed by the contact lens, measured according to the procedure described in Example 1.

As used in this application, the term "long-lasting surface hydrophilicity and wettability" in reference to a contact lens means that the contact lens has a water-break-up time (WBUT) of at least 10 seconds after 30 cycles of digital rubbing treatment or after simulated abrasion cycling treatment. WBUT determination, cycle of digital rubbing treatment, and simulated abrasion cycling treatment of a contact lens are performed according to the procedures described in Example 1.

As used in this application, the term "long-lasting lubricity" in reference to a contact lens means that the contact lens has a friction rating of about 2.0 or lower after 30 cycles of digital rubbing treatment or after simulated abrasion cycling treatment. Friction rating determination, cycle of digital rubbing treatment, and simulated abrasion cycling treatment of a contact lens are performed according to the procedures described in Example 1.

As used in this application, the term "30 cycles of digital rubbing treatment" or "n cycles of digital rubbing treatment" means that contact lenses are subjected to 30 or n repetitions of a digital rubbing procedure which essentially consists of digitally rubbing (wearing disposable powder-free latex gloves) contact lenses with RENU® multi-purpose lens care solution (or an equivalent, i.e., a multi-purpose lens care solution disclosed in Table I of U.S. Pat. No. 5,858,937 for 20 seconds and then rinsing the digitally-rubbed contact lenses with a phosphate-buffered saline for at least 20 seconds. The 30 or n cycles of digital rubbing can reasonably imitate daily cleaning and disinfecting in a 30-day or n-day lens care regime.

"UVA" refers to radiation occurring at wavelengths between 315 and 380 nanometers; "UVB" refers to radiation occurring between 280 and 315 nanometers; "Violet" refers to radiation occurring at wavelengths between 380 and 440 nanometers.

"UVA transmittance" (or "UVA % T"), "UVB transmittance" or "UVB % T", and "violet-transmittance" or "Violet % T" are calculated by the following formula $$UVA \% T = \frac{\text{Average \% Transmission between 315 nm and 380 nm}}{\text{Luminescence \% } T} \times 100$$

$$UVB \% T = \frac{\text{Average \% Transmission between 280 nm and 315 nm}}{\text{Luminescence \% } T} \times 100$$

Violet %T =

$$\frac{\text{Average \% Transmission between 380 nm and 440 nm}}{\text{Luminescence \% } T} \times 100$$

in which Luminescence % T is determined by the following formula

Luminescence % T=Average % Transmission between 780-380 nm.

The term "inherently wettable" in reference to a silicone hydrogel contact lens means that the silicone hydrogel contact lens has water-break-up-time (WBUT) of about 10 seconds or more and a water contact angle by captive bubble ($WCA_{cb}$) of about 80 degree or less without being subjected to any surface treatment after the silicone hydrogel contact lens is formed by thermally or actinically polymerizing (i.e., curing) a silicone hydrogel lens formulation. In accordance with the invention, WBUT and $WCA_{cb}$ are measured according to the procedures described in Example 1.

"Surface modification" or "surface treatment", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929, the incorporation of wetting agents into a lens formulation for making contact lenses proposed in U.S. Pat. Nos. 6,367,929 and 6,822,016, reinforced mold-transfer coating disclosed in U.S. Pat. No. 7,858,000, and a hydrophilic coating composed of covalent attachment or physical deposition of one or more layers of one or more hydrophilic polymer onto the surface of a contact lens disclosed in U.S. Pat. Nos. 8,147,897 and 8,409,599 and US Patent Application Publication Nos. 2011/0134387, 2012/0026457 and 2013/0118127.

"Post-curing surface treatment", in reference to a lens bulk material or a contact lens, means a surface treatment process that is performed after the lens bulk material or the contact lens is formed by curing (i.e., thermally or actinically polymerizing) a lens formulation. A "lens formulation" refers to a polymerizable composition that comprises all necessary polymerizable components for producing a contact lens or a lens bulk material as well known to a person skilled in the art.

An "organic-based solution" refers to a solution which is a homogeneous mixture consisting of an organic-based solvent and one or more solutes dissolved in the organic based solvent. An organic-based coating solution refers to an organic-based solution containing at least one polymeric coating material as a solute in the solution.

An "organic-based solvent" is intended to describe a solvent system which consists of one or more organic solvents and about 40% or less, preferably about 30% or less, more preferably about 20% or less, even more preferably about 10% or less, in particular about 5% or less by weight of water relative to the weight of the solvent system.

The invention is generally related to a weekly- or monthly-disposable water gradient contact lens which not only has a layered structural configuration providing a unique water gradient from inside to outside of the contact lens and a relatively long-lasting wettability/hydrophilicity, but also is digital rubbing resistant and compatible with lens care solutions including multipurpose lens care solutions. The layered structural configuration comprises: an inner layer (i.e., a lens bulk material) having an equilibrium water content of about 70% by weight or less and an outer surface hydrogel layer (consisting of an anterior outer hydrogel layer and a posterior outer hydrogel layer) which fully covers the inner layer (or lens bulk material) and has an equilibrium water content being at least 1.2 folds of the equilibrium water content of the inner layer (or lens bulk material) (preferably being at least 80% by weight) and an adequate thickness (from about 0.25 µm to about 25 µm) when being fully hydrated.

In accordance with the invention, the outer surface hydrogel layers must not only have a relatively-high water swelling ratio but also have an adequate thickness in order to provide a superior wearing comfort. A relatively-high water swelling ratio of the outer surface hydrogel layer can ensure the contact lens have an extremely soft surface with high equilibrium water content. But, if the outer surface hydrogel layer is too thin, it would be susceptible to be totally collapsed onto the lens bulk material by a slight compressing force, losing the advantages associated with the water gradient structural feature of a contact lens of the invention. It is believed that for a given high water swelling ratio the wearing comfort provided by a contact lens of the invention would increase with the increase of the thickness of its outer surface hydrogel layer and then level off after a certain thickness value.

This invention solve the problems present in the prior art related to incompatibility with multipurpose lens care solutions and low resistance to digital rubbing for water gradient contact lenses. It is discovered that a relatively thick anchor layer (i.e., reactive base coating) of a reactive polyanionic polymer (e.g., a carboxyl-containing polyanionic polymer) on a contact lens is required for forming a thick outer surface hydrogel layer. The thicker the anchor layer, the thicker the outer surface hydrogel layer. However, the relatively thick anchor layer leads to higher concentrations of reactive groups (e.g., carboxyl groups) in the anchor layer and higher uptakes of polycationic antimicrobials present in lens care solutions. The past efforts in reducing the uptakes of polycationic antimicrobials by water gradient contact lenses primarily relied on the reduction of the thickness of the anchor layer and use of a polyanionic material having a higher pKa value. Such approaches yield an outer surface hydrogel layer too thin so that the durability and/or lubricity of the outer surface hydrogel layer are reduced and the wear comfort provided by the resultants contact lenses is diminished.

It is discovered that an anchor layer and an outer surface hydrogel layer of a water gradient contact lens under production and/or a preformed water gradient contact lens can be treated with a small, flexible, hydrophilic charge neutralizer, so as to convert a majority or most negatively-charged groups in the water gradient contact lens into non-charged ester linkages while crosslinking the anchor layer so as to enforce the durability of the outer surface hydrogel layer on the contact lens with no or minimal adverse impacts on the wettability, hydrophilicity, and lubricity of the outer surface hydrogel layer on the contact lens.

It is also discovered that the durability of a hydrogel coating on a SiHy contact lens depends largely upon the processing conditions under which its underlying base coating of polyanionic polymer is formed. When a base coating is applied onto a SiHy contact lens in a single coating step (i.e., by contacting it with one sole coating solution (pH<4.5) of polyanionic polymer for a given coating period of time (e.g., 50 minutes) and followed by one or more rinsing steps, the durability of a hydrogel coating formed on such a base coating can vary with the optical power (i.e., the center thickness) of the SiHy contact lens under coating. For example, the durability of the hydrogel coatings of coated SiHy contact lenses having an optical power of -10.0 diopters is inferior to the durability of the hydrogel coatings of coated SiHy contact lenses having an optical power of -3.0 diopters. A longer coating period could not improve the variation in durability of the hydrogel coating with the optical power (center thickness) of the contact lens. However, it is found that, when the base coating is applied onto a SiHy contact lens by contacting it with one coating solution (having a low pH) of polyanionic polymer even for a shorter coating period of time (e.g., 25 minutes), then rinsing it with a buffered saline having a neutral or slightly basic pH), and then followed by contacting it again with another coating solution (having a low pH) of polyanionic polymer for a shorter period (e.g., 25 minutes), the durability of a hydrogel coating formed on such a base coating can be improved significantly and will not vary with vary with the optical power (i.e., the center thickness) of the SiHy contact lens under coating.

It is further discovered that the PU of a coated SiHy contact lens with a hydrogel coating thereon depends largely upon the pH and/or the salt concentration (i.e., ionic strength) of a buffered saline used for rinsing a treated SiHy contact lens having a base coating (of a polyanionic polymer) thereon before forming the hydrogel coating on top of the base coating. Lower PU can be achieved by using a rinse solution with a higher pH and/or a higher ionic strength (higher salt concentration). In combination with the above described discovery about how to improve significantly the durability of a hydrogel coating of a water gradient contact lens, this discovery can allow one to produce water gradient contact lenses with durable hydrogel coating and minimized PU.

This invention provides water gradient contact lenses that are compatible with multipurpose lens care solutions and resistant to digital rubbing and therefore suitable to be used as weekly- or monthly-disposable contact lenses. Because a contact lens of the invention has the desired water gradient structural configuration and a relatively-thick, extremely-soft and water-rich hydrogel surface layer, it can provide superior wearing comfort.

The invention, in one aspect, provides a contact lens having: a polyquaternium-1 uptake ("PU") of about 0.40 or 0.30 micrograms/lens or less (preferably about 0.20 micrograms/lens or less, more preferably about 0.15 micrograms/lens or less, even more preferably about 0.10 micrograms/lens or less, most preferably about 0.05 micrograms/lens or less); and a long-lasting surface hydrophilicity and wettability as characterized by having a water-break-up time of at least 10 seconds (preferably at least 12.5 seconds, more preferably at least 15 seconds, even more preferably at least 17.5 seconds, most preferably at least 20 seconds) and/or a long-lasting lubricity as characterized by having a friction rating of 2.0 or lower (preferably about 1.5 or lower, more preferably about 1.0 or lower, even more preferably about 0.5 or lower) after 30 cycles of digital rubbing treatment or after simulated abrasion cycling treatment, wherein the contact lens comprises: an anterior surface and an opposite posterior surface; and a layered structural configuration which comprises, in a direction from the anterior surface to the posterior surface, an anterior outer hydrogel layer, an inner layer of a lens material, and a posterior outer hydrogel layer, wherein the inner layer has a first equilibrium water content of about 70% by weight or less, wherein the anterior and posterior outer hydrogel layers independent of each other have a thickness of from about 0.25 µm to about 25 µm and a second equilibrium water content that is higher than the first equilibrium water content, wherein the anterior and posterior outer hydrogel layers independent of each other have a water-swelling ratio of at least 140% (preferably at least 170%, more preferably at least 200%, even more preferably at least 250%, most preferably at least 300%). Preferably, the contact lens is substantially free (i.e., less than three) or preferably totally free of surface cracking lines visible under dark field after the contact lens is rubbed between fingers for 10 times.

The invention, in another aspect, provides a contact lens having: a polyquaternium-1-uptake ("PU") of about 0.40 or 0.30 micrograms/lens or less (preferably about 0.20 micrograms/lens or less, more preferably about 0.15 micrograms/lens or less, even more preferably about 0.10 micrograms/lens or less, most preferably about 0.05 micrograms/lens or less); a long-lasting surface hydrophilicity and wettability as characterized by having a water-break-up time of at least 10 seconds (preferably at least 12.5 seconds, more preferably at least 15 seconds, even more preferably at least 17.5 seconds, most preferably at least 20 seconds) and/or a long-lasting lubricity as characterized by having a friction rating of 2.0 or lower (preferably about 1.5 or lower, more preferably about 1.0 or lower, even more preferably about 0.5 or lower) after 30 cycles of digital rubbing treatment or after simulated abrasion cycling treatment; and a water content gradient from inside to outside of the contact lens, wherein the contact lens comprises a lens bulk material completely covered with an outer surface hydrogel layer having a thickness of from about 0.25 µm to about 25 µm as measured with atomic force microscopy across a cross section from the posterior surface to the anterior surface of the contact lens in fully hydrated state, wherein the lens bulk material has a first equilibrium water content of about 70% by weight or less, wherein the outer surface hydrogel layer has a second equilibrium water content that is at least 1.2 folds of the first equilibrium water content and at least 80% by weight. Preferably, the contact lens is substantially free (i.e., less than three) or preferably totally free of surface cracking lines visible under dark field after the contact lens is rubbed between fingers for 10 times.

The invention, in a further aspect, provides a contact lens, having: an anterior surface and an opposite posterior surface; a polyquaternium-1 uptake ("PU") of about 0.40 or 0.30 micrograms/lens or less (preferably about 0.20 micrograms/lens or less, more preferably about 0.15 micrograms/lens or less, even more preferably about 0.10 micrograms/lens or less, most preferably about 0.05 micrograms/lens or less); a long-lasting surface hydrophilicity and wettability as characterized by having a water-break-up time of at least 10 seconds (preferably at least 12.5 seconds, more preferably at least 15 seconds, even more preferably at least 17.5 seconds, most preferably at least 20 seconds) and/or a long-lasting lubricity as characterized by having a friction rating of 2.0 or lower (preferably about 1.5 or lower, more preferably about 1.0 or lower, even more preferably about 0.5 or lower) after 30 cycles of digital rubbing treatment or after simulated abrasion cycling treatment; and a structural configuration that is characterized by having a cross-sectional surface-modulus profile which comprises, along a shortest line between the anterior and posterior surfaces on the surface of a cross section of the contact lens, an anterior outer zone including and near the anterior surface, an inner zone including and around the center of the shortest line, and a posterior outer zone including and near the posterior surface, wherein the anterior outer zone has an average anterior surface modulus (designated as $\overline{SM_{Ant}}$) while the posterior outer zone has an average posterior surface modulus (designated as $\overline{SM_{Post}}$), wherein the inner zone has an average inner surface modulus (designated as $\overline{SM_{Inner}}$), wherein at least one of $$\frac{\overline{SM_{Inner}} - \overline{SM_{Post}}}{\overline{SM_{Inner}}} \times 100\% \text{ and } \frac{\overline{SM_{Inner}} - \overline{SM_{Ant}}}{\overline{SM_{Inner}}} \times 100\%$$

is at least about 20%. Preferably, the contact lens is substantially free (i.e., less than three) or preferably totally free of surface cracking lines visible under dark field after the contact lens is rubbed between fingers for 10 times.

The invention, in another further aspect, provides a contact lens having: a normalized surface compression force using a 1 mm microindentation probe at an indentation depth of 400 nm of about 12 µN/MPa or lower (preferably about 10 µN/MPa or lower, more preferably about 8 µN/MPa or lower, even more preferably about 6 µN/MPa or lower, most preferably about 4 N/MPa or lower); a polyquaternium-1 uptake ("PU") of about 0.4 or 0.30 micrograms/lens or less (preferably about 0.20 micrograms/lens or less, more preferably about 0.15 micrograms/lens or less, even more preferably about 0.10 micrograms/lens or less, most preferably about 0.05 micrograms/lens or less); and a long-lasting surface hydrophilicity and wettability as characterized by having a water-break-up time of at least 10 seconds (preferably at least 12.5 seconds, more preferably at least 15 seconds, even more preferably at least 17.5 seconds, most preferably at least 20 seconds) and/or a long-lasting lubricity as characterized by having a friction rating of 2.0 or lower (preferably about 1.5 or lower, more preferably about 1.0 or lower, even more preferably about 0.5 or lower) after 30 cycles of digital rubbing treatment or after simulated abrasion cycling treatment, wherein the contact lens comprises: an anterior surface and an opposite posterior surface; and a layered structural configuration which comprises, in a direction from the anterior surface to the posterior surface, an anterior outer hydrogel layer, an inner layer of a lens material, and a posterior outer hydrogel layer. Preferably, the contact lens is substantially free (i.e., less than three) or preferably totally free of surface cracking lines visible under dark field after the contact lens is rubbed between fingers for 10 times.

The invention, in still further aspect, provides a contact lens having: a normalized surface compression force using a 1 mm microindentation probe at an indentation depth of 400 nm of about 12 µN/MPa or lower (preferably about 10 µN/MPa or lower, more preferably about 8 µN/MPa or lower, even more preferably about 6 µN/MPa or lower, most preferably about 4 µN/MPa or lower); a polyquaternium-1 uptake ("PU") of about 0.30 micrograms/lens or less (preferably about 0.20 micrograms/lens or less, more preferably about 0.15 micrograms/lens or less, even more preferably about 0.10 micrograms/lens or less, most preferably about 0.05 micrograms/lens or less); and a long-lasting surface hydrophilicity and wettability as characterized by having a water-break-up time of at least 10 seconds (preferably at least 12.5 seconds, more preferably at least 15 seconds, even more preferably at least 17.5 seconds, most preferably at least 20 seconds) and/or a long-lasting lubricity as characterized by having a friction rating of 2.0 or lower (preferably about 1.5 or lower, more preferably about 1.0 or lower, even more preferably about 0.5 or lower) after 30 cycles of digital rubbing treatment or after simulated abrasion cycling treatment, wherein the contact lens comprises a lens bulk material which is a polymeric material.

The invention, in still another further aspect, provides a contact lens having: a reduction in indentation force at an indentation depth of 400 nm, $\Delta(IF)_{400\ nm}$, of about 50% or larger (preferably about 55% or larger, more preferably about 60% or larger, even more preferably about 65% or larger, most preferably about 70% or larger); a polyquaternium-1 uptake ("PU") of about 0.4 or 0.30 micrograms/lens or less (preferably about 0.20 micrograms/lens or less, more preferably about 0.15 micrograms/lens or less, even more preferably about 0.10 micrograms/lens or less, most preferably about 0.05 micrograms/lens or less); and a long-lasting surface hydrophilicity and wettability as characterized by having a water-break-up time of at least 10 seconds (preferably at least 12.5 seconds, more preferably at least 15 seconds, even more preferably at least 17.5 seconds, most preferably at least 20 seconds) and/or a long-lasting lubricity as characterized by having a friction rating of 2.0 or lower (preferably about 1.5 or lower, more preferably about 1.0 or lower, even more preferably about 0.5 or lower) after 30 cycles of digital rubbing treatment or after simulated abrasion cycling treatment, wherein the contact lens comprises: an anterior surface and an opposite posterior surface; and a layered structural configuration which comprises, in a direction from the anterior surface to the posterior surface, an anterior outer hydrogel layer, an inner layer of a lens material, and a posterior outer hydrogel layer. Preferably, the contact lens is substantially free (i.e., less than three) or preferably totally free of surface cracking lines visible under dark field after the contact lens is rubbed between fingers for 10 times.

The invention, in still another further aspect, provides a reduction in indentation force at an indentation depth of 400 nm, $\Delta(IF)_{400\,nm}$, of about 40% or larger (preferably about 50% or larger, more preferably about 55% or larger, even more preferably about 60% or larger, most preferably about 65% or larger); a polyquaternium-1 uptake ("PU") of about 0.30 micrograms/lens or less (preferably about 0.20 micrograms/lens or less, more preferably about 0.15 micrograms/lens or less, even more preferably about 0.10 micrograms/lens or less, most preferably about 0.05 micrograms/lens or less); and a long-lasting surface hydrophilicity and wettability as characterized by having a water-break-up time of at least 10 seconds (preferably at least 12.5 seconds, more preferably at least 15 seconds, even more preferably at least 17.5 seconds, most preferably at least 20 seconds) and/or a long-lasting lubricity as characterized by having a friction rating of 2.0 or lower (preferably about 1.5 or lower, more preferably about 1.0 or lower, even more preferably about 0.5 or lower) after 30 cycles of digital rubbing treatment or after simulated abrasion cycling treatment, wherein the contact lens comprises a lens bulk material which is a polymeric material.

Where reduction in indentation force of a contact lens is determined in nano-indentation tests by using Optics11 Piuma and a Piuma probe having a tip radius of about 9.0 µm, the reduction in indentation force at an indentation depth of 400 nm, $\Delta(IF)_{400\,nm}$, of is calculated by $$\Delta(IF)_{400\,nm} = 1 - \frac{(IF)_t}{2.12 \cdot E' - 0.38}$$

in which $(IF)_t$ is the measured indentation force at an indentation depth of 400 nm of the contact lens and E' is the bulk elastic modulus (E') of the contact lens.

Where reduction in indentation force of a contact lens is determined in micro-indentation tests by using Bruker's Hysitron® BioSoft™ In-Situ Indenter and a 1 mm hemispherical borosilicate glass probe, the reduction in indentation force at an indentation depth of 400 nm, $\Delta(IF)_{400\,nm}$, of is calculated by $$\Delta(IF)_{400\,nm} = 1 - \frac{(IF)_t}{13.98 \cdot E' + 0.62}$$

in which $(IF)_t$ is the measured indentation force at an indentation depth of 400 nm of the contact lens and E' is the bulk elastic modulus (E') of the contact lens.

In accordance with all the various aspects of the invention, the inner layer or the lens bulk material of a contact lens of the invention can be derived directly from a preformed contact lens. A preformed contact lens can be any contact lens which has not been subjected to any surface treatment after being produced according to any lens manufacturing processes, any contact lens which has been plasma treated, or any commercial contact lens, so long as it does not have a water gradient structural configuration. A person skilled in the art knows very well how to make preformed contact lenses. A person skilled in the art knows very well how to make preformed contact lenses. For example, preformed contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of polymeric material buttons as used in making customized contact lenses. In cast-molding, a lens formulation typically is dispensed into molds and cured (i.e., polymerized and/or crosslinked) in molds for making contact lenses.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used. Other materials that allow UV light transmission could be used, such as quartz glass and sapphire.

In a preferred embodiment, reusable molds are used and the lens-forming composition is cured actinically under a spatial limitation of actinic radiation to form a contact lens. Examples of preferred reusable molds are those disclosed in U.S. Pat. Nos. 6,627,124, 6,800,225, 7,384,590, and 7,387,759. Reusable molds can be made of quartz, glass, sapphire, $CaF_2$, a cyclic olefin copolymer (e.g., Topas® COC grade 8007-S10 (clear amorphous copolymer of ethylene and norbornene) from Ticona GmbH of Frankfurt, Germany and Summit, New Jersey, Zeonex® and Zeonor® from Zeon Chemicals LP, Louisville, KY), polymethylmethacrylate (PMMA), polyoxymethylene from DuPont (Delrin), Ultem® (polyetherimide) from G.E. Plastics, PrimoSpire®, etc.

In accordance with the invention, the polymerizable composition can be introduced (dispensed) into a cavity formed by a mold according to any known methods.

After the polymerizable composition is dispensed into the mold, it is polymerized to produce a contact lens. Crosslinking may be initiated thermally or actinically, preferably by exposing the lens-forming composition in the mold to a spatial limitation of actinic radiation to crosslink the polymerizable components in the polymerizable composition.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described below.

In a preferred embodiment, a preformed contact lens is a hard contact lens comprising a hard plastic material as lens bulk material. Preferably, the hard plastic material is a crosslinked polymethylacrylate. A person skilled in the art knows well how to make a hard plastic material, including a crosslinked polymethylmethacrylate.

In another preferred embodiment, a preformed contact lens is a rigid gas permeable contact lens. A person skilled in the art knows how to make a rigid gas permeable contact lens.

In another preferred embodiment, a preformed contact lens is a hybrid contact lens having a central optical zone made of a rigid gas permeable lens material and surrounded by a peripheral zone made of a hydrogel material.

In another preferred embodiment, a preformed contact lens is a soft silicone contact lens comprising, as lens bulk material, a crosslinked silicone material. Useful crosslinked silicone materials include, without limitation, crosslinked polysiloxanes obtained by crosslinking silicone composition according to any know method, silicone elastomers, silicone rubbers, and the likes. Silicone contact lenses can be prepared by any kind of conventional techniques (for example, the lathe cut manufacturing method, the spin cast manufacturing method, the cast molding manufacturing method, etc.) well-known to a person skilled in the art.

In another preferred embodiment, a preformed contact lens is a non-silicone hydrogel contact lens (or so-called a conventional hydrogel contact lens).

Preformed non-silicone hydrogel contact lenses can be any commercially-available non-silicone hydrogel contact lenses or can be produced according to any known methods. For example, for production of preformed non-silicone hydrogel contact lenses, a non-silicone hydrogel lens formulation for cast-molding or spin-cast molding or for making rods used in lathe-cutting of contact lenses typically is: either (1) a monomer mixture comprising (a) at least one hydrophilic vinylic monomer (e.g., hydroxyethyl methacrylate, glycerol methacrylate, N-vinylpyrrolidone, or combinations thereof) and (b) at least one component selected from the group consisting of a crosslinking agent, a hydrophobic vinylic monomer, a lubricating agent (or so-called internal wetting agents incorporated in a lens formulation), a free-radical initiator (photoinitiator or thermal initiator), a UV-absorbing vinylic monomer, a high-energy-violet-light ("HEVL") absorbing vinylic monomer, a visibility tinting agent (e.g., reactive dyes, polymerizable dyes, pigments, or mixtures thereof), antimicrobial agents (e.g., preferably silver nanoparticles), a bioactive agent, and combinations thereof; or (2) an aqueous solution comprising one or more water-soluble prepolymers and at least one component selected from the group consisting of hydrophilic vinylic monomer, a crosslinking agent, a hydrophobic vinylic monomer, a lubricating agent (or so-called internal wetting agents incorporated in a lens formulation), a free-radical initiator (photoinitiator or thermal initiator), a UV-absorbing vinylic monomer, a HEVL absorbing vinylic monomer, a visibility tinting agent (e.g., reactive dyes, polymerizable dyes, pigments, or mixtures thereof), antimicrobial agents (e.g., preferably silver nanoparticles), a bioactive agent, and combinations thereof. Resultant preformed hydrogel contact lenses then can be subjected to extraction with an extraction solvent to remove unpolymerized components from the resultant lenses and to hydration process, as known by a person skilled in the art. It is understood that a lubricating agent present in a hydrogel lens formulation can improve the lubricity of preformed hydrogel contact lenses compared to the lubricity of control preformed hydrogel contact lenses obtained from a control hydrogel lens formulation without the lubricating agent.

Examples of water-soluble prepolymers include without limitation: a water-soluble crosslinkable poly(vinyl alcohol) prepolymer described in U.S. Pat. Nos. 5,583,163 and 6,303,687; a water-soluble vinyl group-terminated polyurethane prepolymer described in U.S. Pat. No. 6,995,192; derivatives of a polyvinyl alcohol, polyethyleneimine or polyvinylamine, which are disclosed in U.S. Pat. No. 5,849,841; a water-soluble crosslinkable polyurea prepolymer described in U.S. Pat. Nos. 6,479,587 and 7,977,430; crosslinkable polyacrylamide; crosslinkable statistical copolymers of vinyl lactam, MMA and a comonomer, which are disclosed in U.S. Pat. No. 5,712,356; crosslinkable copolymers of vinyl lactam, vinyl acetate and vinyl alcohol, which are disclosed in U.S. Pat. No. 5,665,840; polyether-polyester copolymers with crosslinkable side chains which are disclosed in U.S. Pat. No. 6,492,478; branched polyalkylene glycol-urethane prepolymers disclosed in U.S. Pat. No. 6,165,408; polyalkylene glycol-tetra(meth)acrylate prepolymers disclosed in U.S. Pat. No. 6,221,303; crosslinkable polyallylamine gluconolactone prepolymers disclosed in U.S. Pat. No. 6,472,489.

Numerous non-silicone hydrogel lens formulations have been described in numerous patents and patent applications published by the filing date of this application and have been used in producing commercial non-silicone hydrogel contact lenses. Examples of commercial non-silicone hydrogel contact lenses include, without limitation, alfafilcon A, acofilcon A, deltafilcon A, etafilcon A, focofilcon A, helfilcon A, helfilcon B, hilafilcon B, hioxifilcon A, hioxifilcon B, hioxifilcon D, methafilcon A, methafilcon B, nelfilcon A, nesofilcon A, ocufilcon A, ocufilcon B, ocufilcon C, ocufilcon D, omafilcon A, phemfilcon A, polymacon, samfilcon A, telfilcon A, tetrafilcon A, and vifilcon A.

In a preferred embodiment, the inner layer is composed of a non-silicone hydrogel material which comprises at least 50% by mole of repeating units of at least one hydroxyl-containing vinylic monomer, preferably selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof, more preferably selected from the group consisting of hydroxyethyl (meth)acrylate, glycerol (meth)acrylate, and vinyl alcohol. The mole percentages of repeating units can be calculated based on a non-silicone hydrogel lens formulation for making the non-silicone hydrogel contact lens.

In another preferred embodiment, a preformed contact lens is a silicone hydrogel contact lens, preferably a naturally-wettable silicone hydrogel contact lens.

Preformed silicone hydrogel contact lenses can be any commercially-available silicone hydrogel contact lenses or can be produced according to any known methods. For example, for production of preformed silicone hydrogel (SiHy) contact lenses, a SiHy lens formulation for cast-molding or spin-cast molding or for making SiHy rods used in lathe-cutting of contact lenses generally comprises at least one components selected from the group consisting of a silicone-containing vinylic monomer, a silicone-containing vinylic crosslinker, a silicone-containing prepolymer, a hydrophilic vinylic monomer, a hydrophobic vinylic monomer, a non-silicone vinylic crosslinker, a free-radical initiator (photoinitiator or thermal initiator), a silicone-containing prepolymer, and combination thereof, as well known to a person skilled in the art. Resultant preformed SiHy contact lenses then can be subjected to extraction with an extraction solvent to remove unpolymerized components from the resultant lenses and to hydration process, as known by a person skilled in the art. In addition, a preformed SiHy contact lens can be a colored contact lens (i.e., a SiHy contact lens having at least one colored patterns printed thereon as well known to a person skilled in the art).

In accordance with the invention, a silicone-containing vinylic monomer can be any silicone-containing vinylic monomer known to a person skilled in the art. Examples of preferred silicone-containing vinylic monomers include without limitation vinylic monomers each having a bis (trialkylsilyloxy)alkylsilyl group or a tris(trialkylsilyloxy) silyl group, polysiloxane vinylic monomers, polycarbosiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

Examples of preferred vinylic monomers each having a bis(trialkylsilyloxy)alkylsilyl group or a tris(trialkylsilyloxy)silyl group include without limitation tris(trimethylsilyloxy)silylpropyl (meth)acrylate, [3-(meth)acryloxy-2-hydroxypropyloxy]propylbis(trimethylsiloxy)methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy)methylsilane, 3-(meth)acryloxy-2-hydroxypropyloxy)propyltris(trimethylsiloxy)silane, N-[tris(trimethylsiloxy)silylpropyl]-(meth) acrylamide, N-(2-hydroxy-3-(3-(bis(trimethylsilyloxy) methylsilyl)propyloxy)propyl)-2-methyl (meth)acrylamide, N-(2-hydroxy-3-(3-(bis(trimethylsilyloxy)methylsilyl)propyloxy)propyl) (meth)acrylamide, N-(2-hydroxy-3-(3-(tris (trimethylsilyloxy)silyl)propyloxy)propyl)-2-methyl acrylamide, N-(2-hydroxy-3-(3-(tris(trimethylsilyloxy)silyl) propyloxy)propyl) (meth)acrylamide, N-[tris (dimethylpropylsiloxy)silylpropyl]-(meth)acrylamide, N-[tris(dimethylphenylsiloxy)silylpropyl] (meth)acrylamide, N-[tris(dimethylethylsiloxy)silylpropyl] (meth)acrylamide, N,N-bis[2-hydroxy-3-(3-(bis(trimethylsilyloxy) methylsilyl)propyloxy)propyl]-2-methyl (meth)acrylamide, N,N-bis[2-hydroxy-3-(3-(bis(trimethylsilyloxy)methylsilyl) propyloxy)propyl] (meth)acrylamide, N,N-bis[2-hydroxy-3-(3-(tris(trimethylsilyloxy)silyl)propyloxy)propyl]-2-methyl (meth)acrylamide, N,N-bis[2-hydroxy-3-(3-(tris(trimethylsilyloxy)silyl)propyloxy)propyl] (meth)acrylamide, N-[2-hydroxy-3-(3-(t-butyldimethylsilyl)propyloxy)propyl]-2-methyl (meth)acrylamide, N-[2-hydroxy-3-(3-(t-butyldimethylsilyl)propyloxy)propyl] (meth)acrylamide, N,N-bis[2-hydroxy-3-(3-(t-butyldimethylsilyl)propyloxy) propyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl]propyl allyl carbamate, 3-[tris (trimethylsiloxy)silyl]propyl vinyl carbonate, those disclosed in U.S. Pat. Nos. 9,097,840, 9,103,965 and 9,475, 827, and mixtures thereof. The above preferred silicone-containing vinylic monomers can be obtained from commercial suppliers or can be prepared according to procedures described in U.S. Pat. Nos. 7,214,809, 8,475,529, 8,658,748, 9,097,840, 9,103,965, and 9,475,827.

Examples of preferred polysiloxane vinylic monomers include without limitation mono-(meth)acryloyl-terminated, monoalkyl-terminated polysiloxanes of formula (I) include without limitation α-(meth)acryloxypropyl terminated ω-butyl (or ω-methyl) terminated polydimethylsiloxane, α-(meth)acryloxy-2-hydroxypropyloxypropyl terminated ω-butyl (or ω-methyl) terminated polydimethylsiloxane, α-(2-hydroxyl-methacryloxypropyloxypropyl)-ω-butyl-decamethylpentasiloxane, α-[3-(meth)acryloxyethoxy-2-hydroxypropyloxypropyl]-terminated ω-butyl (or ω-methyl) terminated polydimethylsiloxane, α-[3-(meth)acryloxy-propyloxy-2-hydroxypropyloxypropyl]-terminated ω-butyl (or ω-methyl) terminated polydimethylsiloxane, α-[3-(meth) acryloxyisopropyloxy-2-hydroxypropyloxypropyl]-terminated ω-butyl (or ω-methyl) terminated polydimethylsiloxane, α-[3-(meth)acryloxybutyloxy-2-hydroxypropyloxypropyl]-terminated ω-butyl (or ω-methyl) terminated polydimethylsiloxane, α-[3-(meth)acryloxyethylamino-2-hydroxypropyloxypropyl]-terminated ω-butyl (or ω-methyl) terminated polydimethylsiloxane, α-[3-(meth)acryloxypropylamino-2-hydroxypropyloxypropyl]-terminated ω-butyl (or ω-methyl) terminated polydimethylsiloxane, α-[3-(meth)acryloxy-butylamino-2-hydroxypropyloxypropyl]-terminated ω-butyl (or ω-methyl) terminated polydimethylsiloxane, α-(meth)acryloxy(polyethylenoxy)-2-hydroxypropyloxypropyl]-terminated ω-butyl (or ω-methyl) terminated polydimethylsiloxane, α-[(meth)acryloxy-2-hydroxypropyloxy-ethoxypropyl]-terminated ω-butyl (or ω-methyl) terminated polydimethylsiloxane, α-[(meth)acryloxy-2-hydroxypropyl-N-ethylaminopropyl]-terminated ω-butyl (or ω-methyl) terminated polydimethylsiloxane, α-[(meth)acryloxy-2-hydroxypropyl-aminopropyl]-terminated ω-butyl (or ω-methyl) terminated polydimethylsiloxane, α-[(meth)acryloxy-2-hydroxypropyloxy-(polyethylenoxy)propyl]-terminated ω-butyl (or ω-methyl) terminated polydimethylsiloxane, α-(meth)acryloylamidopropyloxypropyl terminated ω-butyl (or ω-methyl) terminated polydimethylsiloxane, α-N-methyl-(meth)acryloylamidopropyloxypropyl terminated ω-butyl (or ω-methyl) terminated polydimethylsiloxane, α-[3-(meth)acrylamidoethoxy-2-hydroxypropyloxy-propyl]-terminated ω-butyl (or ω-methyl) polydimethylsiloxane, α-[3-(meth)acrylamidopropyloxy-2-hydroxypropyloxypropyl]-terminated ω-butyl (or ω-methyl) terminated polydimethylsiloxane, α-[3-(meth)acrylamidoisopropyloxy-2-hydroxypropyloxypropyl]-terminated ω-butyl (or ω-methyl) terminated polydimethylsiloxane, α-[3-(meth)acrylamidobutyloxy-2-hydroxypropyloxypropyl]-terminated ω-butyl (or ω-methyl) terminated polydimethylsiloxane, α-[3-(meth)acryloylamido-2-hydroxypropyloxypropyl] terminated ω-butyl (or ω-methyl) polydimethylsiloxane, α-[3-[N-methyl-(meth)acryloylamido]-2-hydroxypropyloxypropyl] terminated ω-butyl (or ω-methyl) terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy)dimethylbutylsilane, mono-vinyl carbonate-terminated mono-alkyl-terminated polydimethylsiloxanes, mono-vinyl carbamate-terminated mono-alkyl-terminated polydimethylsiloxane, those disclosed in U.S. Pat. Nos. 9,097,840 and 9,103,965, and mixtures thereof. The above preferred polysiloxanes vinylic monomers can be obtained from commercial suppliers (e.g., Shin-Etsu, Gelest, etc.) or prepared according to procedures described in patents, e.g., U.S. Pat. Nos. 6,867,245, 8,415,405, 8,475,529, 8,614,261, and 9,217,813, or by reacting a hydroxyalkyl (meth)acrylate or (meth)acrylamide or a (meth)acryloxypolyethylene glycol with a mono-epoxypropyloxypropyl-terminated polydimethylsiloxane, by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane, or by reacting isocyanatoethyl (meth)acrylate with a mono-carbinol-terminated polydimethylsiloxane according to coupling reactions well known to a person skilled in the art.

Any polycarbosiloxane vinylic monomers can be used in the invention. Examples of preferred polycarbosiloxane vinylic monomers include without limitation those disclosed in U.S. Pat. Nos. 7,915,323 and 8,420,711 and in U.S. Pat. Appl. Pub. Nos. 2012/244088A1 and 2012/245249A1.

Any suitable silicone-containing vinylic crosslinkers can be used in the invention. Examples of preferred silicone-containing vinylic crosslinkers include without limitation polysiloxane vinylic crosslinkers, polycarbosiloxane vinylic crosslinkers, and combinations thereof.

Any suitable polysiloxane vinylic crosslinkers can be used in the invention. Examples of preferred polysiloxane vinylic crosslinkers are di-(meth)acryloyl-terminated polydimethylsiloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha, omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264; polysiloxane-containing macromers disclosed in U.S. Pat. Nos. 4,259,467, 4,260,725, and 4,261,875.

Examples of preferred di-(meth)acryloyloxy-terminated polysiloxane vinylic crosslinkers includes without limitation the reaction products of glycidyl methacrylate with di-amino-terminated polydimethylsiloxanes; the reaction products of glycidyl methacrylate with di-hydroxyl-terminated polydimethylsiloxanes; the reaction products of isocyantoethyl (meth)acrylate with di-hydroxyl-terminated polydimethylsiloxanes; di-(meth)acryloyloxy-terminated polysiloxane vinylic crosslinkers each having hydrophilized siloxane units each having one methyl substituent and one monovalent $C_4$-$C_{40}$ organic radical substituent having 2 to 6 hydroxyl groups as disclosed in U.S. patent Ser. No. 10/081,697; chain-extended polysiloxabe vinylic crosslinkers disclosed in US201008843A1 and US20120088844A1; chain-extended polysiloxane vinylic crosslinkers described in U.S. Pat. Nos. 5,034,461, 5,416,132, 5,449,729, 5,760,100, 7,423,074, and 8,529,057; chain-extended polysiloxane vinylic crosslinkers described in U.S. Pat. App. Pub. No. 2018-0100053; chain-extended polysiloxane vinylic crosslinkers described in U.S. Pat. App. Pub. No. 2018-0100038; chain-extended polysiloxane vinylic crosslinkers described in U.S. Pat. No. 8,993,651; α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane.

Any polycarbosiloxane vinylic crosslinkers can be used in the invention. Examples of preferred polycarbosiloxane vinylic crosslinkers include without limitation those disclosed in U.S. Pat. Nos. 7,915,323 and 8,420,711 and in U.S. Pat. Appl. Pub. Nos. 2012/0244088 and 2012/0245249.

Any hydrophilic vinylic monomers can be used in the invention. Examples of preferred hydrophilic vinylic monomers are alkyl (meth)acrylamides (as described below), hydroxyl-containing acrylic monomers (as described below), amino-containing acrylic monomers (as described below), carboxyl-containing acrylic monomers (as described below), N-vinyl amide monomers (as described below), methylene-containing pyrrolidone monomers (i.e., pyrrolidone derivatives each having a methylene group connected to the pyrrolidone ring at 3- or 5-position) (as described below), acrylic monomers having a $C_1$-$C_4$ alkoxyethoxy group (as described below), vinyl ether monomers (as described below), allyl ether monomers (as described below), phosphorylcholine-containing vinylic monomers (as described below), N-2-hydroxyethyl vinyl carbamate, N-carboxyvinyl-β-alanine (VINAL), N-carboxyvinyl-α-alanine, and combinations thereof.

Examples of alkyl (meth)acrylamides includes without limitation (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof.

Examples of hydroxyl-containing acrylic monomers include without limitation N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol) ethyl (meth)acrylamide having a number average molecular weight of up to 1500, and combinations thereof.

Examples of amino-containing acrylic monomers include without limitation N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth) acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth) acrylate, 3-amino-2-hydroxypropyl (meth)acrylate, trimethylammonium 2-hydroxy propyl (meth)acrylate hydrochloride, dimethylaminoethyl (meth)acrylate, and combinations thereof.

Examples of carboxyl-containing acrylic monomers include without limitation 2-(meth)acrylamidoglycolic acid, (meth)acrylic acid, ethylacrylic acid, and combinations thereof.

Examples of preferred N-vinyl amide monomers include without limitation N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, or combinations thereof.

Examples of preferred methylene-containing ($=CH_2$) pyrrolidone monomers include without limitations 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

Examples of preferred acrylic monomers having a $C_1$-$C_4$ alkoxyethoxy group include without limitation ethylene glycol methyl ether (meth)acrylate, di(ethylene glycol)methyl ether (meth)acrylate, tri(ethylene glycol)methyl ether (meth)acrylate, tetra(ethylene glycol)methyl ether (meth) acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, and combinations thereof.

Examples of preferred vinyl ether monomers include without limitation ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol)methyl vinyl ether, tri(ethylene glycol)methyl vinyl ether, tetra(ethylene glycol)methyl vinyl ether, poly(ethylene glycol)methyl vinyl ether, and combinations thereof.

Examples of preferred allyl ether monomers include without limitation allyl alcohol, ethylene glycol monoallyl ether, di(ethylene glycol) monoallyl ether, tri(ethylene glycol) monoallyl ether, tetra(ethylene glycol) monoallyl ether, poly (ethylene glycol) monoallyl ether, ethylene glycol methyl allyl ether, di(ethylene glycol)methyl allyl ether, tri(ethylene glycol)methyl allyl ether, tetra(ethylene glycol)methyl allyl ether, poly(ethylene glycol)methyl allyl ether, and combinations thereof.

Examples of preferred phosphorylcholine-containing vinylic monomers include without limitation (meth)acryloyloxyethyl phosphorylcholine (aka, MPC, or 2-((meth)acryloyloxy)ethyl-2'-(trimethylammonio)ethylphosphate), (meth)acryloyloxypropyl phosphorylcholine (aka, 3-((meth)acryloyloxy)propyl-2'-(trimethylammonio)ethylphosphate), 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio)ethylphosphate, 5-((meth)acryloyloxy)pentyl-2'-(trimethylammonio)ethyl phosphate. 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl- 2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate. 2-((meth)acryloyloxy)butyl-2'-(trimethylammonio)ethylphosphate. 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate. 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof.

In accordance with the invention, any hydrophobic vinylic monomers can be in this invention. Examples of preferred hydrophobic vinylic monomers include methyl (meth)acrylate, ethyl (meth)acrylate, propyl (meth)acrylate, isopropyl (meth)acrylate, cyclohexyl (meth)acrylate, 2-ethylhexyl (meth)acrylate, vinyl acetate, vinyl propionate, vinyl butyrate, vinyl valerate, styrene, chloroprene, vinyl chloride, vinylidene chloride, (meth)acrylonitrile, 1-butene, butadiene, vinyl toluene, vinyl ethyl ether, perfluorohexylethyl-thio-carbonyl-aminoethyl-methacrylate, isobornyl (meth)acrylate, trifluoroethyl (meth)acrylate, hexafluoro-isopropyl (meth)acrylate, hexafluorobutyl (meth)acrylate, and combinations thereof.

In accordance with the invention, any non-silicone vinylic crosslinkers can be in this invention. Examples of preferred non-silicone vinylic cross-linking agents include without limitation ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)]di-(meth)acrylate, bis[2-(meth)acryloxyethyl]phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, and combinations thereof. A preferred non-silicone vinylic cross-linking agent is tetra(ethyleneglycol) di-(meth)acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, triallyl cyanurate, and combinations thereof.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof.

Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl) peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis (2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959@, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329.

Any silicon-containing prepolymers comprising hydrophilic segments and hydrophobic segments can be used in the invention. Examples of such silicone-containing prepolymers include those described in U.S. Pat. Nos. 6,039,913, 7,091,283, 7,268,189, 7,238,750, 7,521,519, 8,383,744, and 8,642,712; and U.S. Pat. Appl. Pub. Nos. 2008/0015315A1, 2008/0143958A1, 2008/0143003A1, 2008/0234457A1, 2008/0231798A1.

A SiHy contact lens formulation can also comprise other necessary components known to a person skilled in the art, such as, for example, a UV-absorbing vinylic monomer, a HEVL-absorbing vinylic monomer, a visibility tinting agent (e.g., reactive dyes, polymerizable dyes, pigments, or mixtures thereof, as well known to a person skilled in the art), antimicrobial agents (e.g., preferably silver nanoparticles), a bioactive agent, leachable lubricants, leachable tear-stabilizing agents, and mixtures thereof, as known to a person skilled in the art.

In accordance with a preferred embodiment of the invention, a preformed silicone hydrogel contact lens of the invention can further comprise (but preferably comprises) repeating units of one or more UV-absorbing vinylic monomers and optionally (but preferably) one or more UV/HEVL-absorbing vinylic monomers. The term "UV/HEVL-absorbing vinylic monomer" refers to a vinylic monomer that can absorb UV light and high-energy-violet-light (i.e., light having wavelength between 380 nm and 440 nm.

Any suitable UV-absorbing vinylic monomers and UV/HEVL-absorbing vinylic monomers can be used in a polymerizable composition for preparing a preformed SiHy contact lens of the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acryloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9CI) (CAS #83063-87-0). In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

Where a vinylic monomer capable of absorbing ultraviolet radiation and high energy violet light (HEVL) is used in the invention, a Germanium-based Norrish Type I photoinitiator and a light source including a light in the region of about 400 to about 550 nm are preferably used to initiate a free-radical polymerization. Any Germanium-based Norrish Type I photoinitiators can be used in this invention, so long as they are capable of initiating a free-radical polymerization under irradiation with a light source including a light in the region of about 400 to about 550 nm. Examples of Germane-based Norrish Type I photoinitiators are acylgermanium compounds described in U.S. Pat. No. 7,605,190.

The bioactive agent is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptadine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid) and non-crossllinkable hydrophilic polymers (i.e., without ethylenically unsaturated groups). Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof. The number average molecular weight Mn of the non-crosslinkable hydrophilic polymer is preferably from 5,000 to 1,000,000.

Examples of leachable tear-stabilizing agents include, without limitation, phospholipids, monoglycerides, diglycerides, triglycerides, glycolipids, glyceroglycolipids, sphingolipids, sphingo-glycolipids, fatty alcohols, fatty acids, mineral oils, and mixtures thereof. Preferably, a tear stabilizing agent is a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof.

A polymerizable composition (SiHy lens formulation) can be a solventless clear liquid prepared by mixing all polymerizable components and other necessary component or a solution prepared by dissolving all of the desirable components in any suitable solvent, such as, a mixture of water and one or more organic solvents miscible with water, an organic solvent, or a mixture of one or more organic solvents, as known to a person skilled in the art. The term "solvent" refers to a chemical that cannot participate in free-radical polymerization reaction.

A solventless lens SiHy lens formulation typically comprises at least one blending vinylic monomer as a reactive solvent for dissolving all other polymerizable components of the solventless SiHy lens formulation. Examples of preferred blending vinylic monomers include $C_1$-$C_{10}$ alkyl (meth)acrylate (e.g., methyl (meth)acrylate, ethyl (meth)acrylate, propyl (meth)acrylate, isopropyl (meth)acrylate, 2-ethylhexyl (meth)acrylate, pentyl (meth)acrylate, hexyl (meth)acrylate, etc.), cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof. Preferably, methyl methacrylate is used as a blending vinylic monomer in preparing a solventless SiHy lens formulation.

Any solvents can be used in the invention. Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

Numerous SiHy lens formulations have been described in numerous patents and patent applications published by the filing date of this application and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, and stenfilcon A.

A SiHy lens formulation (i.e., polymerizable composition) can be cured (polymerized) thermally or actinically as known to a person skilled in the art, preferably in molds for cast molding of contact lenses.

The thermal polymerization is carried out conveniently, for example at a temperature of from 25 to 120° C. and preferably 40 to 100° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere.

The actinic polymerization can then be triggered off by actinic radiation, for example light, in particular UV light or visible light of a suitable wavelength. The spectral requirements can be controlled accordingly, if appropriate, by addition of suitable photosensitizers.

In a preferred embodiment, the inner layer or the lens bulk material is composed of a silicone hydrogel material which comprises repeating units of at least one polysiloxane vinylic monomer (preferably selected from those described above) and repeating units of at least one hydrophilic vinylic monomer (preferably selected from those described above).

In a preferred embodiment, the inner layer or the lens bulk material is composed of a silicone hydrogel material which comprises repeating units of at least one polysiloxane vinylic crosslinker (preferably selected from those described above) and repeating units of at least one hydrophilic vinylic monomer (preferably selected from those described above).

In a preferred embodiment, the inner layer or the lens bulk material is composed of a silicone hydrogel material which comprises repeating units of at least one polysiloxane vinylic monomer (preferably selected from those described above) and repeating units of at least one hydrophilic N-vinyl amide monomer (preferably selected from those described above).

In a preferred embodiment, the inner layer or the lens bulk material is composed of a silicone hydrogel material which comprises repeating units of at least one polysiloxane vinylic crosslinker (preferably selected from those described above) and repeating units of at least one hydrophilic N-vinyl amide monomer (preferably selected from those described above).

In a preferred embodiment, the inner layer or the lens bulk material is composed of a silicone hydrogel material which comprises repeating units of at least one polycarbosiloxane vinylic monomer (preferably selected from those described above) and repeating units of at least one hydrophilic vinylic monomer (preferably selected from those described above).

In a preferred embodiment, the inner layer or the lens bulk material is composed of a silicone hydrogel material which comprises repeating units of at least one polycarbosiloxane vinylic crosslinker (preferably selected from those described above) and repeating units of at least one hydrophilic vinylic monomer (preferably selected from those described above).

In a preferred embodiment, the inner layer or the lens bulk material is composed of a silicone hydrogel material which comprises repeating units of at least one polycarbosiloxane vinylic monomer (preferably selected from those described above) and repeating units of at least one hydrophilic N-vinyl amide monomer (preferably selected from those described above).

In a preferred embodiment, the inner layer or the lens bulk material is composed of a silicone hydrogel material which comprises repeating units of at least one polycarbosiloxane vinylic crosslinker (preferably selected from those described above) and repeating units of at least one hydrophilic N-vinyl amide monomer (preferably selected from those described above).

In a preferred embodiment, the inner layer or the lens bulk material is composed of a silicone hydrogel material which comprises repeating units of at least one silicone-containing vinylic monomer having a bis(trialkylsilyloxy)alkylsilyl or tris(trialkylsilyloxy)silyl group (preferably selected from those described above) and repeating units of at least one hydrophilic vinylic monomer (preferably selected from those described above).

In a preferred embodiment, the inner layer or the lens bulk material is composed of a silicone hydrogel material which comprises repeating units of at least one polycarbosiloxane vinylic crosslinker (preferably selected from those described above), repeating units of at least one silicone-containing vinylic monomer having a bis(trialkylsilyloxy)alkylsilyl or tris(trialkylsilyloxy)silyl group (preferably selected from those described above), and repeating units of at least one hydrophilic vinylic monomer (preferably selected from those described above).

In a preferred embodiment, the inner layer or the lens bulk material is composed of a silicone hydrogel material which comprises repeating units of at least one silicone-containing vinylic monomer having a bis(trialkylsilyloxy)alkylsilyl or tris(trialkylsilyloxy)silyl group (preferably selected from those described above) and repeating units of at least one hydrophilic N-vinyl amide monomer (preferably selected from those described above).

In a preferred embodiment, the inner layer or the lens bulk material is composed of a silicone hydrogel material which comprises repeating units of at least one polycarbosiloxane vinylic crosslinker (preferably selected from those described above), repeating units of at least one silicone-containing vinylic monomer having a bis(trialkylsilyloxy)alkylsilyl or tris(trialkylsilyloxy)silyl group (preferably selected from those described above), and repeating units of at least one hydrophilic N-vinyl amide monomer (preferably selected from those described above).

In accordance with any one of the preferred embodiments of the invention, the inner layer or the lens bulk material is composed of a silicone hydrogel material which further comprise repeating units of one or more blending vinylic monomers, preferably in an amount of about 25% or less by weight (preferably about 20% or less by weight, more preferably about 15% or less by weight, relative to the dry weight of the inner layer of the silicone hydrogel material. The amount of the repeating units of a blending vinylic monomer can be calculated based on the amount of the blending vinylic monomer in a polymerizable composition used for preparing the preformed silicone hydrogel contact lens (i.e., the inner layer) over the total amount of all polymerizable components in the polymerizable composition.

In accordance with any one of the preferred embodiments of the invention, the inner layer or the lens bulk material is composed of a silicone hydrogel material which further comprises repeating units of one or more non-silicone vinylic crosslinking agents (preferably selected from those described above), preferably in an amount of about 1.0% or less (preferably about 0.8% or less, more preferably from about 0.05% to about 0.6%) by weight relative to the dry weight of the inner layer. The amount of the repeating units of a non-silicone vinylic crosslinking agent can be calculated based on the amount of the non-silicone vinylic crosslinking agent in a polymerizable composition used for preparing the preformed silicone hydrogel contact lens (i.e., the inner layer) over the total amount of all polymerizable components in the polymerizable composition.

In accordance with any one of the preferred embodiments of the invention, the inner layer or the lens bulk material is composed of a naturally-wettable silicone hydrogel material (i.e., a preformed silicone hydrogel contact lens which is naturally wettable without being subjected to any post-curing surface treatment). Naturally-wettable preformed SiHy contact lenses are disclosed in U.S. Pat. Nos. 6,367,929, 6,822,016, 7,052,131, 7,249,848, 6,867,245, 7,268,198, 7,540,609, 7,572,841, 7,750,079, 7,934,830, 8,231,218, 8,367,746, 8,445,614, 8,481,662, 8,487,058, 8,513,325, 8,703,891, 8,820,928, 8,865,789, 8,937,110, 8,937,111, 9,057,821, 9,057,822, 9,121,998, 9,125,808, 9,140,825, 9,140,908, 9,156,934, 9,164,298, 9,170,349, 9,188,702, 9,217,813, 9,296,159, 9,322,959, 9,322,960, 9,360,594, and 9,529,119; and in U.S. patent application Ser. Nos. 16/000,930 and 16/000,933.

In accordance with the invention, the silicone hydrogel material of the inner layer (or the lens bulk material) has an oxygen permeability of at least about 50, preferably at least about 60, more preferably at least about 70, even more preferably at least about 90 barrers, most preferably at least about 110 Barrers. The silicone hydrogel material can also have an equilibrium water content of from about 10% to about 70%, preferably from about 10% to about 65%, more preferably from about 10% to about 60%; even more preferably from about 15% to about 55%, most preferably from about 15% to about 50% by weight. The silicone hydrogel material can further have a bulk elastic modulus or bulk Young Modulus (hereinafter the terms, "softness," "elastic modulus," and "Young's modulus" are interchangeably used in this application to mean bulk elastic modulus if the term is not modified by the word "surface.") of from about 0.3 MPa to about 1.8 MPa, preferably from 0.4 MPa to about 1.5 MPa, more preferably from about 0.5 MPa to about 1.2 MPa. The oxygen permeability, elastic modulus and water content of the inner layer of the silicone hydrogel material of a contact lens of the invention can be determined by measuring the oxygen permeability, the elastic modulus and water content of the preformed SiHy lens from which the inner layer is derived. It is understood that as a reasonable approximation, the elastic modulus of a SiHy contact lens of the invention can be considered to be the elastic modulus of the silicone hydrogel material of the inner layer, because of the much thinner outer hydrogel layers. A person skilled in the art knows well how to determine the elastic modulus and water content of a silicone hydrogel material or a SiHy contact lens. For example, all commercial SiHy contact lenses have reported values of oxygen permeability, elastic modulus and water content.

In accordance with the various aspects of the invention, the thickness of the outer surface hydrogel layer, the anterior outer surface hydrogel layer, and the posterior outer surface hydrogel layer varies depending upon the inner layer or lens bulk material of a contact lens of the invention, in order to provide adequate wearing comfort and to shield the exposure of underlying lens bulk material to the eye for ensuring the biocompatibility of the contact lens.

Where the inner layer or the lens bulk material is a hard plastic material (a preformed hard contact lens) or a rigid gas permeable lens material (i.e., a preformed rigid gas permeable contact lens), the thickness of the outer surface hydrogel layer, the anterior outer surface hydrogel layer, and the posterior outer surface hydrogel layer are from about 1.0 µm to about 20 µm, preferably from about 2.0 µm to about 15 µm, more preferably from about 2.0 µm to about 10 µm, even more preferably from about 2.5 µm to about 8 µm.

Where the inner layer or the lens bulk material is a crosslinked silicone material (i.e., a preformed silicone contact lens), the thickness of the outer surface hydrogel layer, the anterior outer surface hydrogel layer, and the posterior outer surface hydrogel layer are from about 2.0 µm to about 25 µm, preferably from about 3.0 µm to about 25 µm, more preferably from about 4.0 µm to about 20 µm, even more preferably from about 5.0 µm to about 20 µm.

Where the inner layer or the lens bulk material is a crosslinked non-silicone hydrogel material (i.e., a preformed non-silicone hydrogel contact lens), the thickness of the outer surface hydrogel layer, the anterior outer surface hydrogel layer, and the posterior outer surface hydrogel layer are from about 0.25 µm to about 20 µm, preferably from about 0.50 µm to about 15 µm, more preferably from about 0.5 µm to about 10 µm, even more preferably from about 0.5 µm to about 6 µm.

Where the inner layer or the lens bulk material is a silicone hydrogel material (i.e., a preformed silicone hydrogel contact lens) which is not naturally wettable, the thickness of the outer surface hydrogel layer, the anterior outer surface hydrogel layer, and the posterior outer surface hydrogel layer are from about 0.5 µm to about 25 µm, preferably from about 1.0 µm to about 20 µm, more preferably from about 1.0 µm to about 15 µm, even more preferably from about 1.5 µm to about 10 µm.

Where the inner layer or the lens bulk material is a crosslinked silicone hydrogel material (i.e., a preformed silicone hydrogel contact lens) which is naturally wettable, the thickness of the outer surface hydrogel layer, the anterior outer surface hydrogel layer, and the posterior outer surface hydrogel layer are from about 0.25 µm to about 20 µm, preferably from about 0.5 µm to about 20 µm, more preferably from about 0.5 µm to about 15 µm, even more preferably from about 1.0 µm to about 10 µm.

The anterior and posterior outer hydrogel layers of a contact lens of the invention preferably are substantially identical to each other (i.e., becoming the outer surface hydrogel layer) and are a crosslinked coating which is applied onto a preformed contact lens.

In a preferred embodiment, the anterior and posterior outer hydrogel layers and the outer surface hydrogel layer independent of each other are a crosslinked polymeric material which comprises at least 25% by mole (preferably at least 35% by mole, more preferably at least 45% by mole, even more preferably at least 55% by mole) of repeating monomeric units of at least one hydrophilic vinylic monomer selected from the group consisting of alkyl (meth)acrylamides (any one described above), N-2-dimethylaminoethyl (meth)acrylamide, dimethylaminoethyl (meth)acrylate, hydroxyl-containing acrylic monomers (any one described above), N-vinyl amide monomers (any one described above), methylene-containing pyrrolidone monomers (i.e., pyrrolidone derivatives each having a methylene group connected to the pyrrolidone ring at 3- or 5-position) (any one described above), (meth)acrylate monomers having a $C_1$-$C_4$ alkoxyethoxy group (any one described above), vinyl ether monomers (any one described above), allyl ether monomers (any one described above), and combinations thereof (preferably selected from the group consisting of (meth)acrylamide, dimethyl (meth)acrylamide, N-2-hydroxylethyl (meth)acrylamide, N,N-bis(hydroxyethyl) (meth)acrylamide, N-2,3-dihydroxypropyl (meth)acrylamide, N-tris(hydroxymethyl)methyl (meth)acrylamide, 2-hydroxyethyl (meth)acrylate, glycerol methacrylate (GMA), tetra(ethylene glycol) (meth)acrylate, poly(ethylene glycol) ethyl (meth)acrylamide having a number average molecular weight of up to 1500, poly(ethylene glycol) (meth)acrylate having a number average molecular weight of up to 1500, N-vinylpyrrolidone, N-vinyl-N-methyl acetamide, N-vinyl formamide, N-vinyl acetamide, 1-methyl-3-methylene-2-pyrrolidone, 1-methyl-5-methylene-2-pyrrolidone, 5-methyl-3-methylene-2-pyrrolidone, tetra(ethylene glycol) methyl ether (meth)acrylate, methoxypoly(ethylene glycol) ethyl (meth)acrylamide having a number average molecular weight of up to 1500, $C_1$-$C_4$-alkoxy polyethylene glycol (meth)acrylate having a weight average molecular weight of up to 1500, tetra(ethylene glycol) monovinyl ether, poly (ethylene glycol) monovinyl ether, tetra(ethylene glycol) methyl vinyl ether, poly(ethylene glycol)methyl vinyl ether, tetra(ethylene glycol) monoallyl ether, poly(ethylene glycol) monoallyl ether, tetra(ethylene glycol)methyl allyl ether, poly(ethylene glycol)methyl allyl ether, vinyl alcohol, allyl alcohol, and combinations thereof, more preferably selected from the group consisting of (meth)acrylamide, dimethyl (meth)acrylamide, N-2-hydroxylethyl (meth)acrylamide, N,N-bis(hydroxyethyl) (meth)acrylamide, N-2,3-dihydroxypropyl (meth)acrylamide, N-tris(hydroxymethyl) methyl (meth)acrylamide, 2-hydroxyethyl (meth)acrylate, glycerol methacrylate (GMA), poly(ethylene glycol)ethyl (meth)acrylamide having a number average molecular weight of up to 1500, poly(ethylene glycol) (meth)acrylate having a number average molecular weight of up to 1500, N-vinylpyrrolidone, N-vinyl-N-methyl acetamide, methoxypoly(ethylene glycol)ethyl (meth)acrylamide having a number average molecular weight of up to 1500, methoxy polyethylene glycol (meth)acrylate having a weight average molecular weight of up to 1500, poly(ethylene glycol) monovinyl ether, poly(ethylene glycol)methyl vinyl ether, poly(ethylene glycol) monoallyl ether, poly (ethylene glycol)methyl allyl ether, vinyl alcohol, allyl alcohol, and combinations thereof, even more preferably selected from the group consisting of (meth)acrylamide, dimethyl (meth)acrylamide, N-2-hydroxylethyl (meth)acrylamide, N,N-bis(hydroxyethyl) (meth)acrylamide, N-2,3-dihydroxypropyl (meth)acrylamide, N-tris(hydroxymethyl) methyl (meth)acrylamide, poly(ethylene glycol)ethyl (meth) acrylamide having a number average molecular weight of up to 1500, poly(ethylene glycol) (meth)acrylate having a number average molecular weight of up to 1500, N-vinylpyrrolidone, N-vinyl-N-methyl acetamide, methoxypoly(ethylene glycol)ethyl (meth)acrylamide having a number average molecular weight of up to 1500, methoxy polyethylene glycol (meth)acrylate having a weight average molecular weight of up to 1500, and combinations thereof.

In a preferred embodiment, the anterior and posterior outer hydrogel layers and the outer surface hydrogel layer independent of each other are a crosslinked polymeric material which comprises at least 25% by mole (preferably at least 35% by mole, more preferably at least 45% by mole, even more preferably at least 55% by mole) of repeating monomeric units of at least one phosphrylcholine-containing vinylic monomer, preferably selected from the group consisting of (meth)acryloyloxyethyl phosphorylcholine, (meth)acryloyloxypropyl phosphorylcholine, 4-((meth) acryloyloxy)butyl-2'-(trimethylammonio)ethylphosphate, 2-[(meth)acryloylamino]ethyl-2'-(trimethylammonio)ethylphosphate, 3-[(meth)acryloylamino]propyl-2'-(trimethylammonio)ethylphosphate, 4-[(meth)acryloylamino]butyl-2'-(trimethylammonio)ethylphosphate, and combinations thereof.

In a preferred embodiment, the anterior and posterior outer hydrogel layers and the outer surface hydrogel layer independent of each other are a crosslinked polymeric material which comprises poly(ethylene glycol) chains. The poly(ethylene glycol) chains are preferably derived directly from (1) a pol(ethylene glycol) having one sole functional group of —$NH_2$, —SH or —COOH, (2) a pol(ethylene glycol) having two terminal functional groups selected from the group consisting of —$NH_2$, —COOH, —SH, and combinations thereof, (3) a multi-arm poly(ethylene glycol) having one or more functional groups selected from the group consisting of —$NH_2$, —COOH, —SH, and combinations thereof, and (4) combinations thereof.

In accordance with a preferred embodiment, the anterior and posterior outer hydrogel layers of a contact lens of the invention are identical to each other and substantially uniform in thickness, merge at the edge of the contact lens to completely cover the inner layer, and comprise an equilibrium water content of at least 80% by weight, preferably at least 85% by weight, more preferably at least about 90% by weight, even more preferably at least 95% by weight.

In accordance with a preferred embodiment, the outer surface hydrogel layer of a contact lens of the invention comprise an equilibrium water content of at least 80% by weight, preferably at least 85% by weight, more preferably at least about 90% by weight, even more preferably at least 95% by weight.

In accordance with the invention, each of the anterior and posterior outer hydrogel layers is substantially free of silicone, preferably totally free of silicone. However, it is well known that when X-ray photoelectron spectroscopy (XPS) is used to establish the presence or absence of silicon in the outer hydrogel layer (generally a probing depth of from 1.5 to 6 nm), samples are inevitably contaminated by the environmental silicon, as shown by the detection by XPS of silicon on the surface of samples which are theoretically free of any silicon atom, such as, for example, a polyethylene sheet from Goodfellow (1.3±0.2%), a DAILIES® Aqua-ComfortPlus™ contact lens from Alcon (1.7±0.9%) or an ACUVUE® Moist from Johnson & Johnson (2.8±0.9%). As such, the term "substantially free of silicon" is used in this application to mean that a surface silicon atomic percentage measured by XPS on a SiHy contact lens is less than about 200%, preferably less than about 175%, more preferably less than about 150%, even more preferably less than about 125% of the silicon atomic percentage of a control sample known to be inherently (theoretically) free of silicon (e.g., a polyethylene sheet, a DAILIES® AquaComfortPlus™ contact lens from Alcon or an ACUVUE® Moist from Johnson & Johnson). Alternatively, each outer hydrogel layer of a SiHy contact lens of the invention is substantially free of silicon, as characterized by having a silicon atomic percentage of about 5% or less, preferably about 4% or less, even more preferably about 3% or less, of total elemental percentage, as measured by XPS analysis of the contact lens in dried state. It is understood that a small percentage of silicone may be optionally (but preferably not) incorporated into the polymer network of the outer hydrogel layer so long as it would not significantly deteriorate the surface properties (hydrophilicity, wettability, and/or lubricity) of a contact lens.

In a preferred embodiment, each of the anterior and posterior outer hydrogel layers (the crosslinked coating) has a high digital-rubbing resistance as characterized by having no surface cracking lines visible under dark field after the contact lens is rubbed between fingers. It is believed that digital-rubbing-induced surface cracking may reduce the surface lubricity and/or may not be able prevent silicone from migrating onto the surface (exposure). Surface cracking may also indicate excessive crosslinking density in the surface layers which may affect the surface elastic modulus. Preferably, the non-silicone hydrogel material in the outer hydrogel layers (the crosslinked coating) comprises crosslinkages derived from azetidinium groups in a thermally-induced coupling reaction.

In another preferred embodiment, a contact lens of the invention further comprises, in its layered structural configuration, two transition layers of polymeric material(s). Each of the two transition layers is located between the inner layer and one of the anterior and posterior outer hydrogel layers. Each transition layer is substantially uniform in thickness. The thickness of each transition layer is at least about 0.05 µm, preferably from about 0.05 µm to about 10 µm, more preferably from about 0.1 µm to about 7.5 µm, even more preferably from about 0.15 µm to about 5 µm. The transition layers merge at the peripheral edge of the contact lens to completely enclose the inner layer of the lens material.

The layered structure configuration of a contact lens of the invention can be established by analysis with atomic force microscopy (AFM) of a cross section of a contact lens in fully hydrated state (i.e., directly in water or a buffered saline) as known to a person skilled in the art. The average thickness of each outer hydrogel layer can be determined from the AFM image as well known to a person skilled in the art.

The two transition layers of a contact lens of the invention essentially are a base (or primer or anchor) coating (or layer) which is applied onto a preformed contact lens, before the crosslinked coating (the outer hydrogel layers) is applied thereon. The transition layers (base coating or anchor layer) function to anchor/attach the outer hydrogel layers. Preferably, the transition layers comprise a carboxyl (COOH)-containing polymer crosslinked by a polyaziridine, preferably a homo or copolymer of acrylic acid or methacrylic acid or $C_2$-$C_{12}$ alkylacrylic acid crosslinked by a polyaziridine. It is understood that the carboxyl-containing polymer may penetrate into the bulk material and extend into the outer hydrogel layers. When such penetration into the inner layer of the lens material occurs, each transition layer would comprise the carboxyl-containing polymer and the lens material which are intertwined together.

In another preferred embodiment, each of the anterior and posterior outer hydrogel layers independent of each other has a reduced surface modulus of at least about 20%, preferably at least about 25%, more preferably at least about 30%, even more preferably at least about 35%, most preferably at least about 40%, relative to the inner layer.

The surface moduli of a cross section can be characterized (imaged) with AFM (e.g., according to nanoindentation method) in order to visualize any changes in surface modulus from the posterior surface side to the anterior surface side across the cross section. A significant change (e.g., about 30% or greater) observed in surface modulus (by examining the AFM image) over a thickness of about 0.02 µm, preferably about 0.01 µm along a shortest line between the anterior and posterior surfaces across a cross section of the contact lens in fully hydrated state indicates a transition from one layer to a different layer.

In any one of the preferred embodiments described above of the various aspects of the invention, a contact lens of the invention has a friction rating of about 2 or lower (preferably about 1.5 or lower, more preferably about 1.0 or lower, even more preferably about 0.5 or lower) after 30 cycles of manual rubbing test.

In any one of the preferred embodiments described above of the various aspects of the invention, a contact lens of the invention has a UVB transmittance of about 10% or less (preferably about 5% or less, more preferably about 2.5% or less, even more preferably about 1% or less) between 280 and 315 nanometers, a UVA transmittance of about 30% or less (preferably about 20% or less, more preferably about 10% or less, even more preferably about 5% or less) between 315 and 380 nanometers, and a Violet transmittance of from 0% to about 70%, preferably from 5% to about 60%, more preferably from 5% to about 50%, even more preferably from about 5% to about 40% between 380 nm and 440 nm.

A contact lens of the invention can be obtained according to any method known to a person skilled in the art or to be developed.

For instance, a contact lens of the invention can be obtained by neutralizing a preformed water gradient contact lens with a polyaziridine having a number average molecular weight of about 2000 Dalton or less (preferably from 250 Daltons to 1500 Daltons, more preferably from 300 Dalton to 1000 Dalton, even more preferably from 350 Dalton to about 800 Daltons) and at least two aziridine groups.

A preformed water gradient contact lens can be obtained by heating a contact lens precursor with an anchor layer (or base coating) of a polyanionic polymer having reactive functional groups (e.g., carboxyl groups) in an aqueous solution comprising a thermally-crosslinkable hydrophilic polymeric material, similar to the procedures described in U.S. Pat. Nos. 8,480,227, 8,529,057 and 9,505,184, and in U.S. Pat. Appl. Pub. Nos. 2017/0068018 A1, 2017/0068019 A1, 2017/0165932 A1, 2018/0079157 A1, 2018/0079158 A1, 2018/0081197 A1, 2018/0113236 A1, and 2018/0120590 A1.

A contact lens precursor with an anchor layer thereon can be obtained by contacting a preformed contact lens with a solution of a polyanionic polymer at a pH of from about 1.0 to about 3.0 for a time period sufficient long to form the anchor layer of the polyanionic polymer with a desired thickness.

Contacting of a preformed contact lens with a coating solution of a polymer can occur by dipping it into the coating solution or by spraying it with the coating solution. One contacting process involves solely dipping the contact lens in a bath of a coating solution for a period of time or alternatively dipping the contact lens sequentially in a series of bath of coating solutions for a fixed shorter time period for each bath. Another contacting process involves solely spray a coating solution. However, a number of alternatives involve various combinations of spraying- and dipping-steps may be designed by a person having ordinary skill in the art.

Any polyanionic polymers can be used in forming an anchor layer on a preformed contact lens, so long as they contain at least 60% by mole of repeating units of one or more carboxyl-containing acrylic monomers (any one of those described above). Examples of preferred polyanionic polymers include without limitations polyacrylic acid, polymethacrylic acid, poly(ethylacrylic acid), poly(acrylic acid-co-methacrylic acid), poly[ethylacrylic acid-co-(meth)acrylic acid], poly(N,N-2-acrylamidoglycolic acid), poly[(meth)acrylic acid-co-acrylamide], poly[(meth)acrylic acid-co-vinylpyrrolidone], poly[ethylacrylic acid-co-acrylamide], poly[ethylacrylic acid-co-vinylpyrrolidone], poly[(meth)acrylic acid-co-vinylacetate], poly[ethylacrylic acid-co-vinylacetate], or combinations thereof. Preferably, a polyanionic polymer is polyacrylic acid, polymethacrylic acid, or a combination thereof.

In accordance with the invention, the number average molecular weight Mn of a polyanionic polymer for forming an anchor layer (or base coating) on preformed contact lenses with or without a plasma coating is at least about 25,000 Daltons, preferably at least about 50,000 Daltons, more preferably from about 100,000 Daltons to about 5,000,000 Daltons.

A solution of a polyanionic polymer for forming an anchor layer (or base coating) on preformed contact lenses with or without a plasma coating can be prepared by dissolving one or more polyanionic polymers in water, a mixture of water and one or more organic solvents miscible with water, an organic solvent, or a mixture of one or more organic solvent. Preferably, the polyanionic polymer is dissolved in a mixture of water and one or more organic solvents, an organic solvent, or a mixture of one or more organic solvent. It is believed that a solvent system containing at least one organic solvent can swell a preformed contact lens so that a portion of the polyanionic polymer may penetrate into the preformed contact lens and increase the durability and thickness of the anchor layer (base coating). Any organic solvents described above can be used in preparation of a solution of the polyanionic polymer, so long as it can dissolve the polyanionic polymer.

The concentration of polyanionic polymer is from about 0.001% to about 2.5%, preferably from about 0.002% to about 1.5%, more preferably from about 0.003% to about 0.75% by weight relative to the total weight of the organic-based solution.

As known to a person skilled in the art, the thickness of the anchor layer (base coating) can be adjusted by varying the concentration of the polyanionic polymer, the contacting time of the preformed contact lens with the solution of the polyanionic polymer, the solvent system (e.g., the amount of one or more organic solvents), or combinations thereof.

Alternatively, a contact lens precursor with an anchor layer thereon can be obtained by grafting a polyanionic polymer onto the surface of a preformed contact lens, according to any graft polymerization techniques known to a person skilled in the art. For example, a preformed contact lens in dry state is first subjected to a plasma treatment in a plasma atmosphere of a compound having at least one reactive functional group (e.g., a vinylic monomer having a primary or secondary amino group, a carboxyl group, an epoxy group, an azlactone group, an aziridine group, or an isocyanate group) to form a plasma coating having reactive functional groups. The plasma-treated contact lens is reacted with a compound having a free-radical initiator moiety (e.g., a thermal initiator or a photoinitiator) or preferably a living polymerization initiator moiety (e.g., an atom transfer radical polymerization (ATRP) initiator or a reversible addition fragmentation chain transfer polymerization (RAFT) initiator) and a functional group co-reactive with the functional groups of the plasma coating on the contact lens in the presence or absence of a coupling agent under coupling reaction conditions known to a person skilled in the art. The obtained contact lens with free-radical initiator moieties thereon is immersed in a solution of one or more carboxyl-containing vinylic monomers (preferably those carboxyl-containing acrylic monomers described above) and subject to conditions to initiate free radical polymerization of those carboxyl-containing vinylic monomers so as to form a layer of a graft—from polyanionic polymer of the carboxyl-containing vinylic monomers.

In accordance with the invention, the thermally-crosslinkable hydrophilic polymeric material for forming the outer surface hydrogel layer or the anterior and posterior outer hydrogel layers (i.e., the crosslinked hydrophilic coating) comprises crosslinkable groups, preferably thermally-crosslinkable groups (e.g., epoxy groups, azetidinium groups, or combinations thereof), more preferably azetidinium groups. Preferably, the water-soluble and crosslinkable hydrophilic polymeric material is a partially-crosslinked polymeric material that comprises a three-dimensional network and thermally-crosslinkable groups, preferably azetidinium groups within the network or being attached to the network. The term "partially-crosslinked" in reference to a polymeric material means that the crosslinkable groups of starting materials for making the polymeric material in crosslinking reaction have not been fully consumed. For example, such a thermally-crosslinkable hydrophilic polymeric material comprises azetidinium groups and is a partial reaction product of at least one azetidinium-containing polymer with at least one hydrophilicity-enhancing agent (i.e., a wetting agent) having at least one carboxyl, primary amine, secondary amine, or thiol group, according to the crosslinking reactions shown in Scheme I Scheme I

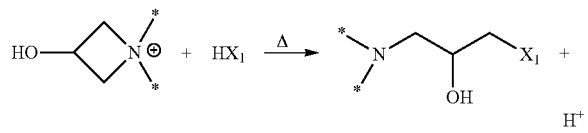

in which $X_1$ is —S—*, —OC(=O)—*, or —NR'—* in which R' is hydrogen or a $C_1$-$C_{20}$ unsubstituted or substituted alkyl group, and * represents an organic radical.

Any suitable azetidinium-containing polymers can be used in the invention. Examples of azetidinium-containing polymers includes without limitation epichlorohydrin-functionalized polyamines, homopolymers of an azetidinium-containing vinylic monomer, copolymers of an azetidinium-containing vinylic monomer with one or more vinylic monomers.

Preferably, an azetidinium-containing polymer is an epichlorohydrin-functionalized polyamine. An epichlorohydrin-functionalized polyamine can be obtained by reacting epichlorohydrin with a polyamine polymer or a polymer containing secondary amino groups. For example, a poly(alkylene imines) or a poly(amidoamine) which is a polycondensate derived from a polyamine and a dicarboxylic acid (e.g., adipic acid-diethylenetriamine copolymers) can react with epichlorohydrin to form an epichlorohydrin-functionalized polymer; a homopolymer or copolymer of mono-alkylaminoalkyl (meth)acrylate or mono-alkylaminoalkyl (meth)acrylamide can also react with epichlorohydrin to form an epichlorohydrin-functionalized polyamine; a poly(2-oxazoline-co-ethyleneimine) copolymer can react with epichlorohydrin to form an epichlorohydrin-functionalized polyamine (i.e., a poly(2-oxazoline-co-ethyleneimine)-epichlorohydrin). The reaction conditions for epichlorohydrin-functionalization of a polyamine or polyamidoamine polymer are taught in EP1465931. A preferred epichlorohydrin-functionalized polyamine is polyamidoamine-epichlorohydrin (PAE) or a poly(2-oxazoline-co-ethyleneimine)-epichlorohydrin.

Polyamidoamine-epichlorohydrin is commercially available, such as, for example, Kymene® or Polycup® resins (epichlorohydrin-functionalized adipic acid-diethylenetriamine copolymers) from Hercules.

Poly(2-oxazoline-co-ethyleneimine)-epichlorohydrin can be prepared according to procedures described in U.S. Pat. Appl. Pub. No. US 2016/0061995 A1.

Homopolymers and copolymers of an azetidinium-containing vinylic monomer can be obtained according to the procedures described in U.S. Pat. Appl. Pub. No. 2013/0337160A1.

Any suitable hydrophilicity-enhancing agents can be used in the invention so long as they are ophthalmically compatible and contain at least one amino group, at least one carboxyl group, and/or at least one thiol group, preferably contain at least one carboxyl group, at least one thiol group, or combinations thereof.

A preferred class of hydrophilicity-enhancing agents include without limitation: primary amino-, secondary amino-, carboxyl- or thiol-containing monosaccharides (e.g., 3-amino-1,2-propanediol, 1-thiolglycerol, 5-keto-D-gluconic acid, galactosamine, glucosamine, galacturonic acid, gluconic acid, glucosaminic acid, mannosamine, saccharic acid 1,4-lactone, saccharide acid, Ketodeoxynonulosonic acid, N-methyl-D-glucamine, 1-amino-1-deoxy-β-D-galactose, 1-amino-1-deoxysorbitol, 1-methylamino-1-deoxysorbitol, N-aminoethyl gluconamide); primary amino-, secondary amino-, carboxyl- or thiol-containing disaccharides (e.g., chondroitin disaccharide sodium salt, di(β-D-xylopyranosyl)amine, digalacturonic acid, heparin disaccharide, hyaluronic acid disaccharide, Lactobionic acid); and primary amino-, secondary amino-, carboxyl- or thiol-containing oligosaccharides (e.g., carboxymethyl-β-cyclodextrin sodium salt, trigalacturonic acid); and combinations thereof.

Another preferred class of hydrophilicity-enhancing agents is hydrophilic polymers having one or more (primary or secondary) amino, carboxyl and/or thiol groups. More preferably, the content of the amino (—NHR' with R' as defined above), carboxyl (—COOH) and/or thiol (—SH) groups in a hydrophilic polymer as a hydrophilicity-enhancing agent is less than about 40%, preferably less than about 30%, more preferably less than about 20%, even more preferably less than about 10%, by weight based on the total weight of the hydrophilic polymer.

One preferred class of hydrophilic polymers as hydrophilicity-enhancing agents are (primary or secondary) amino- or carboxyl-containing polysaccharides, for example, such as, carboxymethylcellulose (having a carboxyl content of about 40% or less, which is estimated based on the composition of repeating units, —[$C_6H_{10-m}O_5(CH_2CO_2H)_m$]— in which m is 1 to 3), carboxyethylcellulose (having a carboxyl content of about 36% or less, which is estimated based on the composition of repeating units, —[$C_6H_{10-m}O_5(C_2H_4CO_2H)_m$]— in which m is 1 to 3) carboxypropylcellulose (having a carboxyl content of about 32% or less, which is estimated based on the composition of repeating units, —[$C_6H_{10-m}O_5(C_3H_6CO_2H)_m$]—, in which m is 1 to 3), hyaluronic acid (having a carboxyl content of about 11%, which is estimated based on the composition of repeating units, —($C_{13}H_{20}O_9NCO_2H$)—), chondroitin sulfate (having a carboxyl content of about 9.8%, which is estimated based on the composition of repeating units, —($C_{12}H_{18}O_{13}NSCO_2H$)—), or combinations thereof.

Another preferred class of hydrophilic polymers as hydrophilicity-enhancing agents include without limitation: poly(ethylene glycol) (PEG) with mono-amino (primary or secondary amino), carboxyl or thiol group (e.g., PEG-NH$_2$, PEG-SH, PEG-COOH); H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino (primary or secondary), carboxyl or thiol groups; PEG dendrimers with one or more amino (primary or secondary), carboxyl or thiol groups; a diamino-(primary or secondary) or dicarboxyl-terminated homo- or co-polymer of a non-reactive hydrophilic vinylic monomer; a monoamino-(primary or secondary) or monocarboxyl-terminated homo- or co-polymer of a non-reactive hydrophilic vinylic monomer; a copolymer which is a polymerization product of a composition comprising (1) about 60% by weight or less, preferably from about 0.1% to about 30%, more preferably from about 0.5% to about 20%, even more preferably from about 1% to about 15%, by weight of one or more reactive vinylic monomers and (2) at least one non-reactive hydrophilic vinylic monomer; and combinations thereof.

In accordance with the invention, reactive vinylic monomers can be carboxyl-containing vinylic monomers, primary amino-containing vinylic monomers, or secondary amino-containing vinylic monomers.

Examples of preferred carboxyl-containing vinylic monomers include without limitation acrylic acid, methacrylic ethylacrylic acid, N-2-(meth)acrylamidoglycolic acid, and combinations thereof.

Examples of preferred primary and secondary amino-containing vinylic monomers include without limitation N-2-aminoethyl (meth)acrylamide, N-2-methylaminoethyl (meth)acrylamide, N-2-ethylaminoethyl (meth)acrylamide, N-3-aminopropyl (meth)acrylamide, N-3-methylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, and combinations thereof.

In accordance with the invention, a non-reactive vinylic monomer is a vinylic monomer free of any carboxyl group, primary amino group, secondary amino group, epoxide group, isocyanate group, azlactone group, or aziridine group. Non-reactive vinylic monomers preferably are non-charged hydrophilic vinylic monomers which are free of carboxyl or amino group (any those described above can be used here), phosphorylcholine-containing vinylic monomers (any those described above can be used here), or combinations thereof.

More preferably, a hydrophilic polymer as a hydrophilicity-enhancing agent is:
 a poly(ethylene glycol) having one sole functional group of —NH$_2$, —SH or —COOH;
 a poly(ethylene glycol) having two terminal functional groups selected from the group consisting of —NH$_2$, —COOH, —SH, and combinations thereof;
 a multi-arm poly(ethylene glycol) having one or more functional groups selected from the group consisting of —NH$_2$, —COOH, —SH, and combinations thereof;
 a monoamino-, monocarboxyl-, diamino- or dicarboxyl-terminated homo- or copolymer of a non-reactive hydrophilic vinylic monomer;
 a copolymer which is a polymerization product of a composition comprising (1) from about 0.1% to about 30%, preferably from about 0.5% to about 20%, more preferably from about 1% to about 15%, by weight of acrylic acid, methacrylic acid, ethylacrylic acid, 2-(meth)acrylamidoglycolic acid, N-2-aminoethyl (meth)acrylamide, N-2-methylaminoethyl (meth)acrylamide, N-2-ethylaminoethyl (meth)acrylamide, N-3-aminopropyl (meth)acrylamide, N-3-methylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-amino-2-hydroxypropyl (meth)acrylate, or a combination thereof, and (2) at least one non-reactive hydrophilic vinylic monomer selected from the group consisting of acryamide, N,N-dimethylacrylamide, N-vinylpyrrolidone, (meth)acryloyloxyethyl phosphorylcholine, N-vinyl-N-methyl acetamide, glycerol (meth)acrylate, hydroxyethyl (meth)acrylate, N-hydroxyethyl (meth)acrylamide, C$_1$-C$_4$-alkoxy polyethylene glycol (meth)acrylate having a weight average molecular weight of up to 400 Daltons, vinyl alcohol, and combination thereof,
wherein the non-reactive hydrophilic vinylic monomer selected from the group consisting of selected from the group consisting of alkyl (meth)acrylamides (any one described above), N-2-dimethylaminoethyl (meth)acrylamide, dimethylaminoethyl (meth)acrylate, hydroxyl-containing acrylic monomers (any one described above), N-vinyl amide monomers (any one described above), methylene-containing pyrrolidone monomers (i.e., pyrrolidone derivatives each having a methylene group connected to the pyrrolidone ring at 3- or 5-position) (any one described above), acrylic monomers having a C$_1$-C$_4$ alkoxyethoxy group (any one described above), vinyl ether monomers (any one described above), allyl ether monomers (any one described above), a phosphorylcholine-containing vinylic monomer (any one described above) and combinations thereof (preferably selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)ethylphosphate, 3-[(meth)acryloylamino]propyl-2'-(trimethylammonio)ethylphosphate, 4-[(meth)acryloylamino]butyl-2'-(trimethylammonio)ethylphosphate, (meth)acrylamide, dimethyl (meth)acrylamide, N-2-hydroxylethyl (meth)acrylamide, N,N-bis(hydroxyethyl) (meth)acrylamide, N-2,3-dihydroxypropyl (meth)acrylamide, N-tris(hydroxymethyl) methyl (meth)acrylamide, 2-hydroxyethyl (meth)acrylate, glycerol methacrylate (GMA), tetra(ethylene glycol) (meth)acrylate, poly(ethylene glycol)ethyl (meth)acrylamide having a number average molecular weight of up to 1500, poly(ethylene glycol) (meth)acrylate having a number average molecular weight of up to 1500, N-vinylpyrrolidone, N-vinyl-N-methyl acetamide, N-vinyl formamide, N-vinyl acetamide, 1-methyl-3-methylene-2-pyrrolidone, 1-methyl-5-methylene-2-pyrrolidone, 5-methyl-3-methylene-2-pyrrolidone, tetra(ethylene glycol)methyl ether (meth)acrylate, methoxypoly(ethylene glycol)ethyl (meth)acrylamide having a number average molecular weight of up to 1500, C$_1$-C$_4$-alkoxy polyethylene glycol (meth)acrylate having a weight average molecular weight of up to 1500, tetra(ethylene glycol) monovinyl ether, poly(ethylene glycol) monovinyl ether, tetra(ethylene glycol)methyl vinyl ether, poly(ethylene glycol)methyl vinyl ether, tetra(ethylene glycol) monoallyl ether, poly(ethylene glycol) monoallyl ether, tetra(ethylene glycol)methyl allyl ether, poly(ethylene glycol) methyl allyl ether, vinyl alcohol, allyl alcohol, and combinations thereof, more preferably selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)ethylphosphate, 3-[(meth)acryloylamino]propyl-2'-(trimethylammonio)ethylphosphate, 4-[(meth)acryloylamino]butyl-2'-(trimethylammonio)ethylphosphate, (meth)acrylamide, dimethyl (meth)acrylamide, N-2-hydroxylethyl (meth)acrylamide, N,N-bis(hydroxyethyl) (meth)acrylamide, N-2,3-dihydroxypropyl (meth)acrylamide, N-tris(hydroxymethyl)methyl (meth)acrylamide, 2-hydroxyethyl (meth)acrylate, glycerol methacrylate (GMA), poly(ethylene glycol)ethyl (meth)acrylamide having a number average molecular weight of up to 1500, poly(ethylene glycol) (meth)acrylate having a number average molecular weight of up to 1500, N-vinylpyrrolidone, N-vinyl-N-methyl acetamide, methoxypoly(ethylene glycol)ethyl (meth)acrylamide having a number average molecular weight of up to 1500, methoxy polyethylene glycol (meth)acrylate having a weight average molecular weight of up to 1500, poly(ethylene glycol) monovinyl ether, poly(ethylene glycol)methyl vinyl ether, poly(ethylene glycol) monoallyl ether, poly(ethylene glycol)methyl allyl ether, vinyl alcohol, allyl alcohol, and combinations thereof, even more preferably selected from the group consisting of (meth)acryloyloxyethyl phosphorylcholine, (meth)acryloyloxypropyl phosphorylcholine, 2-[(meth)acryloylamino]ethyl-2'-(trimethylammonio)ethylphosphate, 3-[(meth)acryloylamino]propyl-2'-(trimethylammonio)ethylphosphate, (meth)acrylamide, dimethyl (meth)acrylamide, N-2-hydroxylethyl (meth)acrylamide, N,N-bis(hydroxyethyl) (meth)acrylamide, N-2,3-dihydroxypropyl (meth)acrylamide, N-tris(hydroxymethyl)methyl (meth)acrylamide, poly(ethylene glycol)ethyl (meth)acrylamide having a number average molecular weight of up to 1500, poly(ethylene glycol) (meth)acrylate having a number average molecular weight of up to 1500, N-vinylpyrrolidone, N-vinyl-N-methyl acetamide, methoxypoly(ethylene glycol)ethyl (meth)acrylamide having a number average molecular weight of up to 1500, methoxy polyethylene glycol (meth)acrylate having a weight average molecular weight of up to 1500, and combinations thereof.

PEGs with functional groups and multi-arm PEGs with functional groups can be obtained from various commercial suppliers, e.g., Creative PEGWorks, Polyscience, and Shearwater Polymers, etc.

Monoamino-, monocarboxyl-, diamino- or dicarboxyl-terminated homo- or copolymers of one or more non-reactive hydrophilic vinylic monomers or of a phosphorylcholine-containing vinylic monomer can be prepared according to procedures described in U.S. Pat. No. 6,218,508. For example, to prepare a diamino- or dicarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomer are copolymerized (thermally or actinically) with a reactive vinylic monomer (having an amino or carboxyl group), in the presence of an free-radical initiator. Generally, the molar ratio of chain transfer agent to that of all of vinylic monomers other than the reactive vinylic monomer is from about 1:5 to about 1:100, whereas the molar ratio of chain transfer agent to the reactive vinylic monomer is 1:1. In such preparation, the chain transfer agent with amino or carboxyl group is used to control the molecular weight of the resultant hydrophilic polymer and forms a terminal end of the resultant hydrophilic polymer so as to provide the resultant hydrophilic polymer with one terminal amino or carboxyl group, while the reactive vinylic monomer provides the other terminal carboxyl or amino group to the resultant hydrophilic polymer. Similarly, to prepare a monoamino- or monocarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomers are copolymerized (thermally or actinically) in the absence of any reactive vinylic monomer.

Copolymers comprising a non-reactive hydrophilic vinylic monomer and a reactive vinylic monomer (e.g., a carboxyl-containing vinylic monomer, a primary amino group-containing vinylic monomer or a secondary amino group-containing vinylic monomer) can be prepared according to any well-known radical polymerization methods or obtained from commercial suppliers. Copolymers containing methacryloyloxyethyl phosphorylcholine and carboxyl-containing vinylic monomer (or amino-containing vinylic monomer) can be obtained from NOF Corporation (e.g., LIPIDURER-A and -AF) or prepared according to the procedures described in U.S. Pat. No. 9,127,099.

The weight average molecular weight Mw of the hydrophilic polymer having at least one amino, carboxyl or thiol group (as a hydrophilicity-enhancing agent) is preferably from about 500 to about 5,000,000, more preferably from about 1,000 to about 2,000,000, even more preferably from about 5,000 to about 1,000,000 Daltons.

Water-soluble and thermally-crosslinkable hydrophilic polymeric materials can be prepared according to the processes disclosed in U.S. Pat. Appli. Pub. Nos. US 2016/0061995 A1 and US2013/0337160 A1 and in U.S. Pat. No. 8,529,057.

In a preferred embodiment, a water-soluble thermally-crosslinkable polymeric material can be obtained by heating an aqueous reactive solution, which comprises at least one azetidinium-containing polymer and at least one hydrophilicity-enhancing agent (i.e., a wetting agent) having at least one reactive functional group selected from the group consisting of amino group, carboxyl group, thiol group, and a combination thereof, to a temperature of from about 35° C. to about 85° C. and maintaining the temperature for a period of time sufficient (about 8 hours or less, preferably about 5 hours, more preferably from about 2 hour to about 4 hours). The aqueous reactive solution preferably comprises from about 70 mM to about 170 mM (preferably about 90 mM to about 150 mM, more preferably from about 100 mM to about 130 mM) of one or more ionic compounds and a pH of at least 8.0 (preferably at least 8.5, more preferably at least 9.0, even more preferably at least 9.5). It should be understood that the reaction time should be long enough to covalently attach the hydrophilicity-enhancing agent onto the polymer chain of the azetidinium-containing polymer, but should be short enough not to consume all the azetidinium groups of the azetidinium-containing polymer and not to form a gel (i.e., not water-soluble) due to the too many crosslinkages formed between the azetidinium-containing polymer and the hydrophilicity-enhancing agent. A resultant polymeric material is a lightly-crosslinked polymeric material which has a highly-branched structure and still comprises thermally-crosslinkable azetidinium groups.

A person skilled in the art understands well how to adjust the pH of the reactive mixture, e.g., by adding a base (e.g., NaOH, KOH, NH$_4$OH, or mixture thereof) or an acid (e.g., HCl, H$_2$SO$_4$, H$_3$PO$_4$, citric acid, acetic acid, boric acid, or mixture thereof).

In accordance with the invention, any ionic compounds can be used in the reactive mixture. Preferably, ionic compounds are those used as ionic tonicity-adjusting agents and ionic buffering agents used in an ophthalmic solutions. Examples of preferred ionic tonicity-adjusting agents includes without limitation sodium chloride, potassium chloride, and combinations thereof. Examples of preferred ionic buffering agents includes various salts of phosphoric acid (e.g. NaH$_2$PO$_4$, Na$_2$HPO$_4$, Na$_3$PO$_4$, KH$_2$PO$_4$, K$_2$HPO$_4$, K$_3$PO$_4$, or mixtures thereof), various salts of boric acid (e.g., sodium borate, potassium borate, or mixture thereof), various salts of citric acid (e.g., monosodium citrate, disodium citrate, trisodium citrate, monopotassium citrate, dipotassium citrate, tripotassium citrate, or mixtures thereof), various salts of carbonic acid (e.g., Na$_2$CO$_3$, NaHCO$_3$, K$_2$CO$_3$, KHCO$_3$, or mixture thereof).

The aqueous reactive solution for preparing a water-soluble thermally-crosslinkable polymeric material can be prepared by dissolving a desired amount of an azetidinium-containing polymer, a desired amount of a hydrophilicity-enhancing agent with at least one reactive functional group, and desired amounts of other components (e.g., ionic buffering agents, ionic tonicity-adjusting agents, etc.) in water (or a mixture of water and a minority amount of a water-soluble organic solvent) to form an aqueous solution and then adjusting the pH of the aqueous solution if necessary.

In accordance with the invention, the concentration ratio of a hydrophilicity-enhancing agent relative to an azetidinium-containing polymer in the aqueous reactive solution must be selected not to render a resultant water-soluble thermally-crosslinkable polymeric material water-insoluble (i.e., a solubility of less than 0.005 g per 100 ml of water at room temperature) and not to consume more than about 99%, preferably about 98%, more preferably about 97%, even more preferably about 96% of the azetidinium groups of the azetidinium-containing polymer.

In a preferred embodiment, the aqueous reactive solution comprises from 0.01% to about 10% by weight (preferably from 0.05% to about 5% by weight, more preferably from 0.08% to about 1% by weight, even more preferably from 0.1% to about 0.4% by weight) of an azetidinium-containing polymer and from 0.01% to about 10% by weight (preferably from 0.02% to about 5% by weight, more preferably from 0.05% to about 2% by weight, even more preferably from 0.08% to about 1.0% by weight) of a hydrophilicity-enhancing agent having at least one reactive function group (carboxyl, primary amino, secondary amino group), the concentration ratio of the azetidinium-containing polymer to the hydrophilicity-enhancing agent is from about 1000:1 to 1:1000 (preferably from about 500:1 to about 1:500, more preferably from about 250:1 to about 1:250, even more preferably from about 100:1 to about 1:100).

In a preferred embodiment, the water-soluble thermally-crosslinkable polymeric material comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof (preferably carboxyl or thiol groups), wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains. The composition of a chemically-modified poly(2-oxazoline-co-ethyleneimine)-epichlorohydrin or a chemically-modified polyamidoamine-epichlorohydrin is determined by the composition (based on the total weight of the reactants) of a reactant mixture used for such a polymer according to the crosslinking reactions shown in Scheme I above. For example, if a reactant mixture comprises about 75% by weight of a polyamidoamine-epichlorohydrin and about 25% by weight of at least one hydrophilicity-enhancing agent based on the total weight of the reactants, then the resultant chemically-modified polyamidoamine-epichlorohydrin comprises about 75% by weight of first polymer chains derived from the polyamioamine-epichlorohydrin and about 25% by weight of hydrophilic moieties or second polymer chains derived from said at least one hydrophilicity-enhancing agent.

In accordance with the invention, the preformed contact lens with an anchor layer thereon is heated in an aqueous solution which comprises a thermally-crosslinkable hydrophilic polymeric material having azetidinium groups and optionally (but preferably) amino groups, thiol groups, carboxyl groups or combinations thereof, at a temperature of from about 60° C. to about 140° C. for a time period to crosslink the thermally-crosslinkable hydrophilic polymeric material while covalently attaching the crosslinked thermally-crosslinkable hydrophilic polymeric material onto the anchor layer so as to form a water gradient contact lens.

Preferably, the step of heating is performed by autoclaving the preformed contact lens with an anchor layer thereon immersed in the aqueous coating solution which is a packaging solution (i.e., a buffered aqueous solution with a pH of from 6.7 to 7.6) in a sealed lens package at a temperature of from about 115° C. to about 125° C. for approximately 20-90 minutes. It is believed that during autoclave those azetidinium groups which do not participate in crosslinking reaction may be hydrolyzed into 2,3-dihydroxypropyl (HO—CH$_2$—CH(OH)—CH$_2$—) groups and that the azetidinium-containing polymeric material present in the lens packaging solution, if applicable, can be converted to a non-reactive polymeric wetting agent capable of improving a lens's insert comfort. Consequently, the second aqueous coating solution is ophthalmically safe after autoclave.

Lens packages (or containers) are well known to a person skilled in the art for autoclaving and storing a contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (e.g., cellulose derivatives, polyvinyl alcohol, polyvinyl pyrrolidone).

The packaging solution contains a buffering agent in an amount sufficient to maintain a pH of the packaging solution in the desired range, for example, preferably in a physiologically acceptable range of about 6.5 to about 7.5. Any known, physiologically compatible buffering agents can be used. Suitable buffering agents as a constituent of the contact lens care composition according to the invention are known to the person skilled in the art. Examples are boric acid, borates, e.g. sodium borate, citric acid, citrates, e.g. potassium citrate, bicarbonates, e.g. sodium bicarbonate, TRIS (i.e., 2-amino-2-hydroxymethyl-1,3-propanediol), Bis-Tris [i.e., Bis-(2-hydroxyethyl)-imino-tris-(hydroxymethyl)-methane], Bis-Tris propane [i.e., 1,3-bis(tris(hydroxymethyl)methylamino)propane], bis-aminopolyols, triethanolamine, ACES [i.e., N-(2-hydroxyethyl)-2-aminoethanesulfonic acid], BES [i.e., N,N-Bis(2-hydroxyethyl)-2-aminoethanesulfonic acid], HEPES [i.e., 4-(2-hydroxyethyl)-1-piperazineethanesulfonic acid], MES [i.e., 2-(N-morpholino)ethanesulfonic acid], MOPS [i.e., 3-[N-morpholino]-propanesulfonic acid], PIPES [i.e., piperazine-N,N'-bis(2-ethanesulfonic acid], TES {i.e., N-[Tris (hydroxymethyl)methyl]-2-aminoethanesulfonic acid}, salts thereof, phosphate buffers, e.g. $Na_2HPO_4$, $NaH_2PO_4$, and $KH_2PO_4$ or mixtures thereof. The amount of each buffer agent in a packaging solution is preferably from 0.001% to 2%, preferably from 0.01% to 1%; most preferably from about 0.05% to about 0.30% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable occularly acceptable tonicity agents include, but are not limited to sodium chloride, potassium chloride, glycerol, propylene glycol, polyols, mannitol, sorbitol, xylitol and mixtures thereof.

A packaging solution of the invention has a viscosity of from about 1 centipoise to about 5 centipoises, at 25° C.

In a preferred embodiment, the packaging solution comprises preferably from about 0.01% to about 2%, more preferably from about 0.05% to about 1.5%, even more preferably from about 0.1% to about 1%, most preferably from about 0.2% to about 0.5%, by weight of a water-soluble thermally-crosslinkable hydrophilic polymeric material having azetidinium groups.

The resultant water gradient contact lens then can be heated in an aqueous solution which comprises a polyaziridine having a number average molecular weight of about 2000 Dalton or less and at least two aziridine groups in an amount sufficient to render the water gradient contact lens having a PU of about 0.40 or 0.30 micrograms/lens or less (preferably about 0.20 micrograms/lens or less, more preferably about 0.15 micrograms/lens or less, even more preferably about 0.10 micrograms/lens or less, most preferably about 0.05 micrograms/lens or less) at a temperature from 40° C. to 140° C. Preferably, the aqueous solution is a lens packaging solution which comprises the required polyaziridine in addition to all the necessary components described above for a lens packaging solution.

Any polyaziridines can be used in the invention for neutralizing the negative charges present in a water gradient contact lens. Examples of preferred polyaziridines include without limitation trimethylolpropane tris(2-methyl-1-aziridinepropionate) (aka, PZ-28), pentaerythritol tris[3-(1-aziridinyl)propionate] (aka, PZ-33), trimethylolpropane tris (3-aziridinopropionate), a Michael reaction product of a vinylic crosslinker having at least two (meth)acryloyl groups and 2-methylaziridine (or aziridine), and combinations thereof. Preferably, a polyaziridine comprising at least methyl-aziridinyl groups is used in the invention.

In an alternatively process for producing a contact lens of the invention, a contact lens precursor having an anchor layer thereon is heated in an aqueous solution, which comprises a thermally-crosslinkable hydrophilic polymeric material (any one of those described above), in the presence of a polyaziridine having a number average molecular weight of about 2000 Dalton or less and at least two aziridine groups in a process for preparing a water gradient contact lens. For example, a preformed contact lens with an anchor layer thereon is first in contact with a solution containing such a polyaziridine at a room temperature or lower to load the preformed contact lens with the polyaziridine and then the polyaziridine-loaded contact lens with the anchor layer thereon is heated in an aqueous solution comprising a thermally-crosslinkable hydrophilic polymeric material (any one of those described above) at a temperature of from about 60° C. to about 140° C. to form a contact lens of the invention. Alternatively, a preformed contact lens with the anchor layer thereon is heated in an aqueous solution comprising a thermally-crosslinkable hydrophilic polymeric material (any one of those described above) and a polyaziridine at a temperature of from about 60° C. to about 140° C. to form a contact lens of the invention.

Several alternatively processes for producing a contact lens of the invention are illustrated in Examples.

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together, as illustrated below:

1. A contact lens, having:
    a polyquaternium-1 uptake ("PU") of about 0.40 micrograms/lens or less (or about 0.30 micrograms/lens or less);
    a water-break-up time of at least 10 seconds after 30 cycles of digital rubbing treatment or after simulated abrasion cycling treatment;
    wherein the contact lens comprises
        an anterior surface and an opposite posterior surface; and a layered structural configuration which comprises, in a direction from the anterior surface to the posterior surface, an anterior outer hydrogel layer, an inner layer of a lens material, and a posterior outer hydrogel layer,
    wherein the inner layer has a first equilibrium water content of about 70% by weight or less, wherein the anterior and posterior outer hydrogel layers independent of each other have a thickness of from about 0.25 µm to about 25 µm when being fully hydrated and a second equilibrium water content that is higher than the first equilibrium water content,
    wherein the anterior and posterior outer hydrogel layers independent of each other have a water-swelling ratio of at least 140%.

2. A contact lens, having:
- a polyquaternium-1 uptake ("PU") of about 0.40 micrograms/lens or less (or about 0.30 micrograms/lens or less);
- a friction rating of about 2.0 or lower after 30 cycles of digital rubbing treatment or after simulated abrasion cycling treatment;
- wherein the contact lens comprises
  - an anterior surface and an opposite posterior surface; and a layered structural configuration which comprises, in a direction from the anterior surface to the posterior surface, an anterior outer hydrogel layer, an inner layer of a lens material, and a posterior outer hydrogel layer,
  - wherein the inner layer has a first equilibrium water content of about 70% by weight or less, wherein the anterior and posterior outer hydrogel layers independent of each other have a thickness of from about 0.25 μm to about 25 μm when being fully hydrated and a second equilibrium water content that is higher than the first equilibrium water content, wherein the anterior and posterior outer hydrogel layers independent of each other have a water-swelling ratio of at least 140%.

3. The contact lens according to embodiment 1 or 2, wherein the anterior and posterior outer hydrogel layers independent of each other have a water-swelling ratio of at least 170%.

4. The contact lens according to embodiment 1 or 2, wherein the anterior and posterior outer hydrogel layers independent of each other have a water-swelling ratio of at least 200%.

5. The contact lens according to embodiment 1 or 2, wherein the anterior and posterior outer hydrogel layers independent of each other have a water-swelling ratio of at least 250%.

6. The contact lens according to embodiment 1 or 2, wherein the anterior and posterior outer hydrogel layers independent of each other have a water-swelling ratio of at least 300%.

7. A contact lens, having:
- a polyquaternium-1 uptake ("PU") of about 0.40 micrograms/lens or less (or about 0.30 micrograms/lens or less);
- a water-break-up time of at least 10 seconds after 30 cycles of digital rubbing treatment or after simulated abrasion cycling treatment; and
- a water content gradient increasing from inside to one of the anterior or posterior surface of the contact lens,
- wherein the contact lens comprises a lens bulk material completely covered with an anterior outer hydrogel layer and a posterior outer hydrogel layer, wherein the anterior and posterior outer hydrogel layers independent of each other has a thickness of from about 0.25 μm to about 25 μm when being fully hydrated, wherein the lens bulk material has a first equilibrium water content of about 70% by weight or less, wherein the anterior and posterior outer hydrogel layers independent of each other has a second equilibrium water content that is at least 1.2 folds of the first equilibrium water content and at least 80% by weight.

8. A contact lens, having:
- a polyquaternium-1 uptake ("PU") of about 0.40 micrograms/lens or less (or about 0.30 micrograms/lens or less);
- a friction rating of about 2.0 or lower after 30 cycles of digital rubbing treatment or after simulated abrasion cycling treatment; and
- a water content gradient increasing from inside to outside of the contact lens,
- wherein the contact lens comprises a lens bulk material completely covered with an anterior outer hydrogel layer and a posterior outer hydrogel layer, wherein the anterior and posterior outer hydrogel layers independent of each other has a thickness of from about 0.25 μm to about 25 μm when being fully hydrated, wherein the lens bulk material has a first equilibrium water content of about 70% by weight or less, wherein the anterior and posterior outer hydrogel layers independent of each other has a second equilibrium water content that is at least 1.2 folds of the first equilibrium water content and at least 80% by weight.

9. A contact lens, having:
- a polyquaternium-1 uptake ("PU") of about 0.40 micrograms/lens or less (or about 0.30 micrograms/lens or less);
- a water-break-up time of at least 10 seconds after 30 cycles of digital rubbing treatment or after simulated abrasion cycling treatment,
- wherein the contact lens comprises
  - an anterior surface and an opposite posterior surface; and a layered structural configuration which comprises, in a direction from the anterior surface to the posterior surface, an anterior outer hydrogel layer, an inner layer of a lens material, and a posterior outer hydrogel layer,
  - wherein each of the anterior and posterior outer hydrogel layers independent of each other has a reduced surface modulus of at least about 20% relative to the inner layer.

10. A contact lens, having:
- a polyquaternium-1 uptake ("PU") of about 0.40 micrograms/lens or less (or about 0.30 micrograms/lens or less);
- a friction rating of about 2.0 or lower after 30 cycles of digital rubbing treatment or after simulated abrasion cycling treatment,
- wherein the contact lens comprises
  - an anterior surface and an opposite posterior surface; and a layered structural configuration which comprises, in a direction from the anterior surface to the posterior surface, an anterior outer hydrogel layer, an inner layer of a lens material, and a posterior outer hydrogel layer,
  - wherein each of the anterior and posterior outer hydrogel layers independent of each other has a reduced surface modulus of at least about 20% relative to the inner layer.

11. The contact lens of embodiment 9 or 10, wherein each of the anterior and posterior outer hydrogel layers independent of each other has a reduced surface modulus of at least 25% relative to the inner layer.

12. The contact lens of embodiment 9 or 10, wherein each of the anterior and posterior outer hydrogel layers independent of each other has a reduced surface modulus of at least 30% relative to the inner layer.

13. The contact lens of embodiment 9 or 10, wherein each of the anterior and posterior outer hydrogel layers independent of each other has a reduced surface modulus of at least 35% relative to the inner layer.

14. The contact lens of embodiment 9 or 10, wherein each of the anterior and posterior outer hydrogel layers independent of each other has a reduced surface modulus of at least 40% relative to the inner layer.

15. A contact lens, having:
   a normalized surface compression force at an indentation depth of 400 nm of about 12 μN/MPa or lower as determined in microindentation tests with a 1 mm microindentation probe;
   a polyquaternium-1 uptake ("PU") of about 0.40 micrograms/lens or less (or about 0.30 micrograms/lens or less); and
   a water-break-up time of at least 10 seconds after 30 cycles of digital rubbing treatment or after simulated abrasion cycling treatment,
   wherein the contact lens comprises an anterior surface, an opposite posterior surface, and a layered structural configuration, wherein the layered structural configuration comprises, in a direction from the anterior surface to the posterior surface, an anterior outer hydrogel layer, an inner layer of a lens material, and a posterior outer hydrogel layer.

16. A contact lens, having:
   a normalized surface compression force at an indentation depth of 400 nm of about 12 μN/MPa or lower as determined in microindentation tests with a 1 mm microindentation probe;
   a polyquaternium-1 uptake ("PU") of about 0.40 micrograms/lens or less (or about 0.30 micrograms/lens or less); and,
   a friction rating of about 2.0 or lower after 30 cycles of digital rubbing treatment or after simulated abrasion cycling treatment,
   wherein the contact lens comprises an anterior surface, an opposite posterior surface, and a layered structural configuration, wherein the layered structural configuration comprises, in a direction from the anterior surface to the posterior surface, an anterior outer hydrogel layer, an inner layer of a lens material, and a posterior outer hydrogel layer.

17. A contact lens, having:
   a normalized surface compression force at an indentation depth of 400 nm of about 12 μN/MPa or lower as determined in microindentation tests with a 1 mm microindentation probe;
   a polyquaternium-1 uptake ("PU") of about 0.40 micrograms/lens or less (or about 0.30 micrograms/lens or less); and
   a water-break-up time of at least 10 seconds after 30 cycles of digital rubbing treatment or after simulated abrasion cycling treatment,
   wherein the contact lens comprises a lens bulk material which is a polymeric material.

18. A contact lens, having:
   a normalized surface compression force at an indentation depth of 400 nm of about 12 μN/MPa or lower as determined in microindentation tests with a 1 mm microindentation probe;
   a polyquaternium-1 uptake ("PU") of about 0.40 micrograms/lens or less (or about 0.30 micrograms/lens or less); and
   a friction rating of about 2.0 or lower after 30 cycles of digital rubbing treatment or after simulated abrasion cycling treatment,
   wherein the contact lens comprises a lens bulk material which is a polymeric material.

19. The contact lens according to any one of embodiments 15 to 18, wherein the contact lens has a normalized surface compression force at an indentation depth of 400 nm of about 10 μN/MPa or lower.

20. The contact lens according to any one of embodiments 15 to 18, wherein the contact lens has a normalized surface compression force at an indentation depth of 400 nm of about 8 μN/MPa or lower.

21. The contact lens according to any one of embodiments 15 to 18, wherein the contact lens has a normalized surface compression force at an indentation depth of 400 nm of about 6 μN/MPa or lower.

22. The contact lens according to any one of embodiments 15 to 18, wherein the contact lens has a normalized surface compression force at an indentation depth of 400 nm of about 4 μN/MPa or lower.

23. A contact lens, having:
   a reduction in indentation force at an indentation depth of 400 nm, $\Delta(IF)_{400\ nm}$, of about 50% or larger (preferably about 55% or larger, more preferably about 60% or larger, even more preferably about 65% or larger, most preferably about 70% or larger);
   a polyquaternium-1 uptake ("PU") of about 0.40 micrograms/lens or less (or about 0.30 micrograms/lens or less); and
   a water-break-up time of at least 10 seconds after 30 cycles of digital rubbing treatment or after simulated abrasion cycling treatment,
   wherein the contact lens comprises an anterior surface, an opposite posterior surface, and a layered structural configuration, wherein the layered structural configuration comprises, in a direction from the anterior surface to the posterior surface, an anterior outer hydrogel layer, an inner layer of a lens material, and a posterior outer hydrogel layer.

24. A contact lens, having:
   a reduction in indentation force at an indentation depth of 400 nm, $\Delta(IF)_{400\ nm}$, of about 50% or larger (preferably about 55% or larger, more preferably about 60% or larger, even more preferably about 65% or larger, most preferably about 70% or larger);
   a polyquaternium-1 uptake ("PU") of about 0.40 micrograms/lens or less (or about 0.30 micrograms/lens or less); and,
   a friction rating of about 2.0 or lower after 30 cycles of digital rubbing treatment or after simulated abrasion cycling treatment,
   wherein the contact lens comprises an anterior surface, an opposite posterior surface, and a layered structural configuration, wherein the layered structural configuration comprises, in a direction from the anterior surface to the posterior surface, an anterior outer hydrogel layer, an inner layer of a lens material, and a posterior outer hydrogel layer.

25. A contact lens, having:
   a reduction in indentation force at an indentation depth of 400 nm, $\Delta(IF)_{400\ nm}$, of about 50% or larger (preferably about 55% or larger, more preferably about 60% or larger, even more preferably about 65% or larger, most preferably about 70% or larger);
   a polyquaternium-1 uptake ("PU") of about 0.40 micrograms/lens or less (or about 0.30 micrograms/lens or less); and
   a water-break-up time of at least 10 seconds after 30 cycles of digital rubbing treatment or after simulated abrasion cycling treatment, wherein the contact lens comprises a lens bulk material which is a polymeric material.

26. A contact lens, having:
a reduction in indentation force at an indentation depth of 400 nm, $\Delta(IF)_{400\ nm}$, of about 50% or larger (preferably about 55% or larger, more preferably about 60% or larger, even more preferably about 65% or larger, most preferably about 70% or larger);
a polyquaternium-1 uptake ("PU") of about 0.40 micrograms/lens or less (or about 0.30 micrograms/lens or less); and
a friction rating of about 2.0 or lower after 30 cycles of digital rubbing treatment or after simulated abrasion cycling treatment,
wherein the contact lens comprises a lens bulk material which is a polymeric material.

27. The contact lens according to any one of embodiments 23 to 26, wherein $\Delta(IF)$ 400 nm is determined in nano-indentation tests by using a probe having a tip radius of about 9.0±0.9 μm and calculated by $$\Delta(IF)_{400\ nm} = 1 - \frac{(IF)_t}{2.12 \cdot E' - 0.38}$$

in which $(IF)_t$ is the measured indentation force at an indentation depth of 400 nm of the contact lens and E' is the bulk elastic modulus (E') of the contact lens.

28. The contact lens according to any one of embodiments 23 to 26, wherein $\Delta(IF)$ 400 nm is determined in microindentation tests by using 1 mm hemispherical borosilicate glass probe and calculated by $$\Delta(IF)_{400\ nm} = 1 - \frac{(IF)_t}{13.98 \cdot E' + 0.62}$$

in which $(IF)_t$ is the measured indentation force at an indentation depth of 400 nm of the contact lens and E' is the bulk elastic modulus (E') of the contact lens.

29. The contact lens according to any one of embodiments 23 to 28, wherein $\Delta(IF)_{400\ nm}$ is about 55% or larger.

30. The contact lens according to any one of embodiments 23 to 28, wherein $\Delta(IF)$ 400 nm is about 60% or larger.

31. The contact lens according to any one of embodiments 23 to 28, wherein $\Delta(IF)$ 400 nm is about 65% or larger.

32. The contact lens according to any one of embodiments 23 to 28, wherein $\Delta(IF)$ 400 nm is about 70% or larger.

33. The contact lens according to any one of embodiments 1 to 32, wherein the contact lens has a polyquaternium-1 uptake ("PU") of about 0.20 micrograms/lens or less.

34. The contact lens according to any one of embodiments 1 to 32, wherein the contact lens has a polyquaternium-1 uptake ("PU") of about 0.15 micrograms/lens or less.

35. The contact lens according to any one of embodiments 1 to 32, wherein the contact lens has a polyquaternium-1 uptake ("PU") of about 0.10 micrograms/lens or less.

36. The contact lens according to any one of embodiments 1 to 32, wherein the contact lens has a polyquaternium-1 uptake ("PU") of about 0.075 micrograms/lens or less.

37. The contact lens according to any one of embodiments 1 to 32, wherein the contact lens has a polyquaternium-1 uptake ("PU") of about 0.050 micrograms/lens or less.

38. The contact lens according to any one of embodiments 1 to 37, wherein the contact lens has a water-break-up time of at least 10 seconds after 30 cycles of digital rubbing treatment.

39. The contact lens according to any one of embodiments 1 to 37, wherein the contact lens has a water-break-up time of at least 12.5 seconds after 30 cycles of digital rubbing treatment.

40. The contact lens according to any one of embodiments 1 to 37, wherein the contact lens has a water-break-up time of at least 15 seconds after 30 cycles of digital rubbing treatment.

41. The contact lens according to any one of embodiments 1 to 37, wherein the contact lens has a water-break-up time of at least 17.5 seconds after 30 cycles of digital rubbing treatment.

42. The contact lens according to any one of embodiments 1 to 37, wherein the contact lens has a water-break-up time of at least 20 seconds after 30 cycles of digital rubbing treatment.

43. The contact lens according to any one of embodiments 1 to 37, wherein the contact lens has a water-break-up time of at least 10 seconds after simulated abrasion cycling treatment.

44. The contact lens according to any one of embodiments 1 to 37, wherein the contact lens has a water-break-up time of at least 12.5 seconds after simulated abrasion cycling treatment.

45. The contact lens according to any one of embodiments 1 to 37, wherein the contact lens has a water-break-up time of at least 15 seconds after simulated abrasion cycling treatment.

46. The contact lens according to any one of embodiments 1 to 37, wherein the contact lens has a water-break-up time of at least 17.5 seconds after simulated abrasion cycling treatment.

47. The contact lens according to any one of embodiments 1 to 37, wherein the contact lens has a water-break-up time of at least 20 seconds after simulated abrasion cycling treatment.

48. The contact lens according to any one of embodiments 1 to 47, wherein the inner layer or the lens bulk material is a preformed hard contact lens essentially made of a hard plastic material.

49. The contact lens of embodiment 48, wherein the hard plastic material is a crosslinked polymethacrylate.

50. The contact lens according to any one of embodiments 1 to 47, wherein the inner layer or the lens bulk material is a preformed rigid gas permeable contact lens essentially made of a rigid gas permeable lens material.

51. The contact lens according to any one of embodiments 48 to 50, wherein the anterior and posterior outer hydrogel layers independent of each another have a thickness of from about 1.0 μm to about 20 μm when being fully hydrated.

52. The contact lens according to any one of embodiments 48 to 50, wherein the anterior and posterior outer hydrogel layers independent of each another have a thickness of from about 2.0 μm to about 15 μm when being fully hydrated.

53. The contact lens according to any one of embodiments 48 to 50, wherein the anterior and posterior outer hydrogel layers independent of each another have a thickness of from about 2.0 μm to about 10 μm when being fully hydrated.

54. The contact lens according to any one of embodiments 48 to 50, wherein the anterior and posterior outer hydrogel layers independent of each another have a thickness of from about 2.5 μm to about 8 μm when being fully hydrated.

55. The contact lens according to any one of embodiments 1 to 47, wherein the inner layer or the lens bulk material is a preformed soft silicone contact lens essentially made of a crosslinked silicone material.

56. The contact lens of embodiment 55, wherein the anterior and posterior outer hydrogel layers independent of each another have a thickness of from about 2.0 μm to about 25 μm when being fully hydrated.

57. The contact lens of embodiment 55, wherein the anterior and posterior outer hydrogel layers independent of each another have a thickness of from about 3.0 μm to about 25 μm when being fully hydrated.

58. The contact lens of embodiment 55, wherein the anterior and posterior outer hydrogel layers independent of each another have a thickness of from about 4.0 μm to about 20 μm when being fully hydrated.

59. The contact lens of embodiment 55, wherein the anterior and posterior outer hydrogel layers independent of each another have a thickness of from about 5.0 μm to about 20 μm when being fully hydrated.

60. The contact lens according to any one of embodiments 1 to 47, wherein the inner layer or the lens bulk material is a preformed hybrid contact lens which has a central optical zone essentially made of a rigid gas permeable lens material and surrounded by a peripheral zone essential made of a non-silicone hydrogel material.

61. The contact lens according to any one of embodiments 1 to 47, wherein the inner layer or the lens bulk material is a preformed non-silicon hydrogel contact lens essentially made of a non-silicone hydrogel material.

62. The contact lens of embodiment 60 or 61, wherein the non-silicon hydrogel material comprises at least 50% by mole of repeating units of at least one hydroxyl-containing vinylic monomer.

63. The contact lens of embodiment 62, wherein said at least one hydroxyl-containing vinylic monomer is selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof.

64. The contact lens of embodiment 62, wherein said at least one hydroxyl-containing vinylic monomer is selected from the group consisting of hydroxyethyl (meth)acrylate, glycerol (meth)acrylate, and vinyl alcohol.

65. The contact lens according to any one of embodiments 60 to 64, wherein the anterior and posterior outer hydrogel layers independent of each another have a thickness of from about 0.25 μm to about 20 μm when being fully hydrated.

66. The contact lens according to any one of embodiments 60 to 64, wherein the anterior and posterior outer hydrogel layers independent of each another have a thickness of from about 0.50 μm to about 15 μm when being fully hydrated.

67. The contact lens according to any one of embodiments 60 to 64, wherein the anterior and posterior outer hydrogel layers independent of each another have a thickness of from about 0.5 μm to about 10 μm when being fully hydrated.

68. The contact lens according to any one of embodiments 60 to 64, wherein the anterior and posterior outer hydrogel layers independent of each another have a thickness of from about 0.5 μm to about 6 μm when being fully hydrated.

69. The contact lens according to any one of embodiments 1 to 47, wherein the inner layer and the lens bulk material independent of each other are a preformed contact lens essentially made of a silicone hydrogel material.

70. The contact lens of embodiment 69, wherein the silicone hydrogel material comprises repeating units of at least one polysiloxane vinylic monomer.

71. The contact lens of embodiment 69 or 70, wherein the silicone hydrogel material comprises repeating units of at least one polysiloxane vinylic crosslinker.

72. The contact lens of any one of embodiments 69 to 71, wherein the silicone hydrogel material comprises repeating units of at least one hydrophilic vinylic monomer.

73. The contact lens of any one of embodiments 69 to 72, wherein the silicone hydrogel material comprises repeating units of at least one hydrophilic N-vinyl amide monomer.

74. The contact lens of any one of embodiments 69 to 73, wherein the silicone hydrogel material comprises repeating units of at least one polycarbosiloxane vinylic monomer.

75. The contact lens of any one of embodiments 69 to 74, wherein the silicone hydrogel material comprises repeating units of at least one polycarbosiloxane vinylic crosslinker.

76. The contact lens of any one of embodiments 69 to 75, wherein the silicone hydrogel material comprises repeating units of at least one silicone-containing vinylic monomer having a bis(trialkylsilyloxy)alkylsilyl or tris(trialkylsilyloxy)silyl group.

77. The contact lens of any one of embodiments 69 to 76, wherein the silicone hydrogel material comprises repeating units of one or more blending vinylic monomers.

78. The contact lens of any one of embodiments 69 to 76, wherein the silicone hydrogel material comprises repeating units of one or more blending vinylic monomers in an amount of about 25% or less by weight, relative to the dry weight of the inner layer of the silicone hydrogel material.

79. The contact lens of any one of embodiments 69 to 76, wherein the silicone hydrogel material comprises repeating units of one or more blending vinylic monomers in an amount of about 20% or less by weight, relative to the dry weight of the inner layer of the silicone hydrogel material.

80. The contact lens of any one of embodiments 69 to 76, wherein the silicone hydrogel material comprises repeating units of one or more blending vinylic monomers in an amount of about 15% or less by weight, relative to the dry weight of the inner layer of the silicone hydrogel material.

81. The contact lens of any one of embodiments 69 to 80, wherein the silicone hydrogel material comprises repeating units of one or more non-silicone vinylic crosslinking agents.
82. The contact lens of any one of embodiments 69 to 80, wherein the silicone hydrogel material comprises repeating units of one or more non-silicone vinylic crosslinking agents in an amount of about 1.0% or less, relative to the dry weight of the inner layer.
83. The contact lens of any one of embodiments 69 to 80, wherein the silicone hydrogel material comprises repeating units of one or more non-silicone vinylic crosslinking agents in an amount of about 0.8% or less, relative to the dry weight of the inner layer.
84. The contact lens of any one of embodiments 69 to 80, wherein the silicone hydrogel material comprises repeating units of one or more non-silicone vinylic crosslinking agents in an amount of from about 0.05% to about 0.6% by weight, relative to the dry weight of the inner layer.
85. The contact lens of any one of embodiments 69 to 84, wherein the silicone hydrogel material has an oxygen permeability of at least about 50 barrers.
86. The contact lens of any one of embodiments 69 to 84, wherein the silicone hydrogel material has an oxygen permeability of at least about 60 barrers.
87. The contact lens of any one of embodiments 69 to 84, wherein the silicone hydrogel material has an oxygen permeability of at least about 70 barrers.
88. The contact lens of any one of embodiments 69 to 84, wherein the silicone hydrogel material has an oxygen permeability of at least about 90 barrers.
89. The contact lens of any one of embodiments 69 to 84, wherein the silicone hydrogel material has an oxygen permeability of at least about 110 barrers.
90. The contact lens of any one of embodiments 69 to 89, wherein the silicone hydrogel material has an equilibrium water content of from about 10% to about 70% by weight.
91. The contact lens of any one of embodiments 69 to 89, wherein the silicone hydrogel material has an equilibrium water content of from about 10% to about 65% by weight.
92. The contact lens of any one of embodiments 69 to 89, wherein the silicone hydrogel material has an equilibrium water content of from about 10% to about 60% by weight.
93. The contact lens of any one of embodiments 69 to 89, wherein the silicone hydrogel material has an equilibrium water content of from about 15% to about 55% by weight.
94. The contact lens of any one of embodiments 69 to 89, wherein the silicone hydrogel material has an equilibrium water content of from about 15% to about 50% by weight.
95. The contact lens of any one of embodiments 69 to 94, wherein the silicone hydrogel material is not naturally wettable, wherein the anterior and posterior outer hydrogel layers independent of each another have a thickness of from about 0.5 µm to about 25 µm when being fully hydrated.
96. The contact lens of any one of embodiments 69 to 94, wherein the silicone hydrogel material is not naturally wettable, wherein the anterior and posterior outer hydrogel layers independent of each another have a thickness of from about 1.0 µm to about 20 µm when being fully hydrated.
97. The contact lens of any one of embodiments 69 to 94, wherein the silicone hydrogel material is not naturally wettable, wherein the anterior and posterior outer hydrogel layers independent of each another have a thickness of from about 1.0 µm to about 15 µm when being fully hydrated.
98. The contact lens of any one of embodiments 69 to 94, wherein the silicone hydrogel material is not naturally wettable, wherein the anterior and posterior outer hydrogel layers independent of each another have a thickness of from about 1.5 µm to about 10 µm when being fully hydrated.
99. The contact lens of any one of embodiments 69 to 98, wherein the silicone hydrogel material is naturally wettable, wherein the anterior and posterior outer hydrogel layers independent of each another have a thickness of from about 0.25 µm to about 20 µm when being fully hydrated.
100. The contact lens of any one of embodiments 69 to 98, wherein the silicone hydrogel material is naturally wettable, wherein the anterior and posterior outer hydrogel layers independent of each another have a thickness of from about 0.5 µm to about 20 µm when being fully hydrated.
101. The contact lens of any one of embodiments 69 to 98, wherein the silicone hydrogel material is naturally wettable, wherein the anterior and posterior outer hydrogel layers independent of each another have a thickness of from about 0.5 µm to about 15 µm when being fully hydrated.
102. The contact lens of any one of embodiments 69 to 98, wherein the silicone hydrogel material is naturally wettable, wherein the anterior and posterior outer hydrogel layers independent of each another have a thickness of from about 1.0 µm to about 10 µm when being fully hydrated.
103. The contact lens of any one of embodiments 1 to 102, wherein the anterior and posterior outer hydrogel layers independent of each another are a crosslinked hydrophilic polymeric material which comprises at least 25% by mole of repeating monomeric units of at least one hydrophilic vinylic monomer selected from the group consisting of an alkyl (meth)acrylamide, N-2-dimethylaminoethyl (meth)acrylamide, dimethylaminoethyl (meth)acrylate, a hydroxyl-containing acrylic monomer, a N-vinyl amide monomer, a methylene-containing pyrrolidone monomer, a (meth)acrylate monomer having a $C_1$-$C_4$ alkoxyethoxy group, a vinyl ether monomer, an allyl ether monomer, and combinations thereof.
104. The contact lens of any one of embodiments 1 to 102, wherein the anterior and posterior outer hydrogel layers independent of each another are a crosslinked hydrophilic polymeric material which comprises at least 35% by mole of repeating monomeric units of at least one hydrophilic vinylic monomer selected from the group consisting of an alkyl (meth)acrylamide, N-2-dimethylaminoethyl (meth)acrylamide, dimethylaminoethyl (meth)acrylate, a hydroxyl-containing acrylic monomer, a N-vinyl amide monomer, a methylene-containing pyrrolidone monomer, a (meth)acrylate monomer having a $C_1$-$C_4$ alkoxyethoxy group, a vinyl ether monomer, an allyl ether monomer, and combinations thereof.
105. The contact lens of any one of embodiments 1 to 102, wherein the anterior and posterior outer hydrogel layers independent of each another are a crosslinked hydrophilic polymeric material which comprises at least 45% by mole of repeating monomeric units of at least one hydrophilic vinylic monomer selected from the group consisting of an alkyl (meth)acrylamide, N-2-dimethylaminoethyl (meth)acrylamide, dimethylaminoethyl (meth)acrylate, a hydroxyl-containing acrylic monomer, a N-vinyl amide monomer, a methylene-containing pyrrolidone monomer, a (meth)acrylate monomer having a $C_1$-$C_4$ alkoxyethoxy group, a vinyl ether monomer, an allyl ether monomer, and combinations thereof.

106. The contact lens of any one of embodiments 1 to 102, wherein the anterior and posterior outer hydrogel layers independent of each another are a crosslinked hydrophilic polymeric material which comprises at least 55% by mole of repeating monomeric units of at least one hydrophilic vinylic monomer selected from the group consisting of an alkyl (meth)acrylamide, N-2-dimethylaminoethyl (meth)acrylamide, dimethylaminoethyl (meth)acrylate, a hydroxyl-containing acrylic monomer, a N-vinyl amide monomer, a methylene-containing pyrrolidone monomer, a (meth)acrylate monomer having a $C_1$-$C_4$ alkoxyethoxy group, a vinyl ether monomer, an allyl ether monomer, and combinations thereof.

107. The contact lens of any one of embodiments 1 to 102, wherein the anterior and posterior outer hydrogel layers independent of each another are a crosslinked hydrophilic polymeric material which comprises at least 25% by mole of repeating monomeric units of at least one phosphrylcholine-containing vinylic monomer.

108. The contact lens of any one of embodiments 1 to 102, wherein the anterior and posterior outer hydrogel layers independent of each another are a crosslinked hydrophilic polymeric material which comprises at least 35% by mole of repeating monomeric units of at least one phosphrylcholine-containing vinylic monomer.

109. The contact lens of any one of embodiments 1 to 102, wherein the anterior and posterior outer hydrogel layers independent of each another are a crosslinked hydrophilic polymeric material which comprises at least 45% by mole of repeating monomeric units of at least one phosphrylcholine-containing vinylic monomer.

110. The contact lens of any one of embodiments 1 to 102, wherein the anterior and posterior outer hydrogel layers independent of each another are a crosslinked hydrophilic polymeric material which comprises at least 55% by mole of repeating monomeric units of at least one phosphrylcholine-containing vinylic monomer.

111. The contact lens of any one of embodiments 1 to 102, wherein the anterior and posterior outer hydrogel layers independent of each another are a crosslinked hydrophilic polymeric material which comprises poly(ethylene glycol) chains.

112. The contact lens of any one of embodiments 1 to 102, wherein the anterior and posterior outer hydrogel layers independent of each another are a crosslinked hydrophilic polymeric material which comprises poly(ethylene glycol) chains derived directly from: (1) a pol (ethylene glycol) having one sole functional group of —$NH_2$, —SH or —COOH; (2) a poly(ethylene glycol) having two terminal functional groups selected from the group consisting of —$NH_2$, —COOH, —SH, and combinations thereof; (3) a multi-arm poly(ethylene glycol) having one or more functional groups selected from the group consisting of —$NH_2$, —COOH, —SH, and combinations thereof; or (4) combinations thereof.

113. The contact lens of any one of embodiments 1 to 112, wherein the anterior and posterior outer hydrogel layers are identical to each other and substantially uniform in thickness, merge at the edge of the contact lens to completely cover the inner layer.

114. The contact lens of any one of embodiments 1 to 113, wherein the anterior and posterior outer hydrogel layers independent of each another comprise an equilibrium water content of at least 80% by weight.

115. The contact lens of any one of embodiments 1 to 113, wherein the anterior and posterior outer hydrogel layers independent of each another comprise an equilibrium water content of at least 85% by weight.

116. The contact lens of any one of embodiments 1 to 113, wherein the anterior and posterior outer hydrogel layers independent of each another comprise an equilibrium water content of at least about 90% by weight.

117. The contact lens of any one of embodiments 1 to 113, wherein the anterior and posterior outer hydrogel layers independent of each another comprise an equilibrium water content of at least 95% by weight.

118. The contact lens of any one of embodiments 1 to 117, wherein the anterior and posterior outer hydrogel layers independent of each another are substantially free of silicone.

119. The contact lens of any one of embodiments 1 to 117, wherein the anterior and posterior outer hydrogel layers independent of each another are totally free of silicone.

120. The contact lens of any one of embodiments 1 to 119, wherein the contact lens further comprises two transition layers of a polymeric material, wherein each of the two transition layers is located between the inner layer or the lens bulk material and one of the anterior and posterior outer hydrogel layers.

121. The contact lens of embodiment 120, wherein the two transition layers merge at the peripheral edge of the contact lens to completely enclose the inner layer of the lens material or the lens bulk material.

122. The contact lens of embodiment 120 or 121, wherein the two transition layers have a thickness of at least about 0.05 μm when being fully hydrated.

123. The contact lens of embodiment 120 or 121, wherein the two transition layers have a thickness of from about 0.05 μm to about 10 μm when being fully hydrated.

124. The contact lens of embodiment 120 or 121, wherein the two transition layers have a thickness of from about 0.1 μm to about 7.5 μm when being fully hydrated.

125. The contact lens of embodiment 120 or 121, wherein the two transition layers have a thickness of from about 0.1 μm to about 5 μm when being fully hydrated.

126. The contact lens of any one of embodiments 120 to 125, wherein each of the two transition layers is a layer of a polyanionic polymer which is neutralized and crosslinked by a polyaziridine which has at least two aziridine groups and a number average molecular weight of 2000 Daltons or less.

127. The contact lens of embodiment 126, wherein the polyanionic polymer is a carboxyl-containing polymer comprising at least 60% by mole of repeating units of one or more carboxyl-containing acrylic monomer.

128. The contact lens of embodiment 126, wherein the polyanionic polymer is polyacrylic acid, polymethacrylic acid, poly(ethylacrylic acid), poly(acrylic acid-co-methacrylic acid), poly[ethylacrylic acid-co-(meth) acrylic acid], poly(N,N-2-acrylamidoglycolic acid), poly[(meth)acrylic acid-co-acrylamide], poly[(meth) acrylic acid-co-vinylpyrrolidone], poly[ethylacrylic acid-co-acrylamide], poly[ethylacrylic acid-co-vinylpyrrolidone], poly[(meth)acrylic acid-co-vinylacetate], poly[ethylacrylic acid-co-vinylacetate], or combinations thereof.
129. The contact lens of embodiment 126, wherein the polyanionic polymer is a graft polymer which is grafted onto the inner layer or the lens bulk material, wherein the graft polymer comprises repeating units of at least one carboxyl-containing vinylic monomer.
130. The contact lens of embodiment 127, wherein the polyanionic polymer is a graft polymer which is grafted onto the inner layer or the lens bulk material, wherein the graft polymer comprises repeating units of at least one carboxyl-containing acrylic monomer.
131. The contact lens of any one of embodiments 126 to 130, wherein the polyaziridine is trimethylolpropane tris(2-methyl-1-aziridinepropionate), pentaerythritol tris[3-(1-aziridinyl)propionate], trimethylolpropane tris (3-aziridinopropionate), a Michael reaction product of a vinylic crosslinker having at least two (meth)acryloyl groups with 2-methylaziridine or aziridine, or a combination thereof.
132. The contact lens of any one of embodiments 1 to 131, wherein the anterior and posterior outer hydrogel layers independent of each another has a reduced surface modulus of at least about 25% relative to the inner layer.
133. The contact lens of any one of embodiments 1 to 131, wherein the anterior and posterior outer hydrogel layers independent of each another has a reduced surface modulus of at least about 30% relative to the inner layer.
134. The contact lens of any one of embodiments 1 to 131, wherein the anterior and posterior outer hydrogel layers independent of each another has a reduced surface modulus of at least about 35% relative to the inner layer.
135. The contact lens of any one of embodiments 1 to 131, wherein the anterior and posterior outer hydrogel layers independent of each another has a reduced surface modulus of at least about 40% relative to the inner layer.
136. The contact lens of any one of embodiments 1 to 135, wherein the contact lens has a friction rating of about 1.5 or lower after 30 cycles of digital rubbing treatment.
137. The contact lens of any one of embodiments 1 to 135, wherein the contact lens has a friction rating of about 1.0 or lower after 30 cycles of digital rubbing treatment.
138. The contact lens of any one of embodiments 1 to 135, wherein the contact lens has a friction rating of about 0.5 or lower after 30 cycles of digital rubbing treatment.
139. A contact lens, having:
an anterior surface and an opposite posterior surface;
a polyquaternium-1 uptake ("PU") of about 0.40 micrograms/lens or less (or about 0.30 micrograms/lens or less);
a water-break-up time of at least 10 seconds after 30 cycles of digital rubbing treatment or after simulated abrasion cycling treatment; and
a structural configuration that is characterized by having a cross-sectional surface-modulus profile which comprises, along a shortest line between the anterior and posterior surfaces on the surface of a cross section of the contact lens, an anterior outer zone including and near the anterior surface, an inner zone including and around the center of the shortest line, and a posterior outer zone including and near the posterior surface, wherein the anterior outer zone has an average anterior surface modulus ($\overline{SM_{Ant}}$) while the posterior outer zone has an average posterior surface modulus ($\overline{SM_{Post}}$), wherein the inner zone has an average inner surface modulus ($\overline{SM_{Inner}}$), wherein at least one of $$\frac{\overline{SM_{Inner}} - \overline{SM_{Post}}}{\overline{SM_{Inner}}} \times 100\% \text{ and } \frac{\overline{SM_{Inner}} - \overline{SM_{Ant}}}{\overline{SM_{Inner}}} \times 100\%$$

is at least about 20%.
140. The contact lens of embodiment 139, wherein the contact lens has a water-break-up time of at least 10 seconds after 30 cycles of digital rubbing treatment.
141. The contact lens of embodiment 139, wherein the contact lens has a water-break-up time of at least 12.5 seconds after 30 cycles of digital rubbing treatment.
142. The contact lens of embodiment 139, wherein the contact lens has a water-break-up time of at least 15 seconds after 30 cycles of digital rubbing treatment.
143. The contact lens of embodiment 139, wherein the contact lens has a water-break-up time of at least 17.5 seconds after 30 cycles of digital rubbing treatment.
144. The contact lens of embodiment 139, wherein the contact lens has a water-break-up time of at least 20 seconds after 30 cycles of digital rubbing treatment.
145. The contact lens of embodiment 139, wherein the contact lens has a water-break-up time of at least 10 seconds after simulated abrasion cycling treatment.
146. The contact lens of embodiment 139, wherein the contact lens has a water-break-up time of at least 12.5 seconds after simulated abrasion cycling treatment.
147. The contact lens of embodiment 139, wherein the contact lens has a water-break-up time of at least 15 seconds after simulated abrasion cycling treatment.
148. The contact lens of embodiment 139, wherein the contact lens has a water-break-up time of at least 17.5 seconds after simulated abrasion cycling treatment.
149. The contact lens of embodiment 139, wherein the contact lens has a water-break-up time of at least 20 seconds after simulated abrasion cycling treatment.
150. A contact lens, having:
an anterior surface and an opposite posterior surface;
a polyquaternium-1 uptake ("PU") of about 0.40 micrograms/lens or less (or about 0.30 micrograms/lens or less);
a friction rating of about 2.0 or lower after 30 cycles of digital rubbing treatment or after simulated abrasion cycling treatment; and
a structural configuration that is characterized by having a cross-sectional surface-modulus profile which comprises, along a shortest line between the anterior and posterior surfaces on the surface of a cross section of the contact lens, an anterior outer zone including and near the anterior surface, an inner zone including and around the center of the shortest line, and a posterior outer zone including and near the posterior surface, wherein the anterior outer zone has an average anterior surface modulus ($\overline{SM_{Ant}}$) while the posterior outer zone has an average posterior surface modulus ($\overline{SM_{Post}}$), wherein the inner zone has an average inner surface modulus ($\overline{SM_{Inner}}$), wherein at least one of $$\frac{\overline{SM_{Inner}} - \overline{SM_{Post}}}{\overline{SM_{Inner}}} \times 100\% \text{ and } \frac{\overline{SM_{Inner}} - \overline{SM_{Ant}}}{\overline{SM_{Inner}}} \times 100\%$$

is at least about 20%.

151. The contact lens of embodiment 150, wherein the contact lens has a friction rating of about 2.0 or lower after 30 cycles of digital rubbing treatment.

152. The contact lens of embodiment 150, wherein the contact lens has a friction rating of about 1.5 or lower after 30 cycles of digital rubbing treatment.

153. The contact lens of embodiment 150, wherein the contact lens has a friction rating of about 1.0 or lower after 30 cycles of digital rubbing treatment.

154. The contact lens of embodiment 150, wherein the contact lens has a friction rating of about 0.5 or lower after 30 cycles of digital rubbing treatment.

155. The contact lens of embodiment 150, wherein the contact lens has a friction rating of about 2.0 or lower after simulated abrasion cycling treatment.

156. The contact lens of embodiment 150, wherein the contact lens has a friction rating of about 1.5 or lower after simulated abrasion cycling treatment.

157. The contact lens of embodiment 150, wherein the contact lens has a friction rating of about 1.0 or lower after simulated abrasion cycling treatment.

158. The contact lens of embodiment 150, wherein the contact lens has a friction rating of about 0.5 or lower after simulated abrasion cycling treatment.

159. The contact lens according to any one of embodiments 139 to 158, wherein at least one of $$\frac{\overline{SM_{Inner}} - \overline{SM_{Post}}}{\overline{SM_{Inner}}} \times 100\% \text{ and } \frac{\overline{SM_{Inner}} - \overline{SM_{Ant}}}{\overline{SM_{Inner}}} \times 100\%$$

is at least 25%.

160. The contact lens according to any one of embodiments 139 to 158, wherein at least one of $$\frac{\overline{SM_{Inner}} - \overline{SM_{Post}}}{\overline{SM_{Inner}}} \times 100\% \text{ and } \frac{\overline{SM_{Inner}} - \overline{SM_{Ant}}}{\overline{SM_{Inner}}} \times 100\%$$

is at least 30%.

161. The contact lens according to any one of embodiments 139 to 158, wherein at least one of $$\frac{\overline{SM_{Inner}} - \overline{SM_{Post}}}{\overline{SM_{Inner}}} \times 100\% \text{ and } \frac{\overline{SM_{Inner}} - \overline{SM_{Ant}}}{\overline{SM_{Inner}}} \times 100\%$$

is at least 35%.

162. The contact lens according to any one of embodiments 139 to 158, wherein at least one of $$\frac{\overline{SM_{Inner}} - \overline{SM_{Post}}}{\overline{SM_{Inner}}} \times 100\% \text{ and } \frac{\overline{SM_{Inner}} - \overline{SM_{Ant}}}{\overline{SM_{Inner}}} \times 100\%$$

is at least 40%.

163. The contact lens according to any one of embodiments 139 to 162, wherein the contact lens has a polyquaternium-1 uptake ("PU") of about 0.20 micrograms/lens or less.

164. The contact lens according to any one of embodiments 139 to 162, wherein the contact lens has a polyquaternium-1 uptake ("PU") of about 0.15 micrograms/lens or less.

165. The contact lens according to any one of embodiments 139 to 162, wherein the contact lens has a polyquaternium-1 uptake ("PU") of about 0.10 micrograms/lens or less.

166. The contact lens according to any one of embodiments 139 to 162, wherein the contact lens has a polyquaternium-1 uptake ("PU") of about 0.075 micrograms/lens or less.

167. The contact lens according to any one of embodiments 139 to 162, wherein the contact lens has a polyquaternium-1 uptake ("PU") of about 0.050 micrograms/lens or less.

168. The contact lens of any one of embodiments 1 to 167, wherein the contact lens has a UVB transmittance of about 10% or less between 280 and 315 nanometers, a UVA transmittance of about 30% or less between 315 and 380 nanometers, and a Violet transmittance of from 0% to about 70% between 380 nm and 440 nm.

169. The contact lens of embodiment 168, wherein the contact lens has a UVB transmittance of about 5% or less between 280 and 315 nanometers.

170. The contact lens of embodiment 168, wherein the contact lens has a UVB transmittance of about 2.5% or less between 280 and 315 nanometers.

171. The contact lens of embodiment 168, wherein the contact lens has a UVB transmittance of about 1% or less between 280 and 315 nanometers.

172. The contact lens of any one of embodiments 168 to 171, wherein the contact lens has a UVA transmittance of about 20% or less between 315 and 380 nanometers.

173. The contact lens of any one of embodiments 168 to 171, wherein the contact lens has a UVA transmittance of about 10% or less between 315 and 380 nanometers.

174. The contact lens of any one of embodiments 168 to 171, wherein the contact lens has a UVA transmittance of about 5% or less between 315 and 380 nanometers.

175. The contact lens of any one of embodiments 168 to 174, wherein the contact lens has a Violet transmittance of from 5% to about 60% between 380 nm and 440 nm.

176. The contact lens of any one of embodiments 168 to 174, wherein the contact lens has a Violet transmittance of from 5% to about 50% between 380 nm and 440 nm.

177. The contact lens of any one of embodiments 168 to 174, wherein the contact lens has a Violet transmittance of from about 5% to about 40% between 380 nm and 440 nm.

178. The contact lens of any one of embodiments 1 to 177, wherein the contact lens is substantially free (i.e., less than three) of surface cracking lines visible under dark field after the contact lens is rubbed between fingers for 10 times.

179. The contact lens of any one of embodiments 1 to 177, wherein the contact lens is totally free of surface cracking lines visible under dark field after the contact lens is rubbed between fingers for 10 times.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Chemicals

The following abbreviations are used in the following examples: AMA represents allyl methacrylate; NVP represents N-vinylpyrrolidone; DMA represents N,N-dimethylacrylamide; VMA represents N-vinyl-N-methyl acetamide; MMA represents methyl methacrylate; TEGDMA represent triethyleneglycol dimethacrylate; TEGDVE represents triethyleneglycol divinyl ether; EGMA represents ethylene glycol methyl ether methacrylate; VAZO 64 represents 2,2'-dimethyl-2,2'azodipropiononitrile; Nobloc is 2-[3-(2H-Benzotriazol-2-yl)-4-hydroxyphenyl]ethyl methacrylate from Aldrich; UV28 represents 2-{2'-Hydroxy-3'-tert-butyl-5'-[3'-methacryloyloxypropoxy]phenyl}-5-chloro-2H-benzotriazole; RB246 is Reactive Blue 246; RB247 is Reactive Blue 247; TAA represents tert-amyl alcohol; PrOH represents 1-propanol; IPA represents isopropanol; PAA represents polyacrylic acid; PMAA represents polymethacrylic acid; PAE represents polyamidoamine-epichlorohydrin (a.k.a., polyamine-epichlorohydrin); MPC represent 2-methacryloyloxyethyl phosphorylcholine; Poly(AAm-co-AA) represents poly(acrylamide-co-acrylic acid); PZ-28 represents trimethylolpropane tris(2-methyl-1-aziridinepropionate); PZ-33 represents pentaerythritol tris[3-(1-aziridinyl)propionate]; BTP or Bis-TRIS-propane represent bis[tris (hydroxymethyl)methylamino]propane; Tris-HCl represents Tris(hydroxymethyl)aminomethane hydrochloride; EDTA represents ethylenediaminetetraacetic acid; PBS represents a phosphate-buffered saline which has a pH of 7.2±0.2 at 25° C. and contains about 0.044 wt. % $NaH_2PO_4 \cdot H_2O$, about 0.388 wt. % $Na_2HPO_4 \cdot 2H_2O$, and about 0.79 wt. % NaCl and; wt. % represents weight percent; mSi1 represents monobutyl-terminated monomethacryloxypropyl-terminated polydimethylsiloxane (Mw~600 to 800 g/mol from Gelest); D9 represents monobutyl-terminated monomethacryloxypropyl-terminated polydimethylsiloxane (Mw~984 g/mol from Shin-Etsu); LM-CEPDMS represents a di-methacrylate-terminated chain-extended polydimethylsiloxane (Mn~6000 g/mol), which has three polydimethylsiloxane (PDMS) segments linked via diurethane linkages between two PDMS segments and two urethane linkages each located between one terminal methacrylate group and one PDMS segment, is prepared according to a method similar to what described in Example 2 of U.S. Pat. No. 8,529,057; "GA" macromer represents a di-methacryloyloxypropyl-terminated polysiloxane (Mn~6.8K g/mol, OH content ~1.2 meq/g) of formula (A); "G4" macromer represents a di-methacryloyloxypropyl-terminated polysiloxane (Mn~13.5K g/mol, OH content ~1.8 meq/g) of formula (A).

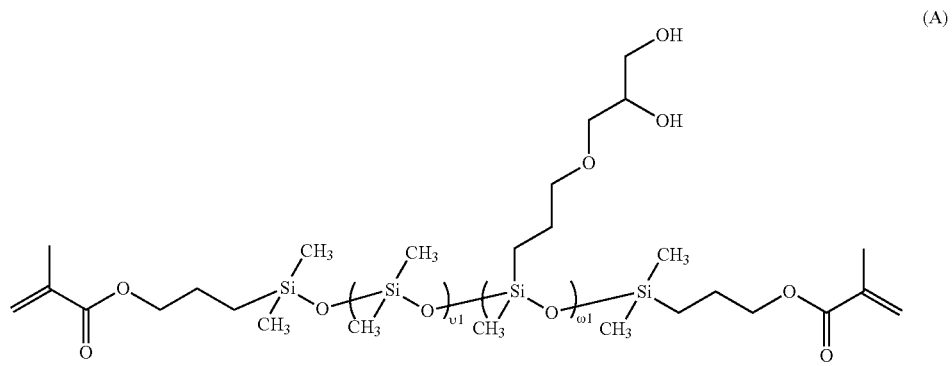

(A)

Oxygen Permeability Measurements

The apparent oxygen permeability ($DK_{app}$), the apparent oxygen transmissibility (Dk/t), the intrinsic (or edge-corrected) oxygen permeability ($Dk_c$) of a lens and a lens material are determined according to procedures described in Example 1 of U.S. patent application publication No. 2012/0026457 A1.

Digital Rubbing Treatment

The lenses are digitally rubbed (wearing disposable powder-free latex gloves) with RENU® multi-purpose lens care solution (or another multi-purpose lens care solution) for 20 seconds and then rinsed with saline. The above procedure is repeated for i time (i.e., i cycles of digital rubbing) that imitates daily cleaning in a i-days lens care regime, e.g. 7 times (i.e., 7 cycles of digital rubbing) that imitates daily cleaning and disinfecting in a 7-days lens care regime), or 30 times (i.e., 30 cycles of digital rubbing) that imitates daily cleaning and disinfecting in a 30-days lens care regime.

Simulated Abrasion Cycling Treatment

Figure 3:
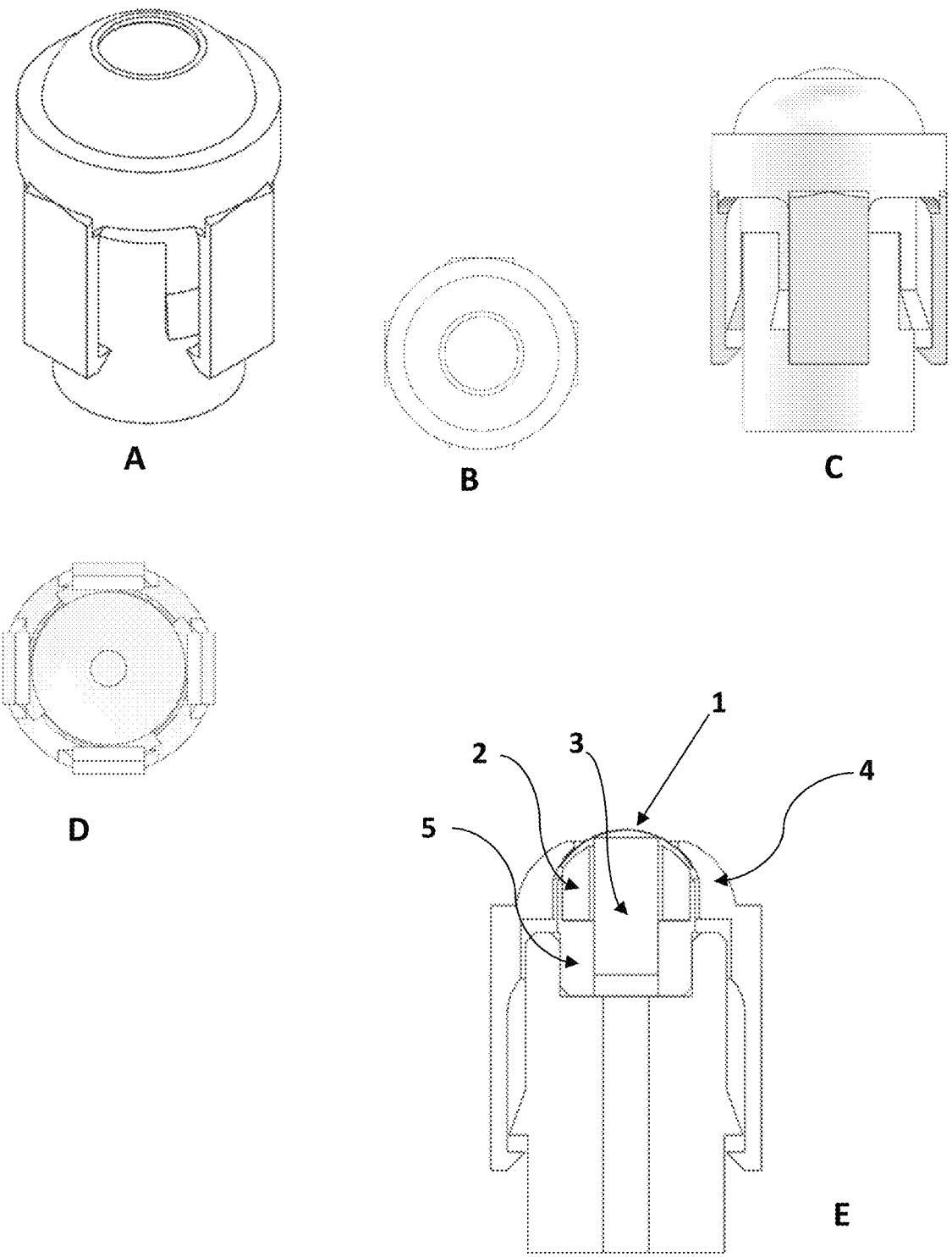
FIG. 3 schematically illustrates a lens holder for performing the simulated abrasion cycling treatment of a lens in order to determine the long-lasting lubricity and/or long-lasting wettability of a contact lens of the invention: A—Perspective view; B—Top view; C—Side view; D—Bottom view; and E—sectional view.

To simulate a worst-case scenario for manual cycling, a simulated abrasion technique is used to ensure consistent pressure and shearing conditions. To do this, a customized lens holder is made to grip the lens while shearing the lens. As shown in FIG. 3, the lens (part 1) is placed on a rubber insert (part 2) with a 7.7 mm diameter central shaft (part 3) fitted axially. The top clip (part 4) is clipped onto the bottom clip (part 5), which holds the lens tightly against the silicone gasket. The central shaft is then extended so the lens is sticking above the outer body surface, exposing the lens circular area around the center of the lens. Optionally, a piece of cloth (i.e. Twillx 1622, Berkshire) can be placed between the central shaft and contact lens to enhance abrasion visualization.

The entire lens holder is placed on the attachment end of the Taber linear abrader system (Taber Industries, model 5750, http://www.taberindustries.com/linear-abraser). With no added weights are attached, the entire weight of the bearing arm and lens holder (230 g normal force) is applied to the 47 mm² contact lens area, allowing 49 kPa to be applied to the counter surface. For the counter surface, a sheet of silicone rubber (10A, ¼" thick) is placed underneath the bearing arm, and a reservoir channel is clipped to the silicone rubber. The reservoir is then filled with PBS at room temperature.

During the experiment, the lens holder is slowly dropped to the counter surface, and the lens is abraded 20 times (3" per stroke, 6" total travel per cycle) at a frequency of 75 cycles per minute. The lens surface can be analyzed using the water break up time methodology, lubricity evaluation, and/or Sudan Black staining test.

While this technique applies a shear force well beyond what a typical contact lens would experience, this controlled shearing technique (i.e., simulated abrasion cycling treatment) is found to be a reasonable equivalent of 30 cycles of digital rubbing treatment and provides assurance that these contact lenses will be able to handle even the harshest mechanical cycling.

Lubricity Evaluation.

The lubricity of a contact lens is evaluated by using a finger-felt lubricity test which characterizes qualitatively the slipperiness of a lens surface on a friction rating scale of from 0 to 4. The higher the friction rating is, the lower the slipperiness (or lubricity).

Commercial lenses: DAILIES® TOTAL1®; ACUVUE® OASYS™; ACUVUE® ADVANCE PLUS™; DAILIES® Aqua Comfort Plus®; and AIR OPTIX®, are assigned a friction rating (designated "FR" hereinafter) of 0, 1, 2, 3, and 4 respectively. They are used as standard lenses for determining the friction rating of a lens under test.

The samples are placed in PBS for at least two rinses of 30 minutes each and then transferred to fresh PBS before the evaluation. Before the evaluation, hands are rinsed with a soap solution, extensively rinsed with DI water and then dried with KimWipe® towels. The samples are handled between the fingers and a numerical number is assigned for each sample relative to the above standard lenses described above. For example, if lenses are determined to be only slightly better than AIR OPTIX® lenses, then they are assigned a number 3. The value of a friction rating is one obtained by averaging the results of at least two friction ratings of a contact lens by two or more persons and/or by averaging the friction ratings of two or more contact lenses (from the identical batch of lens production) by one person.

The finger lubricities (i.e., friction ratings) of a contact lens can be determined either directly out-of-pack (OOP) but after ≥30 min soaking in PBS) or after i cycles (e.g., 7, 14, 21, or 30 cycles) of digital rubbing treatment, or after simulated abrasion cycling treatment according to the procedures described above.

Surface Wettability Tests

Water contact angle (WCA) on a contact lens is a general measure of the surface wettability of a contact lens. In particular, a low water contact angle corresponds to more wettable surface. The dynamic captive bubble contact angles of contact lenses are measured using a FDS instrument device from FDS Future Digital Scientific Corp. The FDS equipment is capable of measuring the advancing and receding contact angles. The measurement is performed on hydrated contact lenses at room temperature. A contact lens is removed from the vial and soaked in ~40 mL fresh PBS and shake for at least 30 minutes, then replace with fresh PBS, soak and shake for another 30 minutes unless otherwise specified. The contact lens is then put on a lens paper and dabbed to remove surface water prior to be placed on top of a lens holder with front curve up then screw the lens holder top on. Place the secure lens holder into the glass cell cuvette filled with filtered PBS. Place the glass cell cuvette onto the stage of the FDS instrument. Adjust the stage height and the syringe needle to dispense the air bubble to the lens surface. Repeat dispense/withdrawal 3 cycles for every lens to get the advancing and receding contact angles. The receding contact angles are reported in the examples below.

Water Break-Up Time (WBUT) Tests

The surface hydrophilicity of lenses (after autoclave) is assessed by determining the time required for the water film to start breaking on the lens surface. Lenses exhibiting WBUT≥10 seconds are considered to have a hydrophilic surface and are expected to exhibit adequate wettability (ability to support the tear film) on-eye.

Lenses are prepared for water breakup measurement by removing the lens from its blister with soft plastic tweezers (e.g., those from Menicon) and placing the lens in a test tube containing phosphate buffered saline. The test tube contains 10 mL phosphate buffered saline per lens, 1 lens per test tube. Lenses are soaked overnight (at least 16 hours) before testing.

WBUT is measured at room temperature as follows: the lens is removed from the test tube and placed on a pedestal submerged in PBS. The pedestal is then raised out of the PBS solution (t=0), and a video camera monitors the fluid flowing off the lens surface. When the lens surface fluid breaks, this WBUT time is recorded. Optionally, a stop watch can be used to measure the time between when the pedestal is raised out of the PBS and when the lens surface fluid breaks. The pedestal is withdrawn, pulling the lens beneath the surface of the PBS. At least 3 spots per lenses are measured, and at least 3 lenses are measured to obtain an average WBUT measurement for each lens group.

Equilibrium Water Content

The equilibrium water content (EWC) of contact lenses is determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Mechanical Properties at the Surfaces of Contact Lenses

All contact lenses can have different mechanical properties at their surfaces. In particular, where a contact lens having a soft hydrogel coating thereon. The mechanical properties of a contact lens in the region near the surface and including the surface can be characterized by measuring surface compression force or indentation forces as function of displacement in a micro-indentation or nano-indentation test.

It is discovered that the indentation force at a given displacement or indentation depth (e.g., 400 nm) correlates well with the bulk elastic (Young's) modulus for contact lenses without any soft hydrogel coating thereon (i.e., there is a linear bulk elastic modulus-indentation force relationship between the bulk elastic modulus and the indentation force at a given displacement), whereas, for contact lenses having a soft hydrogel coating thereon, the indentation force at a given displacement is much smaller than what is predicted based on the linear bulk elastic modulus-indentation force relationship. The Such a deviation can be used as a good measure for a soft hydrogel coating on a contact lens.

Micro-Indentation Tests

The surface compression force of a contact lens at an indentation depth of 400 nm is measured in micro-indentation tests as follows. A contact lens to be tested is rinsed and allowed to stand overnight in PBS. Then, the lens is placed on a hemispheric stand, submerged in PBS, and indented with a piezo-driven, quasi-static transducer indentation system (Bruker's Hysitron® BioSoft™ In-Situ Indenter) with a 1 mm hemispherical borosilicate glass probe. The probe is cleaned by using a plasma cleaner (e.g., oxygen, air or argon plasma cleaner) and coated with F-127 Pluronic (by dipping in an aqueous solution of F-127 at a concentration higher than F-127's CMC, e.g., about 0.1% by weight) between each experiment. The probe is attached to the indentation system and lowered at a constant indentation rate of 1 μm/sec following a typical loading and unloading curve (i.e., normal force vs indentation depth). Normal force and displacement position (or indentation depth) are measured simultaneously by the quasistatic transducer at a rate of 125 Hz. The above-described procedure is repeated for twenty times (i.e., 20 indentations) per lens. The surface compression force (in unit of micro-Newton, UN) at an indentation depth of 400 nm is obtained by averaging all normal forces at an indentation depth of 400 nm along each of the twenty indentation loading curves. The normalized surface compression force (NSCF) is obtained by dividing the obtained surface compression force at an indentation depth of 400 nm by the elastic modulus of the contact lens under test.

Nano-Indentation Tests

The indentation force of a contact lens at an indentation depth of 400 nm is measured in micro-indentation tests as follows.

Figure 4:
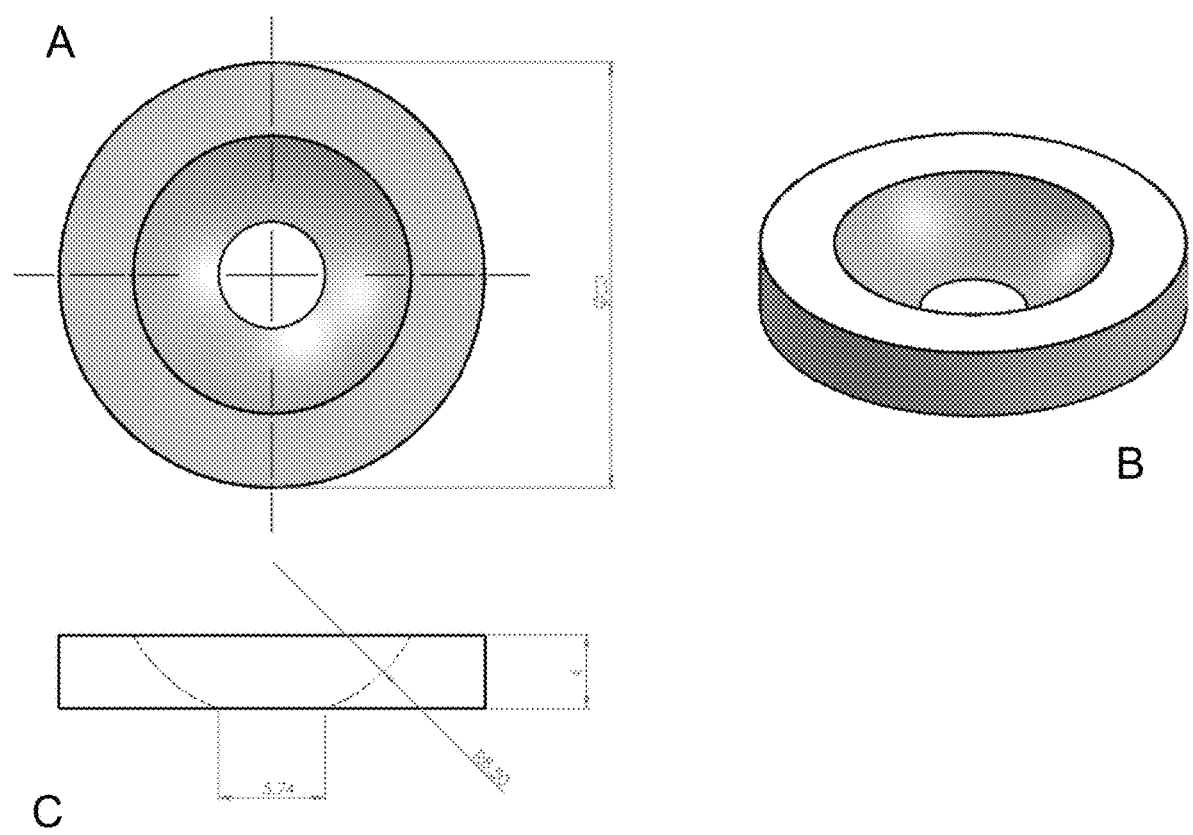
FIG. 4 schematically illustrates a lens holder for performing nano-indentation measurements of contact lenses with Optics11 Puima nano-indentation instrument: A—Top view; B—Perspective view; and C—sectional view.

The Optics11 Piuma device is used to determine indentation forces as function of displacement. Before indentations are performed, the Piuma probe is calibrated in PuriLens™ Plus, which is a sterile and preservative-free saline solution from LifeStyle Company, Inc. (Freehold, NJ). This calibration consists of first calibrating the optical sensor while the probe is submersed in PuriLens™ Plus but not engaged in contact with a surface of a substrate. Next, a second cantilever calibration is performed by making a test indentation on a slide of glass. Lenses are rinsed with PuriLens™ Plus to wash off excess lens package solution, then blotted dry. Next, the lens is placed front curve down into a 3D-printed lens holder (FIG. 4). Then, the base curve is filled partially with PuriLens™ Plus to hold the lens in place, provided that the volume of added PuriLens™ Plus should not be too big to cause overflowing the base curve during the test. Finally, the Piuma probe is brought just above the lens surface, and the nano-indentation routine is performed according to the manufacturer's typical procedures. The indentation routine consists of a 10 μm indentation at a rate of 1 μm/sec, with a sampling rate of at a rate of 100 Hz. The probe moves to the surface, where the contact point is determined by the first deflection detected by the cantilever.

Two different Piuma probes are used to collect data: the first one is a Piuma probe with a stiffness of 0.500 N/m and a tip radius of 9.500 μm; and the other is a Piuma probe with a stiffness of 4.710 N/m and a tip radius of 9.000 μm. Since both probes indent to the same depth (400 nm), the contact areas are slightly different. The area of contact of these spherical caps ($S_{cap}$) can be calculated by:

$$S_{cap} = 2\pi R h$$

in which "R" is the tip radius and h is the indentation depth. Therefore, the two probe tips have a surface area of contact of 23.9 μm² and 22.6 μm² at an indentation depth of 400 nm, or a difference of only 5%. The resulting pressure of the 9 μm tip should only be 5% higher than the 9.5 μm tip. This small pressure difference should have little impact upon the measured forces compared between these tips.

It should understood that it is more desirable to use one single type of Piuma probe in all the nano-indentation experiments. However, if multiple Piuma probes are needed for to optimize contact lens measurement that have a wide range of bulk elastic modulus (e.g., from 0.2 MPa to 1.5 MPa), Piuma probes having a difference in tip radius of about 10% or less can be used.

As the indentation is performed, both the depth of the indentation and the indentation force is recorded. Five lenses per lens type are tested, and three measurements are made per lens. This results in a total of 15 data points per lens group.

All the raw data is processed using MATLAB and analyzed using Excel. The indentation force value at an indentation depth of 400 nm is determined by interpolating between the nearest two force values. For each lens group, all the indentation forces at an indentation depth of 400 nm are averaged and the averaged indentation force at an indentation depth of 400 nm is used to characterize the contact lens for that lens group.

Transmittance

Contact lenses are manually placed into a specially fabricated sample holder or the like which can maintain the shape of the lens as it would be when placing onto eye. This holder is then submerged into a 1 cm path-length quartz cell containing PBS as the reference. A UV/visible spectrophotometer, such as, Varian Cary 3E UV-Visible Spectrophotometer with a LabSphere DRA-CA-302 beam splitter or the like, can be used in this measurement. Percent transmission spectra are collected at a wavelength range of 250-800 nm with % T values collected at 0.5 nm intervals. This data is transposed onto an Excel spreadsheet and used to determine if the lenses conform to Class 1 UV absorbance. Transmittance is calculated using the following equations:

$$UVA\ \%\ T = \frac{\text{Average }\%\ T\text{ between }380-316\text{ nm}}{\text{Luminescence }\%T} \times 100$$

$$UVB \% T = \frac{\text{Average } \% T \text{ between } 280-315 \text{ nm}}{\text{Luminescence } \%T} \times 100$$

$$\text{Violet } \% T = \frac{\text{Average } \% T \text{ between } 440-380 \text{ nm}}{\text{Luminescence } \%T} \times 100$$

in which Luminescence % T is the average % transmission between 380 and 780.

Determinations of Polyquaternium-1 Uptake (PU).

Polyquaternium-1 uptake by a contact lens is determined according to a DNA intercalation procedure based on a PicoGreen dsDNA assay kit (i.e. Quanti-iT PicoGreen dsDNA kit, ThermoFisher). Polyquaternium-1 uptake by a contact lens is determined as follows:

A basis solution is prepared by dissolving the following components in purified water: 5 ppm myristamidopropyldimethylamine; 1000 ppm sodium decanoyl ethylenediamine triacetate; 83 ppm sodium citrate dehydrate; 1000 ppm NaCl; 1000 ppm Tetronic 1304; 1150 ppm sodium borate decahydrate; and 10000 ppm propylene glycol and then by adjusting pH to about 7.8.

The Polyquaternium-1 (PQ) testing solution is prepared by dissolving a desired amount in the basis solution prepared above to have 5 ppm PQ and then by adjusting pH to about 7.8 if necessary. A series of PQ standard solutions each having a concentration within a range are prepared to establish a calibration curve between 0 and 6 ppm (or higher) of PQ.

Contact lenses are removed from their individual lens packages and shaken in 25 ml PBS per lens for 30 minutes. The PBS-soaked lenses are blotted with a paper towel (preferably with W4 polypropylene towels from Kimberly Clark) with a fixed weight (i.e. 0.6 kg) before being incubated overnight.

A 24-well plate will be used in the overnight incubation experiment. The wells are divided into the following categories: negative-control wells each containing 0.5 mL of the basis solution and two blotted contact lenses fully immersed therein; positive-control wells each containing 0.5 mL of the polyquaternium-1 testing solution; samples wells each containing 0.5 mL of the polyquaternium-1 testing solution and two blotted contact lenses fully immersed therein; standard wells each containing 0.5 mL of one of the standard solutions. The 24-well plate then is shaken for 20 minutes on an orbital shaker and then sits on a bench top overnight (for 16-20 hours) at room temperature.

A 25 µL aliquot from each of the wells of the overnight incubated 24-well plate is added to a 96-well plate (e.g. DNA LoBind, Eppendorf) cell well containing 450 µL of a Lambda DNA solution (1 µg/mL Lambda DNA; 10 mM Tris-HCl; 1 mM EDTA; pH 7.5). The solution is mixed and incubated on an orbital shaker at 700-800 rpm for 60 minutes.

A 100 µL aliquot from each of the DNA-incubated cell wells are transferred to a 96-well plate (e.g., black opaque, med bind, Grenier). Then 100 µL of the PicoGreen solution (ThermoFisher, diluted with Tris-EDTA buffer [10 mM Tris-HCl, 1 mM EDTA, pH 7.5] per kit instructions) are added to each of those wells and mixed. The cell wells are then incubated on an orbital shaker for 5 minutes at 250 rpm. Each plate is read with a fluorescence plate reader (e.g., Victor X5 Plate Reader, Perkin Elmer) using standard fluorescence excitation and emission wavelengths for the PicoGreen. Each sample is compared against the linear fit of the standard curve to obtain final PQ concentration in each solution. The amount of PQ uptake per lens is obtained by multiplying the incubation volume and dividing by the number of lenses incubated. The PQ uptake by the lens is calculated to be the difference in [polyquaternium-1] between the DNA-incubated positive-control and sample solutions, times the incubation volume (0.5 mL) and divide by 2.

Surface Cracking (SC) Tests

Tests for evaluating surface cracking are carried out as follows. Remove lens from the package. Invert the lens inside-out gently (i.e., rendering the lens in the invert form) by holding the edge of the lens between the thumb and index finger of one hand. The concave side of the lens should face the experimenter's body. With the thumb and/or index finger of the other hand, gently bend the top of the lens over the index finger holding the lens until the lens confirmation inverts. Following that, fold the lens gently in half and apply slight pressure to the folded lens. Afterward, revert the lens to its original form prior to the lens inversion and repeat the aforementioned steps. Place the lens in a Petri dish and inspect lens using a darkfield stereomicroscope. Lens surface cracking is first inspected at low magnification (i.e., 10-20×) with focus on the center of the lens, if crack lines are not distinguishable, lens is further inspected at high magnification (e.g., 35-45×). If no cracking is observed in 45× magnifications, lens receives a surface cracking rating of zero (0). If cracking is observed, the cracking rating is accomplished by counting the number of split lines: rating of 1=2-4 lines in field-of-view; rating of 2=5-8 lines; rating of 3≥8 lines.

Coating Intactness Tests

The intactness of a coating on the surface of a contact lens can be tested according to Sudan Black stain test as follow. Contact lenses with a coating (an LbL coating, a plasma coating, a hydrogel coating, or any other coatings) are dipped into a Sudan Black dye solution (Sudan Black in the mixture ~80% mineral oil and ~20% vitamin E oil). Sudan Black dye is hydrophobic and has a great tendency to be adsorbed by a hydrophobic material or onto a hydrophobic lens surface or hydrophobic spots on a partially coated surface of a hydrophobic lens (e.g., silicone hydrogel contact lens). If the coating on a hydrophobic lens is intact, no staining spots should be observed on or in the lens. All of the lenses under test are fully hydrated. Visible fine lines on lens surface may indicate the presence of cracking of the cross-linked coatings.

COMPARATIVE EXAMPLE

The approaches disclosed in US2016/0326046 A1 are used in this example to reduce uptakes of positively-charged antimicrobials by water gradient contact lenses.

PMAA-coating solution. A polymethacrylic acid (PMAA) coating solution is prepared by dissolving an amount of PMAA (Mn: 300-600 kDa, from Polysciences, Inc.) in a given volume of 1-propanol/water (90%/10% wt/wt) mixture to have a concentration of about 0.011% by weight and the pH is adjusted with formic acid to about 2.0.

PAE Sol-1. A PAE solution is prepared by dissolving an amount of polyamidoamine epichlorohydrin (Kymene) in a given volume of water to have a concentration of about 0.5% by weight and the pH is adjusted to a desired pH (e.g., 2.0, 3.5, 7, or 9).

PAE Sol-2. A PAE solution is prepared by dissolving an amount of polyamidoamine epichlorohydrin (Kymene) in a given volume of a mixture of water (68% by weight) and 1-propanol (32% by weight) to have a concentration of about 0.5% by weight and the pH is adjusted to pH 2.0.

Preparation of In-Package-Coating (IPC) Saline—IPC-1

A MPC-containing copolymer (Mw 230-320 kD) comprising about 90 mole % of 2-methacryloyloxyethyl phosphorylcholine (MPC) and about 10 mole % of

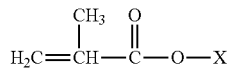

in which X is a monovalent radical of —$CH_2CH(OH)CH_2SCH_2CH_2NH_2$ or —$CH_2CH(CH_2OH)SCH_2CH_2NH_2$ is prepared according to procedures similar to those described in Example 1-2 of U.S. Pat. No. 9,127,099B2. The MPC-containing copolymer used is an aqueous solution with solid content ~10 wt % of the MPC-containing copolymer.

PAE solutions (Kymene) are purchased from Ashland as an aqueous solution and used as received.

IPC-1 saline is prepared as follows. Mix about 74 wt % of the MPC-containing copolymer solution, about 6 wt % PAE solution, and about 20 wt % of a phosphate buffer (about 0.22 wt % $NaH_2PO_4 \cdot H_2O$, 1.95 wt % $Na_2HPO_4 \cdot 2H_2O$, and about 4 wt % NaCl) (the concentration of the MPC-containing copolymer and PAE are about 10 times of the final saline). Adjust pH to ~7.3 by 1N NaOH. React the mixture in a water bath at temperature=70° C. for 4 hours to form water-soluble thermally-crosslinkable polymeric material (i.e., "in-package-crosslinking agent) or "IPC agent"). Remove the mixture from water bath and cool down in a room temperature water bath. Dilute the mixture 10 times with PBS and adjust pH to ~7.3. Filter the mixture by 0.22 μm PES sterile filter unit.

Cast-Molded Silicone Hydrogel (SiHy) Contact Lenses. SiHy contact lenses (uncoated) are cast-molded according to the procedures described in Example 3 of US2016/0326046 A1.

Application of Crosslinked Coating. The cast-molded SiHy contact lenses are extracted and coated by dipping in a series of baths: $1^{st}$-$3^{rd}$ baths—3 MEK baths (about 22 seconds, about 138 seconds and about 224 seconds respectively); $4^{th}$ bath—DI water bath (about 56 seconds); $5^{th}$-$7^{th}$ baths—shown in Table 1; $8^{th}$ bath—DI water (about 56 seconds unless indicated otherwise); $9^{th}$—DI water (about 56 seconds); $10^{th}$ baths—DI water (about 168 seconds). All the bath temperatures are at room temperature (i.e., about 22-26° C.) unless indicated otherwise. After the $10^{th}$ bath, the contact lenses are individually packaged in polypropylene lens packaging shells (blisters) with 0.6 mL of IPC-1 saline (half of the IPC-1 saline is added prior to inserting the lens). The blister is then sealed with foil and autoclaved for about 30 minutes at 121° C., forming crosslinked coatings on the lenses.

TABLE 1

| Lens Sample | Bath 5 | | Bath 6 | | Bath 7 | |
|---|---|---|---|---|---|---|
| | [PMAA] | time (s) | solution | time (s) | Solution | time (s) |
| T1 | 200 ppm | 44 | PBS | 56 | PAE Sol-1 (pH2.0) | 300 |
| T2 | 200 ppm | 44 | PBS | 56 | PAE Sol-1 (pH7.0) | 300 |
| T3 | 200 ppm | 44 | PBS | 56 | PAE Sol-1 (pH9.0) | 300 |
| T4 | 133 ppm | 44 | PBS | 56 | PAE Sol-1 (pH2.0) | 300 |
| T5 | 200 ppm | 44 | PAE Sol-2 | 300 | DI water | 56 |
| T6 | 133 ppm | 44 | PAE Sol-2 | 56 | DI water | 56 |
| T7 | 133 ppm | 44 | PAE Sol-2 | 300 | DI water | 56 |
| T8$^a$ | 200 ppm | 44 | PBS | 56 | DI water | 300 |
| T9$^a$ | 200 ppm | 120 | PBS | 56 | DI water | 300 |
| T10 | mixture$^b$ | 44 | PBS | 56 | DI water | 300 |
| C1 | 200 ppm | 44 | DI water | 56 | DI water | 56 |
| C2 | 200 ppm | 44 | PrOH:$H_2O^c$ | 56 | DI water | 56 |
| C3$^a$ | 133 ppm | 44 | DI water | 56 | DI water | 56 |
| C4$^a$ | 200 ppm | 120 | DI water | 56 | DI water | 56 |
| C5 | 133 ppm | 44 | DI water | 56 | DI water | 56 |
| C6 | 133 ppm | 44 | PrOH:$H_2O^c$ | 56 | DI water | 56 |

$^a$ — The temperature of the $8^{th}$ bath is about 80 °C. and the dipping time is about 30 minutes;
$^b$ — a solution containing 200 ppm of PMAA and 0.5% by weight of PAE (pH~2);
$^c$ — mixture of PrOH and DI water at a weight ration of 68/32 (pH 2.0).

Then the lenses are tested for the amount of carboxyl groups per lens according to the procedure described in Example 2 of US2016/0326046A1, and also are subjected to digital rubbing tests and evaluated for lubricity (friction rating) according to the procedures described in Example 1.

Control lenses (C3 and C4) and testing lenses (T8 and T9) have a lubricity of 4 directly out of packages and were not subjecting to cycling-lubricity tests. Such results may indicate that heating the lenses with PMAA coating thereon could lead to lose PMMA so significantly that there is an insufficient amount of PMAA left on the lens for reacting with the thermally-crosslinkable material to form a hydrogel top coating.

Testing lenses (T2 and T3) have a lubricity of 3 and 4 respectively directly out of packages. Such results may indicate that at a higher pH (7 or 9), PMAA is charged and PAE cannot penetrate into the PMAA coating but forms a layer on top of the PMAA coating. The top layer of PAE would prevent the underneath PMAA from reacting with the thermally-crosslinkable polymeric material to form a hydrogel top coating. During autoclave, the top layer of PAE would be crosslinked with the PMAA coating to form a crosslinked coating with inferior lubricity.

The results in Table 2 in indicate that the approaches disclosed in US2016/0326046A1 may not be sufficient to produce water gradient contact lens with inadequate lubricity after cycled with Renu lens care solution and no noticeable reduction in uptake of positively-charged antimicrobials.

TABLE 2

| Lens Sample | Lubricity | | | | [COOH] (nmole/lens) |
|---|---|---|---|---|---|
| | 0X | 7X | 14X | 30X | |
| C1 | 0 | 0 | 2.2 | 4 | |
| C2 | 0 | 0 | 3.4 | 4 | |
| C5 | 0 | 0.3 | 2 | 4 | 12.0 |
| C6 | 0 | 0.4 | 2 | 4 | 12.4 |
| T1 | 0 | 0 | 0.5 | 2.1 | |
| T4 | 0 | 0 | 0.8 | 2.6 | 13.7 |
| T5 | 0 | 0 | 0.3 | 2.2 | |
| T6 | 0 | 0 | 2 | 3.6 | |
| T7 | 0 | 0 | 1 | 3.2 | 12.6 |
| T10 | 0 | 3 | 4 | 4 | |

Example 2

Preparation of Polymerizable Compositions

Two lens formulations (polymerizable compositions), I and II, are prepared to have compositions (in unit parts) as shown in Table 3.

TABLE 3

| Compositions | Formulation No. | |
|---|---|---|
| (Unit weight parts) | I | II |
| mSi1 | 34 | 34 |
| LM-CEPDMS | 6 | 0 |
| GA | 0 | 6 |
| NVP | 40 | 40 |
| MMA | 10 | 10 |
| EGMA | 10 | 10 |
| TEGDMA | 0.2 | 0.4 |
| AMA | 0.1 | 0.1 |
| Nobloc | 0.9 | 1.0 |
| Vazo 64 | 0.5 | 0.5 |
| RB 246 | 0.01 | 0 |
| RB 247 | 0 | 0.01 |
| TAA | 0 | 1 |

The formulations are prepared by adding listed components in their targeted amounts into a clean bottle, with a stir bar to mix at 600 rpm for 30 minutes at room temperature. After all the solid is dissolved, a filtration of the formulation is carried out by using 2.7 μm glass-microfiber-filter (GMF).

Cast-Molded Silicone Hydrogel Contact Lenses

A lens formulation is purged with nitrogen at room temperature for 30 to 35 minutes. The $N_2$-purged lens formulation is introduced into polypropylene molds and thermally cured under the following curing conditions: ramp from room temperature to 55° C. at a ramp rate of about 7° C./minute; holding at 55° C. for about 30 minutes; ramp from 55° C. to 80° C. at a ramp rate of about 7° C./minute; holding at 55° C. for about 30 minutes; ramp from 80° C. to 100° C. at a ramp rate of about 7° C./minute; and holding at 100° C. for about 30 minutes. The molds are opened and the molded lenses are removed from the molds.

Formulations I and II are used for coating studies in the examples below. In general, Formulation II is used unless otherwise specified.

The obtained silicone hydrogel (SiHy) contact lenses are subjected to the following post-molding processes before lens characterization. After demolding, SiHy lenses prepared above are immersed twice in PBS for about 60 minutes at room temperature. After rinsing in PBS with 5 min, the lens then is placed in polypropylene lens packaging shells (or blisters) (one lens per shell) with 0.6 mL of PBS. The blisters are then sealed with foil and autoclaved for about 45 minutes at about 121° C. The SiHy lenses have an oxygen permeability (measured according to polarographic method) of about 91 barrers (for Formulation I) or about 83 barrers (for Formulation II), a bulk elastic modulus of about 0.80 MPa (for formulation I) or 0.67 MPa (for formulation II), a water content of about 49% by weight (for Formulation I) or about 50% by weight (for Formulation II), a relative ion permeability of about 12.5 relative to Alsacon lens (for Formulation I) or about 11.0 relative to Alsacon lens (for Formulation II), a WBUT of zero second, and a friction rating of 4.

Example 3

Preparation of Polymerizable Compositions

Lens formulations (polymerizable compositions), III to VI, are prepared to have compositions (in unit parts) as shown in Table 4.

TABLE 4

| | Formulation III | Formulation IV | Formulation V | Formulation VI |
|---|---|---|---|---|
| D9 | 33 | 33 | 33 | 33 |
| G4 | 10 | 10 | 10 | 10 |
| NVP | 46 | 46 | 46 | 46 |
| MMA | 10 | 10 | 10 | 10 |
| TEGDMA | 0.2 | 0.2 | 0.2 | 0.65 |
| Norbloc | 1.5 | 1.5 | 1.8 | 1.5 |
| UV28 | 0.26 | 0.26 | 0 | 0.4 |
| VAZO 64 | 0.5 | 0.5 | 0.5 | 0.5 |
| RB247 | 0.01 | 0.01 | 0.01 | 0.01 |
| TAA | 10 | 10 | 10 | 10 |
| Curing Profile | 55/80/100° C. 30 min/2 hr/30 min | 55/80/100° C. 40 min/40 min/40 min | 55/80/100° C. 30 min/120 min/30 min | 55/80/100° C. 30 min/120 min/30 min |

The formulations are prepared by adding listed components in their targeted amounts into a clean bottle, with a stir bar to mix at 600 rpm for 30 minutes at room temperature. After all the solid is dissolved, a filtration of the formulation is carried out by using 2.7 μm glass-microfiber-filter.

Cast-Molded Silicone Hydrogel Contact Lenses

A lens formulation is purged with nitrogen at room temperature for 30 to 35 minutes. The $N_2$-purged lens formulation is introduced into polypropylene molds and thermally cured in an oven under the following curing conditions: ramping from room temperature to a first temperature and then holding at the first temperature for a first curing time period; ramping from the first temperature to a second temperature and holding at the second temperature for a second curing time period; optionally ramping from the second temperature to a third temperature and holding at the third temperature for a third curing time period; and optionally ramping from the third temperature to a fourth temperature and holding at the fourth temperature for a fourth curing time period.

Lens molds are opened by using a demolding machine with a push pin. Lenses are pushed onto base curve molds with a push pin and then molds are separated into base curve mold halves and front curve mold halves. The base curve mold halves with a lens thereon are placed in an ultrasonic device (e.g., Dukane's single horn ultrasonic device). With a certain energy force, a dry state lens is released from mold. The dry state lens is loaded in a designed extraction tray. Alternatively, lenses can be removed from the base curve mold halves by floating off (i.e., soaking in an organic solvent, e.g., IPA, without ultrasonic).

The obtained silicone hydrogel (SiHy) contact lenses are subjected to the following post-molding processes before lens characterization. After demolding, SiHy lenses prepared above are extracted with 100% IPA for 15 minutes, immersed in 50%/50% IPA/water mixture for 30 minutes and then in DI water for 30 minutes, and finally rinsed with PBS saline for about 60 minutes at room temperature. After rinsing in PBS with 5 min, the lens then is placed in polypropylene lens packaging shells (or blisters) (one lens per shell) with 0.6 mL of PBS. The blisters are then sealed with foil and autoclaved for about 45 minutes at about 121° C. The resultant SiHy contact lenses are characterized according to the procedures to have the following properties: Dkc ~105 barrers—118 barrers; EWC ~54%-57%; elastic modulus ~0.45 MPa-0.62 MPa; WBUT ~23 seconds-40 seconds; water contact angle by captive bubble ~ 47°-52°, a friction rating of about 2.0.

Example 4

Preparation of PAA Aqueous Solution

An aqueous solution of polyacrylic acid (PAA) is prepared by adding adequate amount of PAA (Mn~450 KD) in water (distilled or deionized water). After PAA is fully dissolved, the pH is adjusted by adding ~1.85% formic acid to the PAA aqueous solution to about 2. The target concentration of PAA is about 0.1% by weight. The prepared PAA aqueous solution is filtered to remove any particulate or foreign matter.

Phosphate Buffered Saline (PBS)

A phosphate buffered saline is prepared by dissolving $NaH_2PO_4 \cdot H_2O$, $Na_2HPO_4 \cdot 2H_2O$, and in a given volume of purified water (distilled or deionized) to have the following composition: ca. 0.044 w/w % $NaH_2PO_4 \cdot H_2O$, ca. 0.388 w/w/% $Na_2HPO_4 \cdot 2H_2O$, and ca. 0.79 w/w % NaCl.

Phosphate Buffered (PB) without NaCl (PB, No NaCl)

PB is prepared using the same procedure for preparing PBS, but no NaCl is added.

IPC-2 Saline

IPC-2 saline is prepared by dissolving/mixing appropriate amounts of Poly(AAm-co-AA)(90/10), PAE, $NaH_2PO4 \cdot H_2O$, $Na_2HPO_4 \cdot 2H_2O$ and NaCl in DI (de-ionized) water to have the following concentrations: about 0.132 wt. % of poly(AAm-co-AA); about 0.11 wt. % PAE; about 0.044 wt. % $NaH_2PO4 \cdot H_2O$, about 0.388 wt. % $Na_2HPO_4 \cdot 2H_2O$, and about 0.79 wt. % NaCl and then by adjusting pH to about 7.3. Poly(AAm-co-AA)(90/10) partial sodium salt, poly(AAm-co-AA) 90/10, Mw 200,000) is purchased from Polysciences, Inc. and used as received. The prepared solution is pre-treated at 65° C. for about 6 hours. After the heat pre-treatment, the IPC saline is cooled down back to room temperature. Up to 5 ppm hydrogen peroxide maybe added to the final IPC saline to prevent bioburden growth and the IPC saline is filtered using a 0.22 micron membrane filter.

SiHy Lenses with PAA Base Coating

After de-molding, dry SiHy contact lenses (prepared in Example 2, formulation II) are placed in adequate trays. Then the trays with lenses are immersed in a PAA solution for a certain periods of time, either for 120 min in one bath of PAA, or in two consecutive baths of PAA with 30 min dip in the $1^{st}$ bath and 90 min dip in the $2^{nd}$ bath. The PAA dip solution is heated to above room temperature, for example 40° C. Adequate agitation (e.g. horizontal shaking or up-down movement) may be used to ensure appropriate flow of PAA solution during the dip step.

After PAA dip, the lenses are transferred to a bath with PB for up to about an hour, usually at room temperature. Adequate agitation (e.g. horizontal shaking or up-down movement) may be used to ensure appropriate flow of PB during the dip step.

Then lenses are transferred to a bath with water for about 5~10 min, usually at room temperature. Adequate agitation (e.g. horizontal shaking or up-down movement) may be used to ensure appropriate flow of water during the dip step.

Water Gradient SiHy Contact Lenses

SiHy lenses with a PAA base coating thereon, prepared above, are placed in polypropylene lens packaging shells (one lens per shell) with 0.55 mL or 0.65 ml of the IPC-2 saline (about half of the saline may be added prior to inserting the lens). The blisters are then sealed with foil and autoclaved for about 45 minutes at about 121° C., forming SiHy contact lenses with a cross-linked hydrophilic coating (i.e., a hydrogel coating) thereon.

Surface Properties of Water Gradient SiHy Contact Lenses

The resultant water gradient SiHy contact lenses directly out of package are lubricious (having a friction rating of 1) and have a WBUT of more than 10 seconds and a water contact angle by sessile drop (static) of about 30 degrees.

Example 5

Water gradient contact lenses prepared in Example 4 is used in this example. They are determined to have a PU (polyquaternium-1 uptake) of about 9 μg/lens.

Preparation of Aqueous Polyaziridine Solution

1% (by weight) PZ-28 solution is prepared by simply adding PZ-28 into PBS and adjusting the pH to about 7.5; 1% (by weight) PZ-33 solution is prepared by simply adding PZ-33 into PBS and adjusting the pH to about 7.5.

Reduction in PU by Water Gradient Contact Lenses

Water gradient contact lenses prepared in Example 4 are individually repackaged in polypropylene lens packaging shells (one lens per shell) with 0.55 mL or 0.65 ml of 1% PZ-28 solution and autoclaved at about 121° C. for about 45 minutes. The resultant lenses are still lubricous (having a friction rating of 1) and has a PU of 0.56 μg/lens, i.e., a PU reduction of $$93.8\% \left( \frac{9 - 0.56}{9} \times 100\% \right).$$

Water gradient contact lenses prepared in Example 4 are individually repackaged in polypropylene lens packaging shells (one lens per shell) with 0.55 mL or 0.65 ml of 1% PZ-33 solution and autoclaved at about 121° C. for about 45 minutes. The resultant lenses are still lubricous (a friction rating of 1) and with a PU of 1.95 μg/lens, i.e., a PU reduction of 78.3%.

Example 6

Preparation of PMAA Solution

A solution of polymethacrylic acid (PMAA) is prepared by adding adequate amount of PMAA (Mn~400-700 kDa, from PolyMaterials, Inc.) in IPA/water (50/50 volume ratio) mixture to have a concentration of about 0.12 wt. %. After PMAA is fully dissolved, the pH is adjusted by adding formic acid to the PMAA solution to about 2. The prepared PMAA solution is filtered to remove any particulate or foreign matter.

Phosphate Buffered Saline (PBS)

PBS is prepared according to the procedures described in Example 4.

Phosphate Buffered (PB) without NaCl (PB, No NaCl)

PB is prepared according to the procedures described in Example 4.

Preparation of Aqueous Polyaziridine Solution

1% (by weight) PZ-28 solution is prepared by simply adding PZ-28 into PBS and adjusting the pH to about 7.5; 1% (by weight) PZ-33 solution is prepared by simply adding PZ-33 into PBS and adjusting the pH to about 7.5.

IPC-3 Saline

A MPC-containing copolymer (Mw 230-320 kD) comprising about 90 mole % of 2-methacryloyloxyethyl phosphorylcholine (MPC) and about 10 mole % of $$H_2C=\overset{CH_3}{\underset{|}{C}}H-\overset{O}{\underset{\|}{C}}-O-X$$

in which X is a monovalent radical of —CH$_2$CH(OH)CH$_2$SCH$_2$CH$_2$NH$_2$ or —CH$_2$CH(CH$_2$OH)SCH$_2$CH$_2$NH$_2$ is prepared according to procedures similar to those described in Example 1-2 of U.S. Pat. No. 9,127,099B2. The MPC-containing copolymer used is an aqueous solution with solid content ~10 wt % of the MPC-containing copolymer.

PAE solutions (Kymene) are purchased from Ashland as an aqueous solution and used as received.

IPC-3 saline is prepared as follows. Mix about 74.3 wt % of the MPC-containing copolymer solution, about 3.7 wt % PAE solution, and about 22 wt % of a phosphate buffer (about 0.22 wt % NaH$_2$PO$_4$·H$_2$O, 1.95 wt % Na$_2$HPO$_4$·2H$_2$O, and about 4 wt % NaCl) (the concentration of the MPC-containing copolymer and PAE are about 10 times of the final saline). Adjust pH to ~7.3 by 1N NaOH. React the mixture in a water bath at temperature=70° C. for 4 hours to form water-soluble thermally-crosslinkable polymeric material (i.e., "in-package-crosslinking agent) or "IPC agent"). Remove the mixture from water bath and cool down in a room temperature water bath. Dilute the mixture 10 times with PBS and adjust pH to ~7.3. Filter the mixture by 0.22 μm PES sterile filter unit.

Water Gradient SiHy Contact Lenses

After de-molding, cast-molded SiHy contact lenses (prepared in Example 3) are extracted with isopropanol (IPA) for 180 minutes for lens extraction, dip-coated in the PMAA solution prepared above for about one hour, rinsed with PBS for about 60 minutes, and then are packaged/sealed in polypropylene lens packaging shells (blisters) with 0.6 mL of the IPC-3 saline (half of the IPC-3 saline is added prior to inserting the lens). The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing.

The resultant water gradient SiHy contact lenses is fairly lubricious (having a friction rating of 2), a WBUT of more than 10 seconds, and a PU (polyquaternium-1 uptake) of 1.2 μg/lens.

Reduction in Uptake of PU by Water Gradient Contact Lenses

Water gradient contact lenses prepared above are individually repackaged in polypropylene lens packaging shells (one lens per shell) with 0.55 mL or 0.65 ml of 1% PZ-28 solution and autoclaved at about 121° C. for about 45 minutes. The resultant lenses are still fairly lubricous (having a friction rating of about 1.7) and has a PU of 0.06 μg/lens, i.e., a PU reduction of

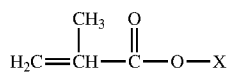

Water gradient contact lenses prepared above are individually repackaged in polypropylene lens packaging shells (one lens per shell) with 0.55 mL or 0.65 ml of 1% PZ-33 solution and autoclaved at about 121° C. for about 45 minutes. The resultant lenses are still lubricous (a friction rating of about 1.0) and with a PU of 0.32 μg/lens, i.e., a PU reduction of 73.3%.

Example 7

Water gradient contact lenses, which are prepared according to the procedures described in Example 19 of U.S. Pat. No. 8,480,227, are used in this example. The water gradient SiHy contact lenses each have: a water content of about 32% by weight; an oxygen permeability of about 146 barrers; a bulk elastic modulus of about 0.76 MPa; a relative ion permeability o about 6 (relative to Alsacon lens); a friction rating of 0; a WBUT of higher than 20 seconds; a water contact angle of about 34 to 47 degrees (by static sessile drop); and a PU of about 11 μg/lens.

Preparation of BTP Solutions

Bis-tris-propane (BTP) solution is prepared by dissolving BTP in deionized (DI) or distilled water to have a concentration of 0.03% and then adjusting pH to 7.5.

Preparation of Aqueous Polyaziridine Solutions

PZ-28 BTP-buffered solutions having a PZ-28 concentration of 0.1%, 0.2% or 0.3% by weight are prepared by simply adding PZ-28 into BTP solution and adjusting the pH to ca. 7.4.

PZ-28 phophate-buffered solutions having a PZ-28 concentration of 0.1% (by weight) is prepared by simply adding PZ-28 into PBS and adjusting the pH to about 7.5.

Reduction in Uptake of PU by Water Gradient Contact Lenses

Water gradient contact lenses prepared above are individually repackaged in polypropylene lens packaging shells (one lens per shell) with 0.55 ml of 0.1% PZ-28 BTP-buffered solution prepared above and autoclaved at about 121° C. for about 45 minutes. The resultant lenses are still lubricous (having a friction rating of 0) and has a PU of 1.2 µg/lens, i.e., a PU reduction of $$89.1\% \left(\frac{11 - 1.2}{11} \times 100\%\right).$$

Water gradient contact lenses prepared above are individually repackaged in polypropylene lens packaging shells (one lens per shell) with 0.55 ml of 0.2% PZ-28 BTP-buffered solution and autoclaved at about 121° C. for about 45 minutes. The resultant lenses are still lubricous (a friction rating of 0) and with a PU of 0.4 µg/lens, i.e., a PU reduction of 96.4%.

Water gradient contact lenses prepared above are individually repackaged in polypropylene lens packaging shells (one lens per shell) with 0.55 ml of 0.3% PZ-28 BTP-buffered solution and autoclaved at about 121° C. for about 45 minutes. The resultant lenses are still lubricous (a friction rating of 0) and with a PU of 0.3 µg/lens, i.e., a PU reduction of 97.3%.

Water gradient contact lenses prepared above are individually repackaged in polypropylene lens packaging shells (one lens per shell) with 0.55 ml of 0.1% PZ-28 phosphate-buffered solution prepared above and autoclaved at about 121° C. for about 45 minutes. The resultant lenses are still lubricous (having a friction rating of 0) and has a PU of 0.6 µg/lens, i.e., a PU reduction of 94.5%.

Example 8

Water gradient contact lenses prepared in Example 4 is used in this example. They are determined to have a PU of about 9 µg/lens.
Preparation of BTP Solutions
Bis-tris propane solution is prepared by dissolving BTP in DI (or distilled) water to have a concentration of 0.03 wt % and then adjusting pH to 7.5.
Preparation of Aqueous Polyaziridine Solutions
PZ-28 solutions having a PZ-28 concentration of 0.1%, 0.2% or 0.3% are prepared by simply adding PZ-28 into BTP solution and adjusting the pH to about 7.5.
Reduction in Uptake of PU by Water Gradient Contact Lenses
Water gradient contact lenses prepared in Example 4 are individually repackaged in polypropylene lens packaging shells (one lens per shell) with 0.55 ml of 0.1% PZ-28 solution prepared above and autoclaved at about 121° C. for about 45 minutes. The resultant lenses are still lubricous (having a friction rating of 0) and has a PU of 0.42 µg/lens, i.e., a PU reduction of $$95.3\% \left(\frac{9 - 0.42}{9} \times 100\%\right).$$

Water gradient contact lenses prepared in Example 4 are individually repackaged in polypropylene lens packaging shells (one lens per shell) with 0.55 ml of 0.2% PZ-28 solution prepared above and autoclaved at about 121° C. for about 45 minutes. The resultant lenses are still lubricous (a friction rating of 0) and with a PU of 0.3 µg/lens, i.e., a PU reduction of 96.7%.

Water gradient contact lenses prepared in Example 4 are individually repackaged in polypropylene lens packaging shells (one lens per shell) with 0.55 ml of 0.3% PZ-28 solution prepared above and autoclaved at about 121° C. for about 45 minutes. The resultant lenses are still lubricous (a friction rating of 0) and with a PU of 0.05 µg/lens, i.e., a PU reduction of 99.4%.

Example 9

Preparation of PAA Coating Solution
A PAA coating solution is prepared by adding adequate amount of PAA (Mn~450 KD) in a 50/50 water-IPA mixtures. After PAA is fully dissolved, the pH is adjusted by adding ~1.85% formic acid to the PAA aqueous solution to about 2. The target concentration of PAA is about 0.1% by weight. The prepared PAA coating solution is filtered to remove any particulate or foreign matter.
Phosphate Buffered Saline (PBS)
A phosphate buffered saline is prepared by dissolving $NaH_2PO_4 \cdot H_2O$, $Na_2HPO_4 \cdot 2H_2O$, and in a given volume of purified water (distilled or deionized) to have the following composition: ca. 0.044 w/w % $NaH_2PO_4 \cdot H_2O$, ca. 0.388 w/w/% $Na_2HPO_4 \cdot 2H_2O$, and ca. 0.79 w/w % NaCl.
Phosphate Buffered (PB) without NaCl (PB, No NaCl)
PB is prepared using the same procedure for preparing PBS, but no NaCl is added.
Preparation of Aqueous Polyaziridine Solution
PZ-28 solutions having a PZ-28 concentration of 0.125%, 0.25% or 0.5% are prepared by simply adding PZ-28 into DI water and adjusting the pH to about 7.4.
PU Reduction by PZ of PAA-Coated SiHy Contact Lenses
After de-molding, dry SiHy contact lenses (prepared in Example 3) are extracted with isopropanol (IPA) for 180 minutes for lens extraction, dip-coated in the PAA solution prepared above for about 30 minutes, rinsed with PB twice each for about 15 minutes, and then are immersed in a PZ-28 solution prepared above at about 60° C. for about 2 hours. After the PZ-28 dipping step, the lenses are again rinsed in PB twice (15 minutes each) and then subjected to various testing as shown in Table 5.

TABLE 5

| [PZ-28] (wt. %) in PZ-28 dipping step | Friction Rating | PU (µg/lens) | Surface Cracking* |
|---|---|---|---|
| None (control) | 0 | 16.3 ± 0.1 | 0, 0, 0 |
| 0.5 | 4 | 0 ± 0.2 | 0, 0, 3 |
| 0.25 | 4 | 0.4 ± 0.01 | 0, 0, 3 |
| 0.125 | 4 | 0.9 ± 0.2 | 0, 0, faint |

*inspection results of three lenses after finger rubbing.

The results in Table 5 show that after the various PZ dip treatments the Polyquartenium-1 uptake by PAA-coated SiHy contact lenses can be significantly reduced by PZ-28 due to the reaction between the aziridine groups of PZ-28 and the —COOH groups in the PAA coating on the lens surface at about 60° C. (a relatively high temperature). Even at a concentration of about 0.125 wt %, PZ-28 can still significantly reduce the Polyquartnium-1 uptake (PU) by PAA-coated SiHy lenses, while adversely affecting the lubricity.

Table 6 shows the results of the treatments of PAA-coated SiHy contact lenses by a 0.25 wt % PZ-28 at room temperature and 45° C. for about one hour, in order to evaluate the effects of PZ-28 dipping temperature upon PZ-28 potency in reducing PU. Table 6 shows that there is a significant improvement in PZ-28 potency at 45° C. compared to performing the PZ dip at room temperature (RT). Polyquartnium-1 uptake reduction is around 55% at room temperature when compared to around 93% when the dip was performed at 45° C. This shows that the PZ-28 potency is elevated at higher temperatures above RT.

TABLE 6

| Temperature of PZ-28 solution in dipping step | Friction Rating | PU (μg/lens) | Surface Cracking* |
|---|---|---|---|
| None (control) | 0 | 16.1 ± 0.7 | 0, 0, 0 |
| 45° C. | 4 | 1.1 ± 0.2 | 0, 0, 0 |
| Room temperature | 0 | 7.3 ± 0.3 | 0, 0, 0 |

*inspection results of three lenses after finger rubbing.

Example 10

Preparation of PMAA Solution

A polymethacrylic acid (PMAA) coating solution is prepared by dissolving an amount of PMAA (Mn: 400-700 kDa, from PolyMaterials, Inc.) in a given volume of 1-propanol/water (25/75 volume ratio) mixture to have a concentration of about 0.06% by weight and the pH is adjusted with formic acid (typically about 1.8 wt % in the final solution) to about 2.0.

Phosphate Buffered Saline (PBS)

PBS is prepared according to the procedures described in Example 4.

Phosphate Buffered (PB) without NaCl (PB, No NaCl)

PB is prepared according to the procedures described in Example 4.

IPC Salines (IPC-4, IPC-5, IPC-6, and IPC-7)

The IPC-3 saline is prepared according to the procedure described in Example 6.

Four IPC salines (IPC-4 to IPC-7) having a concentration of 0.05 wt %. 0.1 wt %, 0.5 wt % and 1 wt % of PZ-28 respectively are prepared by adding a desired amount of PZ-28 in IPC-3 saline and then by adjusting the pH to 7.5. Up to 5 ppm hydrogen peroxide maybe added to each IPC salines to prevent bioburden growth and each IPC saline is filtered using a 0.22 micron membrane filter.

Water Gradient SiHy Contact Lenses

After de-molding, cast-molded SiHy contact lenses (prepared in Example 3) are extracted with isopropanol (IPA) for 180 minutes for lens extraction, dip-coated in the PMAA solution prepared above for about one hour, rinsed with PBS for about 60 minutes, and then are packaged/sealed in polypropylene lens packaging shells (blisters) with 0.6 mL of one of IPC-3 to IPC-7 salines prepared above (half of the IPC saline is added prior to inserting the lens). The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing.

The resultant water gradient SiHy contact lenses is fairly lubricious (having a friction rating of about 0), a WBUT of more than 20 seconds, and water contact angle by static sessile drop of 40. They are determined to have a PU of 0.5, 0.19, 0.19, 0 and 0 respectively for water gradient contact lenses prepared respectively from IPC-3 saline (0 wt % PZ-28), IPC-4 saline (0.05 wt % PZ-28), IPC-5 saline (0.1 wt % PZ-28), IPC-6 saline (0.5 wt % PZ-28), and IPC-7 saline (1.0 wt % PZ-28).

Example 11

Preparation of PAA Coating Solution

A PAA coating solution is prepared by adding adequate amount of PAA (Mn~450 KD) in a water-IPA mixture having water content shown in Table 7 to have a desired PAA concentration shown in Table 7. After PAA is fully dissolved, the pH is adjusted by adding ~1.85% formic acid to the PAA aqueous solution to about 2. The prepared PAA coating solution is filtered to remove any particulate or foreign matter.

Phosphate Buffered Saline (PBS)

PBS is prepared according to the procedures described in Example 4.

Phosphate Buffered (PB) without NaCl (PB, No NaCl)

PB is prepared according to the procedures described in Example 4.

Preparation of Poly(MPC-co-AEM) (96/4 wt/wt)

A copolymer, poly(2-methacryloyloxyethyl phosphorylcholine-co-2-Aminoethylmethacrylate)(96/4 w/w) (i.e., poly(MPC-co-AEM), is prepared by thermal polymerizing a polymerizable composition comprising: about 96 wt % MPC; about 4 wt % AEM; about 0.02 wt % Vazo 56 [2,2'-Azobis(2-methylpropionamidine) dihydrochloride]; about 0.1 wt % chain transfer agent (HS—CH2CH2OH) in water at about 60° C. for about 2 hours and then at 20° C. for about 2 hours. The obtained poly(MPC-co-AEM) (an aqueous solution with solid content ~10%) is determined to have an amine functionality of ~0.22 meq/g, and a Mn of ~160 kDa.

The obtained copolymer is used as a hydrophilicity-enhancing agent for preparing a water soluble thermally-crosslinkable polymeric material (i.e., "in-package-crosslinking agent" or "IPC agent") in a reaction with polyamidoamine-epichlorohydrin (PAE). PAE solutions (Kymene) are purchased from Ashland as an aqueous solution and used as received.

IPC-8 Saline

The IPC-8 saline is prepared as follows. Mix 77 w/w % poly(MPC-co-AEM) aqueous solution prepared above, 6.1 w/w % PAE, and 16.9 w/w % of a phosphate buffer (about 128 mM of phosphate sodium salts and about 4 wt % NaCl) (the concentration of poly(MPC-co-AEM) and PAE are about 10 times of the final saline). Adjust pH to ~7.3 by 1N NaOH. React the mixture in a water bath at temperature=70° C. for 3 hours. Remove the mixture from water bath and cool down in a room temperature water bath. Dilute the mixture 10 times with a phosphate buffer (~33 mM of phosphate sodium salts and 0.77 wt % NaCl) and adjust pH to ~7.3. Filter the mixture by 0.22 μm PES sterile filter unit.

IPC-9 Saline

IPC-9 saline is prepared by adding PZ-28 to IPC-8 saline to have a PZ-28 concentration of 0.2 wt %. Up to 5 ppm hydrogen peroxide maybe added to each IPC salines to prevent bioburden growth and each IPC saline is filtered using a 0.22 micron membrane filter.

Water Gradient SiHy Contact Lenses

After de-molding, cast-molded SiHy contact lenses (prepared in Example 3) are extracted with isopropanol (IPA) for 180 minutes for lens extraction, dip-coated in the PAA solution prepared above for a time period specified in Table 7, rinsed with PB twice each for about 30 minutes, and then are packaged/sealed in polypropylene lens packaging shells (blisters) with 0.6 mL of either IPC-8 saline or IPC-9 saline prepared above (half of the IPC saline is added prior to inserting the lens). The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing.

The resultant water gradient SiHy contact lenses is lubricious (having a friction rating of about 0), a WBUT of more than 20 seconds, and water contact angle by static sessile drop of about 40 degrees. They are determined to have a PU shown in Table 7.

TABLE 7

| PAA coating solution | | | PU (µg/lens) | |
|---|---|---|---|---|
| [PAA] (ppm) | Water content (wt %) | Dipping time (min) | IPC-8 (free PZ-28) | IPC-9 (0.2 wt % PZ-28) |
| 250 | 70 | 10 | 0.65 | 0.42 |
| 250 | 70 | 15 | 1.68 | 1.31 |
| 100 | 70 | 10 | 0.40 | 0.15 |
| 250 | 50 | 10 | 1.00 | 0.46 |
| 100 | 50 | 6 | 0.23 | 0.00 |

Example 12

PMAA-Coating Solution

A polymethacrylic acid (PMAA) coating solution is prepared by dissolving an amount of PMAA (Mn: 400-700 kDa, from PolyMaterials, Inc.) in a given volume of 1-propanol/water (49%/51% wt/wt) mixture to have a concentration of about 0.06% by weight and the pH is adjusted with formic acid (typically about 1.8 wt % in the final solution) to about 2.0.

Phosphate Buffered Saline (PBS)

PBS is prepared according to the procedures described in Example 4.

Phosphate Buffered (PB) without NaCl (PB, No NaCl)

PB is prepared according to the procedures described in Example 4.

Preparation of BTP Solutions

Bis-tris propane solution is prepared by dissolving BTP in DI (or distilled) water to have a concentration of 300 ppm and then adjusting pH to 7.5.

Preparation of Aqueous Polyaziridine Solution

PZ-28 solutions having a PZ-28 concentration of 0.15% are prepared by simply adding PZ-28 into the BTP solution prepared above and adjusting the pH to about 7.4.

Preparation of Poly(MPC-co-AEM) (96/4 wt/wt)

Poly(2-methacryloyloxyethyl phosphorylcholine-co-2-Aminoethylmethacrylate)(96/4 w/w) (i.e., poly(MPC-co-AEM) is prepared according to the procedure described in Example 11.

IPC-10 Saline

IPC-10 saline is prepared as follows. Mix 77 w/w % poly(MPC-co-AEM) aqueous solution prepared above, 6.1 w/w % PAE, and 16.9 w/w % of a phosphate buffer (about 128 mM of phosphate sodium salts and about 4 wt % NaCl) (the concentration of poly(MPC-co-AEM) and PAE are about 10 times of the final saline). Adjust pH to ~7.3 by 1N NaOH. React the mixture in a water bath at temperature=70° C. for 3 hours. Remove the mixture from water bath and cool down in a room temperature water bath. Dilute the mixture 5 times with a phosphate buffer (~33 mM of phosphate sodium salts and 0.77 wt % NaCl) and adjust pH to ~7.3. Filter the mixture by 0.22 µm PES sterile filter unit.

Water Gradient SiHy Contact Lenses

After de-molding, cast-molded SiHy contact lenses (prepared in Example 3) are extracted with isopropanol (IPA) for 180 minutes for lens extraction, dip-coated in the PMAA solution prepared above for about one hour, rinsed with PB twice each for about 30 minutes, and then are packaged/sealed in polypropylene lens packaging shells (blisters) with 0.6 mL of a mixture of PZ-28 solution and IPC-10 saline prepared above (0.3 mL of the PZ-28 solution is added prior to inserting the lens and then 0.3 mL of IPC-10 is added and mixed). The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing.

The resultant water gradient SiHy contact lenses is lubricious (having a friction rating of about 0) either directly out of package or after simulated abrasion cycling treatment (i.e., equivalent to 30 cycles of digital rubbing treatment), a WBUT of about 17 seconds after simulated abrasion cycling treatment (i.e., equivalent to 30 cycles of digital rubbing treatment), and no detectable polyquaternium-1 uptake. No surface cracking is observed.

Example 13

PAA-Coating Solution

A PAA coating solution is prepared by dissolving an amount of PAA (Mn: ~450 kDa, from Polysciences, Inc.) in a given volume of 1-propanol/water (10%/90% wt/wt) mixture to have a concentration of about 250 ppm and the pH is adjusted with formic acid (typically about 1.87 wt % in the final solution) to about 2.0.

Phosphate Buffered (PB) without NaCl (PB, No NaCl)

PB is prepared according to the procedures described in Example 4.

BTP+PG Dilution Buffer

Mix 1.95 gram of BTP, 15.25 gram of propylene glycol (PG) and 300 gram of Di-water until homogeneous. Add about 1.75 gram of 5N HCl and allow for about 30 minutes of mixing. Adjust the pH to 7.4±0.1 using 5N HCl.

Preparation of BTP Solutions

Bis-tris propane solution is prepared by dissolving 0.14 gram of BTP in 100 gram of DI (or distilled) water. No pH adjustment needed.

Preparation of Aqueous Polyaziridine Solution

PZ-28 solutions having a PZ-28 concentration of 0.2 wt % or 0.3 wt % are prepared by simply adding PZ-28 into the DI-water and no pH adjustment.

Preparation of Poly(MPC-co-AEM) (96/4 wt/wt)

Poly(2-methacryloyloxyethyl phosphorylcholine-co-2-Aminoethylmethacrylate)(96/4 w/w) (i.e., poly(MPC-co-AEM) is prepared according to the procedure described in Example 11.

IPC-11 Saline

IPC-11 saline is prepared as follows. Mix 74.3 w/w % poly(MPC-co-AEM) aqueous solution prepared above, 6.0 w/w % PAE, and 19.7 w/w % of BTP solution. Adjust pH to 8±0.1 by 1N NaOH. React the mixture in a water bath at temperature=70° C. for 4 hours. Remove the mixture from water bath and cool down in a room temperature water bath. Dilute the mixture with BTP+PG Dilution buffer in 1 to 4 ratio (1 part of reaction mixture and 4 parts of BTP+PG dilution buffer) by weight and adjust pH to 7.4±0.1. Filter the mixture by 5 µm filter capsules (Satorius item #: 5051342P5-00-B) into sterile bottles and store them in refrigerator.

Water Gradient SiHy Contact Lenses

After de-molding, cast-molded SiHy contact lenses (prepared in Example 3) are extracted with IPA twice (the 1$^{st}$ one for 30 minutes and the 2$^{nd}$ one for 150 minutes) for lens extraction, dipped in a IPA/water mixture at 50/50 volume ratio for about 30 minutes, dip-coated in the PAA coating solution prepared above for about 20 minutes, rinsed with PB twice each for about 30 minutes, and then are packaged/sealed in polypropylene lens packaging shells (blisters) with 0.6 mL of a mixture of PZ-28 solution and IPC-11 saline prepared above (0.3 mL of IPC-11 is added prior to inserting the lens, then 0.3 mL of the PZ-28 solution is added and then mixed after sealed). The sealed lens packages are staged (i.e., left standing in an oven) at a temperature lower than 120° C. for a time period specified in Table 8. After the staging, the sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing.

Table 8 reports some properties of the resultant water gradient SiHy contact lenses.

TABLE 8

| Staging | [PZ-28] in packaging sol | PU | Friction rating* | Cracking -Invert | Cracking -folded |
|---|---|---|---|---|---|
| At RT for 1 hr | 0.1 wt % | ≤0 | 0.5 | 0, 0, 0 | 0, 0, 0 |
| At RT for 1 hr | 0.15 wt % | ≤0 |  | 0, 0, 0 | 0, 0, 0 |
| At RT for 2 hrs | 0.1 wt % | ≤0 |  | 0, 0, 0 | 0, 0, 0 |
| At RT for 2 hrs | 0.15 wt % | ≤0 |  | 0, 0, 0 | 0, 0, 0 |
| At 40° C. in oven for 1 hr | 0.1 wt % | ≤0 | 0.8 | 0, 0, 0 | 0, 0, 0 |
| At 40° C. in oven for 1 hr | 0.15 wt % | ≤0 |  | 0, 0, 0 | 0, 0, 0 |
| At 40° C. in oven for 2 hrs | 0.1 wt % | ≤0 |  | 0, 0, 0 | 0, 0, 0 |
| At 40° C. in oven for 2 hrs | 0.15 wt % | ≤0 |  | 0, 0, 0 | 0, 0, 0 |

*Determined after simulated abrasion cycling treatment (i.e., equivalent to 30 cycles of digital rubbing treatment).

Example 14

PMAA-Coating Solution

A PMAA coating solution is prepared by dissolving an amount of PMAA (Mn: ~644 kDa, from PolyMaterials, Inc.) in a water/isopropanol (IPA) mixture (48.1 wt % IPA/50 wt % water) to have a concentration of about 600 ppm and the pH is adjusted with formic acid (typically about 1.87 wt % in the final solution) to about 2.0.

Phosphate Buffered Saline (PBS)

PBS is prepared according to the procedures described in Example 4.

Phosphate Buffered (PB) without NaCl (PB, No NaCl)

PB is prepared according to the procedures described in Example 4.

Preparation of Poly(MPC-co-AEM) (96/4 wt/wt)

Poly(2-methacryloyloxyethyl phosphorylcholine-co-2-Aminoethylmethacrylate)(96/4 w/w) (i.e., poly(MPC-co-AEM) is prepared according to the procedure described in Example 11.

IPC-12 Saline

The reaction mixture of IPC-12 saline is prepared the same as described in Example 11 for IPC-8. Dilute the mixture 5 times (i.e., 1 part of reaction mixture with 4 parts of phosphate buffer by weight) with a phosphate buffer (~33 mM of phosphate sodium salts and 0.77 wt % NaCl) and add 0.15 wt % of sodium citrate dihydrate. Finally, adjust pH to ~7.3. Filter the mixture by 0.22 µm PES sterile filter unit.

IPC-13 Saline

Same reaction mixture except replacing PBS by PB as described in IPC-12 is prepared and reaction time=5 hrs. Same amount of sodium citrate dihydrate, pH adjustment, and sterile filtration.

IPC-14 Saline

Same reaction mixture as described in IPC-3 except replacing MPC-containing copolymer with poly(MPC-co-AEM) prepared in Example 11. The dilution, adding sodium citrate dihydrate, pH adjustment, and sterile filtration are the same as shown in IPC-12.

IPC-15 Saline

Same reaction mixture as described in IPC-14 except replacing PBS by PB for the reaction. The dilution, adding sodium citrate dihydrate, pH adjustment, and sterile filtration are the same as shown in IPC-14 as well.

Preparation of Aqueous Polyaziridine Solution

PZ-28 solutions having a PZ-28 concentration of 0.3 wt % or 0.4 wt % are prepared by simply adding PZ-28 into the DI-water and no pH adjustment.

Water Gradient SiHy Contact Lenses

After de-molding, cast-molded SiHy contact lenses (prepared in Example 3) are extracted with IPA twice (the 1$^{st}$ one for 35 minutes and the 2$^{nd}$ one for 145 minutes) for lens extraction, dip-coated in the PMAA coating solution prepared above for about 50 minutes, rinsed with PB twice each for about 25 minutes, and then are packaged/sealed in polypropylene lens packaging shells (blisters) with 0.6 mL of a mixture of PZ-28 solution and various IPC salines prepared above (for example: 0.3 mL of one of IPC-12 to IPC-15 is added prior to inserting the lens, then 0.3 mL of the PZ-28 solution (or water without PZ) is added and then mixed after sealed). The sealed lens packages are staged (i.e., left standing in an oven) at room temperature for about 4 hrs. After the staging, the sealed lens packages are autoclaved for about 45 minutes at about 121° C., forming SiHy contact lenses with a cross-linked hydrophilic coating (i.e., a hydrogel coating) thereon.

Table 9 reports some properties of the resultant water gradient SiHy contact lenses.

TABLE 9

| Packaging solution | PU (µg/lens) | WBUT* (sec) |
|---|---|---|
| IPC-12, ([PZ] = 0.15%) | 0.05 ± 0.04 | 14 ± 4.5 |
| IPC-13 ([PZ] = 0.15%) | 0.01 ± 0.06 | 16 ± 3.3 |
| IPC-14 ([PZ] = 0.15%) | 0.01 ± 0.0 | 18 ± 7.9 |
| IPC-15 ([PZ] = 0.15%) | 0.04 ± 0.06 | 21 ± 9.2 |
| IPC-15 ([PZ] = 0.20%) | 0.04 ± 0.05 | 22 ± 4.1 |

*after simulated abrasion cycling treatment (i.e., equivalent to 30 cycles of digital rubbing treatment)

Preparation of PAA Coating Solution Example 15

A PAA coating solution is prepared by adding adequate amount of PAA in a water-IPA mixtures (e.g., 50/50 or 90/10 w/w). After PAA is fully dissolved, the pH is adjusted by adding ~1.8% formic acid to the PAA aqueous solution to about 2. The target concentration of PAA is about 0.025% by weight. The prepared PAA coating solution is filtered to remove any particulate or foreign matter.

Phosphate Buffered Saline (PBS)

A phosphate buffered saline is prepared by dissolving $NaH_2PO_4·H_2O$, $Na_2HPO_4·2H_2O$, and in a given volume of purified water (distilled or deionized) to have the following composition: ca. 0.22 w/w % $NaH_2PO_4·H_2O$, ca. 1.95 w/w/% $Na_2HPO_4·2H_2O$, and ca. 3.97 w/w % NaCl.

IPC Salines

The IPC-8 and IPC-9 salines prepared in Example 11 are used in this example.

The IPC-16 saline is prepared as follows. Mix 77.0 w/w % poly(MPC-co-AEM) aqueous solution prepared in Example 11, 6.7 w/w % PAE, and 16.3 w/w % of a phosphate buffer (about 128 mM of phosphate sodium salts and about 4 wt % NaCl) (the concentration of poly(MPC-co-AEM) and PAE are about 10 times of the final saline). Adjust pH to ~7.3 by 1N NaOH. React the mixture in a water bath at temperature ~70° C. for 3 hours. Remove the mixture from water bath and cool down in a room temperature water bath. Dilute the mixture 10 times (i.e, 1 part of reaction mixture and 9 parts of phosphate buffer) with a phosphate buffer (~33 mM of phosphate sodium salts and 0.77 wt % NaCl) and adjust pH to ~7.3. Filter the mixture by 0.22 μm PES sterile filter unit.

The IPC-17 saline is prepared by adding 0.2 wt % of PZ-28 into the IPC-16 prepared above.

The IPC-18 saline is prepared by adding 0.2 wt % of PZ-28 into the IPC-11 prepared in Example 13.

PU Reduction by PZ of PAA-Coated SiHy Contact Lenses

After de-molding, dry SiHy contact lenses (prepared in Example 3) are extracted with isopropanol (IPA) for 180 minutes for lens extraction, are dip-coated in the PAA solution prepared above for about 5, & 10 minutes, are rinsed with PB twice each for about 30 minutes. The lenses are then packaged with one of the IPC salines prepared above (either with 0.2 wt % or without PZ-28). The Polyquaternium-1 uptake and Surface Cracking results are summarized in the following table:

TABLE 10

| Packaging saline | $H_2O$% in PAA diping sol. | PAA dip time (min) | PU (μg/lens) | Surface Cracking* |
|---|---|---|---|---|
| IPC-16 (without PZ-28) (control) | 50% | 5 | 0.44 | 0, 0, 0 |
| IPC-17 (with 0.2 wt % PZ-28) | 50% | 5 | 0.23 | 0, 0, 0 |
| IPC-8 (without PZ-28) (control) | 50% | 10 | 1.00 | 3, 3, 3 |
| IPC-9 (with 0.2 wt % PZ-28) | 50% | 10 | 0.46 | 2, 3, 2 |
| IPC-18 (with 0.2 wt % PZ-28) | 90% | 20 | 0.07 | 0, 0 |

*inspection results of three lenses after finger rubbing.

Example 16

IPC-19 Saline

The following ingredients are mixed at room temperature in a container at the following concentrations: 7.5 wt % of poly(MPC-co-AEM)(96/4 w/w) prepared in Example 11, 1.58 wt % PAE and 0.03 wt % BTP and the rest DI water. The final pH is adjusted using 5N HCl to 8±0.1. The mixture is left in a bath at 70° C. for 4 hrs. After pre-reaction, they are cooled to room temperature and then diluted 5-fold using a dilution buffer consisting of 0.61 wt % BTP, 4.8 wt % propylene glycol and the rest DI water (pH adjusted to 7.4). This saline is filtered using 5 μm capsule filters from Sartorius and then stored in the refrigerator immediately until further use in packaging lenses. This prepared saline has a charge density of 3050±200 uEq/L when measured using the Cary 60 technique for residual charge.

Example 17

PMAA-Coating Solution

The PMAA coating solution prepared in Example 14 is used in this example.

BTP+PG Dilution Buffer

Mix 0.846 gram of BTP, 6.6 gram of propylene glycol (PG) and 300 gram of Di-water until homogeneous. Add about 1.75 gram of 5N HCl and allow for about 30 minutes of mixing. Adjust the pH to 7.4±0.1 using 5N HCl.

BTP+Glycerol Dilution Buffer

Mix 0.846 gram of BTP, 7.8 gram of glycerol and 300 gram of Di-water until homogeneous. Add about 1.75 gram of 5N HCl and allow for about 30 minutes of mixing. Adjust the pH to 7.4±0.1 using 5N HCl.

BTP+NaCl Dilution Buffer

Mix 0.846 gram of BTP, 2.55 gram of sodium chloride (NaCl) and 300 gram of Di-water until homogeneous. Add about 1.75 gram of 5N HCl and allow for about 30 minutes of mixing. Adjust the pH to 7.4±0.1 using 5N HCl.

Preparation of BTP Solutions

Bis-tris propane solution prepared in Example 13 is used in this Example.

Preparation of Aqueous Polyaziridine Solution

PZ Solution I having a PZ-28 concentration of 0.24 wt % is prepared by simply adding PZ-28 into the BTP+PG dilution buffer.

PZ Solution II having a PZ-28 concentration of 0.24 wt % is prepared by simply adding PZ-28 into the BTP+glycerol dilution buffer.

PZ Solution III having a PZ-28 concentration of 0.24 wt % is prepared by simply adding PZ-28 into the BTP+NaCl dilution buffer.

IPC Salines

The IPC-8 prepared in Example 11 is used in this example.

The IPC-20 saline is prepared by mixing the IPC-11 prepared in Example 13 with DI water at 1:1 ratio.

The IPC-21 saline is prepared by mixing the IPC-11 (also use BTP+glycerol to dilute the reaction mixture for IPC-11 after pre-reaction) prepared in Example 13 with BTP+glycerol dilution buffer at 1:1 ratio.

The IPC-22 saline is prepared by mixing the IPC-11 (also use BTP+PG dilution buffer prepared earlier in this example to dilute the reaction mixture for IPC-11 after pre-reaction) prepared in Example 13 with the PZ Solution I prepared above at 1:1 ratio.

The IPC-23 saline is prepared by mixing the IPC-11 (also use BTP+glycerol to dilute the reaction mixture for IPC-11 after pre-reaction) prepared in Example 13 with the PZ Solution II prepared above at 1:1 ratio.

The IPC-24 saline is prepared by mixing the IPC-11 (also use BTP+NaCl to dilute the reaction mixture for IPC-11 after pre-reaction) prepared in Example 13 with the PZ Solution III prepared above at 1:1 ratio.

Water Gradient SiHy Contact Lenses

After de-molding, cast-molded SiHy contact lenses (prepared in Example 3) are extracted with IPA twice (the $1^{st}$ one for 30 minutes and the $2^{nd}$ one for 150 minutes) for lens extraction, dipped in a IPA/water mixture at 50/50 volume ratio for about 30 minutes, dip-coated in the PMAA coating solution prepared above for about 20 minutes, rinsed with PB twice each for about 30 minutes, and then are packaged/sealed in polypropylene lens packaging shells (blisters) with 0.6 mL of a mixture of a PZ solution and an IPC saline prepared above (0.3 mL of the IPC saline is added prior to inserting the lens, then 0.3 mL of the PZ solution is added and then mixed after sealed). The sealed lens packages are autoclaved at 121° C. for one autoclave cycle (45 minutes), for 5 autoclave cycle (225 minutes), for 10 autoclave cycle (450 minutes), and for 15 autoclave cycle (675 minutes) respectively. The multiple autoclave cycles are intended to determine the thermal stability (or shelf life of SiHy lenses) at an accelerated shelf life study. The lens dimensions of the resultant lenses are measured and reported in Table 11.

Table 11 shows that: when the packaging solution is phosphate based, the diameter and BCE (base curvature equivalent) are increased as autoclave cycle number is increased; when the packaging solution is BTP based, the diameters or BCEs are decreased slightly or with minimal change as autoclave cycle number is increased. This indicates that BTP buffer may stabilize silicone hydrogel contact lens dimension/metro over shelf life.

TABLE 11

| | | Lens dimensions | |
|---|---|---|---|
| IPC Saline used | Autoclave Cycles | Diameter (mm) | BCE (mm) |
| IPC-8 | 1 | 14.19 ± 0.02 | 8.23 ± 0.05 |
| | 5 | 14.25 ± 0.02 | 8.27 ± 0.04 |
| | 10 | 14.27 ± 0.01 | 8.28 ± 0.03 |
| | 15 | 14.32 ± 0.02 | 8.32 ± 0.04 |
| IPC-20 | 1 | 14.17 ± 0.02 | 8.21 ± 0.04 |
| | 5 | 14.14 ± 0.01 | 8.20 ± 0.04 |
| | 10 | 14.10 ± 0.03 | 8.15 ± 0.04 |
| | 15 | 14.11 ± 0.02 | 8.27 ± 0.05 |
| IPC-22 | 1 | 14.19 ± 0.02 | 8.24 ± 0.05 |
| | 5 | 14.16 ± 0.02 | 8.20 ± 0.05 |
| | 10 | 14.11 ± 0.02 | 8.18 ± 0.04 |
| | 15 | 14.13 ± 0.03 | 8.23 ± 0.05 |
| IPC-23 | 1 | 14.17 ± 0.01 | 8.23 ± 0.04 |
| | 5 | 14.16 ± 0.03 | 8.20 ± 0.03 |
| | 10 | 14.10 ± 0.02 | 8.16 ± 0.03 |
| | 15 | 14.11 ± 0.02 | 8.16 ± 0.03 |
| IPC-24 | 1 | 14.16 ± 0.02 | 8.20 ± 0.07 |
| | 5 | 14.15 ± 0.01 | 8.22 ± 0.03 |
| | 10 | 14.10 ± 0.01 | 8.20 ± 0.06 |
| | 15 | 14.12 ± 0.01 | 8.19 ± 0.05 |

Example 18

PMAA-Coating Solution

A PMAA coating solution is prepared by dissolving an amount of PMAA (Mn: ~644 kDa, from PolyMaterials, Inc.) in a water/isopropanol (IPA) mixture (48.1 wt % IPA/50 wt % water) to have a concentration of about 600 ppm and the pH is adjusted with formic acid (typically about 1.87 wt % in the final solution) to about 2.0.

Another PMAA coating solution is prepared by dissolving an amount of PMAA (Mn: ~644 kDa, from PolyMaterials, Inc.) in a water/n-propanol (PrOH) mixture (48.1 wt % PrOH/50 wt % water) to have a concentration of about 600 ppm and the pH is adjusted with formic acid (typically about 1.87 wt % in the final solution) to about 2.0.

Phosphate Buffered Saline (PBS)

PBS is prepared according to the procedures described in Example 4.

Phosphate Buffered (PB) without NaCl (PB, No NaCl)

PB is prepared according to the procedures described in Example 4.

IPC-15 Saline

The IPC-15 saline prepared in Example 14 is used in this example.

Preparation of Aqueous Polyaziridine Solution

PZ-28 solutions having a PZ-28 concentration of 0.3 wt % are prepared by simply adding PZ-28 into the DI-water and no pH adjustment.

Water Gradient SiHy Contact Lenses

After de-molding, cast-molded SiHy contact lenses (prepared in Example 3) are extracted with IPA thrice (the $1^{st}$ one for 40 minutes, $2^{nd}$ one for 115 minutes and $3^{rd}$ one for 25 minutes) for lens extraction, dip-coated in the PMAA coating solution prepared above for about 55 minutes, rinsed with PB twice each for about 25 minutes, and then are packaged/sealed in polypropylene lens packaging shells (blisters) with 0.6 mL of a mixture of PZ-28 solution and IPC-15 saline prepared above (for example: 0.3 mL of IPC-15 is added prior to inserting the lens, then 0.3 mL of the PZ-28 solution is added and then mixed after sealed). The sealed lens packages are staged at room temperature for about 4 hrs. After the staging, the sealed lens packages are autoclaved for about 45 minutes at about 121° C., forming SiHy contact lenses with a cross-linked hydrophilic coating (i.e., a hydrogel coating) thereon. The same coating solution is re-used another 2 more times with fresh IPA and lenses coated and prepared according to the procedure above describing for the fresh IPA coating solution.

Another set of lenses were processed using n-Propanol (PrOH) as the extraction solvent and using PMAA coating solution prepared using PrOH. In addition, the coating solution is re-used twice as described above and lenses prepared according to procedure above.

Some of the key properties of the resultant water gradient SiHy contact lenses are summarized below. The results demonstrate re-use of the coating solution at least three times when done from IPA or PrOH as the extraction and coating solution solvent. All the lenses exhibit excellent long-lasting lubricity after cycling with a heavy cycler for 14× using renu as the lens care solution. The WBUT measurement results after simulated abrasion cycling treatment (equivalent to 30 cycles of digital rubbing treatment) and also Sudan Black staining of lenses after simulated abrasion cycling treatment (equivalent to 30 cycles of digital rubbing treatment) (results not shown) also further corroborate this finding.

TABLE 12

| Coating Details | PU (µg/lens) | WBUT* (sec) | Avg. Finger Lubricity after 14× cycling |
|---|---|---|---|
| Fresh PrOH coating soln | 0.04 ± 0.02 | | 0.5 |
| PrOH coating soln re-use #1 | 0.06 ± 0.04 | 16 ± 4 | 1 |
| PrOH coating soln re-use #2 | 0.08 ± 0.03 | 15 ± 2 | — |
| Fresh IPA coating soln | 0.04 ± 0.03 | 21 ± 3 | 0.5 |

TABLE 12-continued

| Coating Details | PU (µg/lens) | WBUT* (sec) | Avg. Finger Lubricity after 14× cycling |
|---|---|---|---|
| IPA coating soln re-use #1 | 0.05 ± 0.02 | 18 ± 2 | 1 |
| IPA coating soln re-use #2 | 0.05 ± 0.04 | 12 ± 2 | — |

*after simulated abrasion cycling treatment (i.e., equivalent to 30 cycles of digital rubbing treatment)

Example 19

Preparation of Water Gradient SiHy Contact Lenses

SiHy contact lenses with a PAA base coating thereon are prepared according to the procedures described in Example 19 of U.S. Pat. No. 8,480,227, are used in this example. The resultant PAA-coated SiHy contact lenses have a water content of about 32% by weight, an oxygen permeability of about 146 barrers, a bulk elastic modulus of about 0.76 MPa, and a relative ion permeability of about 6 (relative to Alsacon lens). The PAA-coated SiHy contact lenses are individually packaged/sealed in polypropylene lens packaging shells (blisters) with about 0.55 mL of the IPC-9 saline prepared in Example 11. The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing. The resultant water gradient SiHy contact lenses has a friction rating of 0; a WBUT of about 28 seconds as measured with lenses directly out of package, a WBUT of about 20 seconds as measured with lenses after simulated abrasion cycling treatment (i.e., equivalent to 30 cycles of digital rubbing treatment); and an average PU of about 0.06 µg/lens.

Sample Preparation:

AFM studies have been conducted on water gradient SiHy contact lenses prepared above in hydrated state and in dry state. A lens is removed from its blister pack (sealed and autoclaved) and two cross-sections are obtained by cutting, with a razor blade, one water gradient contact lens into two equal halves (i.e., cutting through the center of the contact lens). The cross-section pieces of the lens each are mounted vertically in a metal clamp, as shown in FIG. 7 of U.S. Pat. No. 8,480,227, with the lens cross-section piece lens edge is sticking out of the metal clamp for 1-2 mm above the edge of the clamp to allow the AFM tip (above the lens cross section in FIG. 7) to scan it. The mounted cross-section assemblies are immersed in PBS to ensure it being fully hydrated. For performing AFM on lenses in dry state, the lenses are dried overnight (for at least 18 hours) in an oven at 50° C.

AFM Experiment:

All the AFM measurements will be performed using Dimension Icon® instrument from Bruker Inc. The samples will be imaged using the PeakForce QNM™ Tapping Imaging mode using the ScanAsyst-Fluid probes. Newly calibrated probes are used for the imaging of the samples. Each cross section is initially examined with an optical microscope to identify good locations for AFM imaging of the cross section including outer surface hydrogel layer. For each cross section, at least three 20 µm×20 µm AFM images are collected from three random locations on the sample. An additional AFM image at a higher resolution (5 µm×5 µm or 10 µm×10 µm) will be finally collected on an area which clearly shows the outer surface hydrogel layer for determining thickness of the outer surface hydrogel layer. For each group of water gradient contact lenses to be tested, data from three different cross sections (three replicates) will be collected.

The data analysis is performed using the NanoScope Analysis Software ver. 1.4 from Bruker, Inc. All the high resolution AFM images will be flattened uniformly to remove sample curvature. About 20 random thickness measurements will be performed on the high resolution images by measuring the distance between the beginning of the outer surface hydrogel layer and the edge of the lens cross section. The individual measurements from all the replicates for the same group of samples are pooled and averaged to obtain the final thickness of the outer surface hydrogel layer for this group of water gradient contact lenses.

It is found based on the analysis of high resolution AFM images that the outer surface hydrogel layer (excluding the PZ-neutralized transition layer) of the water gradient contact lens has a thickness of 2.6 microns in fully hydrated state and a thickness of 0.7 microns in dried state. The water swelling ratio $$(WSR)\left(\frac{L_{Wet}}{L_{Dry}} \times 100\%\right)$$

in which $L_{wet}$ is the average thickness of the outer surface hydrogel layer of the SiHy contact lens in fully hydrated state, and $L_{Dry}$ is the average thickness of that outer surface hydrogel layer of the SiHy contact lens in dry state) of the outer surface hydrogel layer on the water gradient contact lens under test is calculated to be 376%.

Example 20

Microindentation tests have been performed for several different contact lenses: ACUVUE 2® (commercially available from Johnson & Johnson); ACUVUE® Oasys (uncoated SiHy lenses commercially-available from Johns & Johnson); Biofinity® (uncoated SiHy lenses commercially-available from CooperVision); MyDay® (uncoated SiHy lenses commercially available from CooperVision); AIROPTIX® Night & Day® (plasma-coated SiHy lenses commercially available from Alcon); naturally-wettable SiHy lens without coating of Example 3; water gradient SiHy lenses of Example 13 (IPC-11+0.1 wt % PZ-28 as packaging solution); and water gradient SiHy contact lenses of Example 15 (IPC-18 as packaging solution), according to the procedures described in Example 1. The bulk elastic modulus (E') of the commercial contact lenses are manufacturer generated data (see, Table 1 in G. Young's article in Contact Lens & Anterior Eye 33 (2010), 210-214; CooperVision's press release on Jun. 17, 2013 entitled "CooperVision Biofinity Is Fastest Growing Contact Lens Brand In The U.S."; CooperVision's press release on Jun. 25, 2015 entitled "CooperVision Introduces MyDay® Lenses in the U.S.". The bulk elastic modulus of SiHy lenses of Example 3 is determined according to the procedure described in Example 1. The surface compression force (SCF) at an indentation depth of 400 nm and the normalized surface compression force (NSCF) at an indentation depth of 400 nm are reported in Table 13.

TABLE 13

| Lenses | E' (MPa) | SCF @ 400 nm (μN) | NSCF @ 400 nm (μN/MPa) |
|---|---|---|---|
| Acuvue 2 | 0.30 | 4.37 | 14.58 |
| Biofinity | 0.75 | 11.20 | 14.93 |
| My Day | 0.40 | 6.08 | 15.20 |
| Night & Day | 1.50 | 21.44 | 14.29 |
| Oasys | 0.72 | 10.13 | 14.07 |
| Example 3 | 0.62 | 10.45 | 16.86 |
| Example 13 | 0.62 | 3.13 | 5.05 |
| Example 15 | 0.62 | 2.87 | 4.63 |

Figure 5:
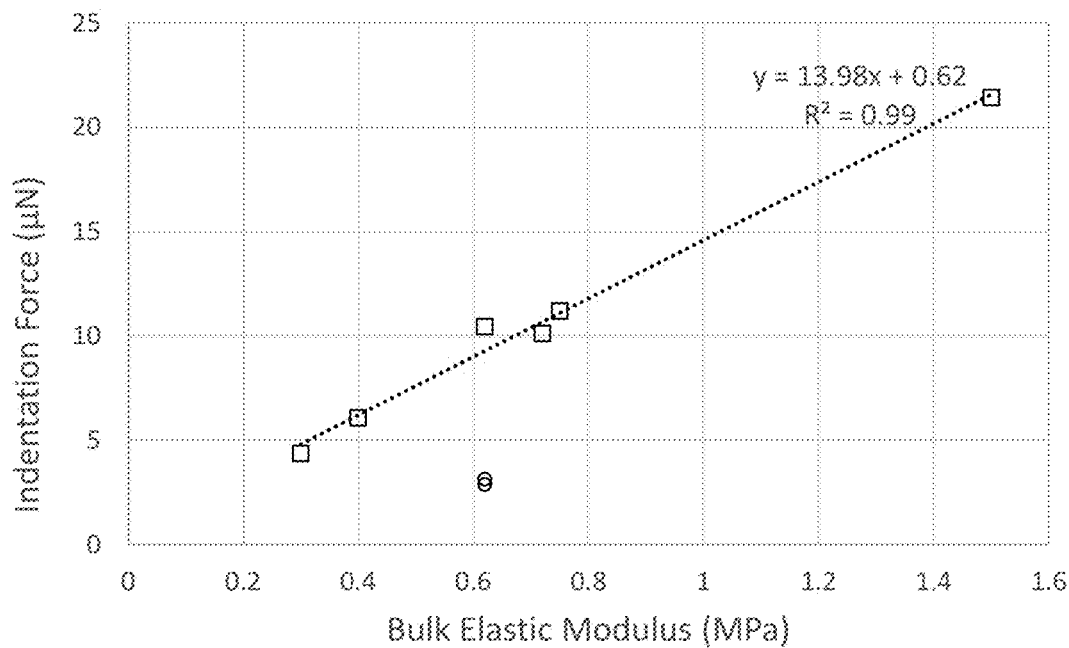
FIG. 5 shows indentation forces at an indentation depth of 400 nm as function of the bulk elastic modulus of contact lenses as measured in the micro-indentation tests of Example 20 with Bruker's Hysitron® BioSoft™ In-Situ Indenter.

FIG. 5 shows the indentation forces at an indentation depth of 400 nm (i.e., surface compression force at an indentation depth of 400 nm) as function of the bulk elastic (Young's) modulus of contact lenses. The indentation force at an indentation depth of 400 nm shows a good linear fit with the bulk elastic modulus with respect to those contact lenses without a hydrogel coating thereon (including Acuvue 2, Biofinity, MyDay, Night&Day, Oasys, and lenses of Example 3). This implies that these materials all have similar Poisson's ratio. The best linear fit is y=13.98x+0.62, $R^2$=0.99.

However, water gradient contact lenses of Examples 13 and 15 (each having a hydrogel coating thereon) do not follow the same trend and have indentation force values much less than expected from the linear fit trend. Water gradient contact lenses of Examples 13 and 15 have a reduction in indentation force at an indentation depth of 400 nm of about 66% and about 69% respectively as calculated based on the following equation $$\Delta(IF)_{400\ nm} = 1 - \frac{(IF)_t}{13.98 \cdot E' + 0.62}$$

in which $(IF)_t$ is the measured indentation force at an indentation depth of 400 nm of the water gradient contact lens and E' is the bulk elastic modulus (E') of the water gradient contact lens.

Example 21

Solution PMAA-1

Solution PMAA-1 is a solution of polymethacrylic acid (PMAA), which is prepared by adding adequate amount of PMAA (Mn~400-600 kDa, from ProChem.) in PrOH/water (50 wt % water) mixture to have a concentration of about 0.04 wt. %. After PMAA is fully dissolved, the pH is adjusted by adding formic acid to the PMAA solution to about 2. The prepared PMAA solution is filtered to remove any particulate or foreign matter.

Phosphate Buffered Saline Solution (PBS-1) for IPC Saline Preparation

PBS-1 is prepared by dissolving $NaH_2PO_4 \cdot H_2O$, $Na_2HPO_4 \cdot 2H_2O$ and in a given volume of purified water (distilled or deionized) to have the following composition: ca. 0.174 w/w % $NaH_2PO_4 \cdot H_2O$, ca. 0.711 w/w/% $Na_2HPO_4 \cdot 2H_2O$, and ca. 1.920 w/w % NaCl.

IPC Saline (IPC-25)

A copolymer, poly(2-methacryloyloxyethyl phosphorylcholine-co-2-aminoethylmethacrylate)(96/4 w/w) (i.e., poly (MPC-co-AEM), is prepared by thermal polymerizing a polymerizable composition comprising: about 96 wt % MPC; about 4 wt % AEM; about 0.02 wt % Vazo 56 [2,2'-Azobis(2-methylpropionamidine) dihydrochloride]; about 0.1 wt % chain transfer agent (HS—CH2CH2OH) in water at about 60° C. for about 2 hours and then at 20° C. for about 2 hours. The obtained poly(MPC-co-AEM) (an aqueous solution with solid content ~10%) is determined to have an amine functionality of ~0.22 meq/g.

Mix about 75 wt % of the poly(MPC-co-AEM) solution prepared above, about 4.6 wt % PAE solution (purchased from Ashland as an aqueous solution and used as received), and about 20 wt % of a phosphate salt solutions (about 0.22 wt % $NaH_2PO_4 \cdot H_2O$, 0.9 wt % $Na_2HPO_4 \cdot 2H_2O$), Adjust pH to ~7.3 by 1N NaOH. React the mixture in a water bath at 60° C. for 4 hours to form water-soluble thermally-cross-linkable polymeric material (i.e., "in-package crosslinking agent) or "IPC agent"). Remove the mixture from water bath and cool down in a room temperature water bath. Dilute the mixture about 10 folds using PBS-1 and water and adjust pH to about 7.3 as needed. The final IPC saline may also contain low concentration of peroxide (e.g. 5 ppm) and sodium citrate dihydrate (e.g. 0.07%). Filter the mixture by 0.22 μm PES sterile filter unit.

Phosphate Buffered Solution (PB, ~15 mM, PH ~7.8)

PB is prepared by dissolving $NaH_2PO_4 \cdot H_2O$ and $Na_2HPO_4 \cdot 2H_2O$, in a given volume of purified water (distilled or deionized) to have the following composition: ca. 0.028 wt/vol % $NaH_2PO_4 \cdot H_2O$ and ca. 0.231 wt/vol % $Na_2HPO_4 \cdot 2H_2O$ with final solution pH ca. 7.8

Preparation of Water Gradient SiHy Contact Lenses (Lenses 21-1) (Control)

Water Gradient SiHy Contact lenses (Lenses 21-1) are prepared according to a method comprising one sole dip-coating step for forming the base coating as follows.

After de-molding, cast-molded SiHy contact lenses (prepared in Example 3) are extracted with PrOH for 180 minutes for lens extraction, dip-coated in the PMAA-1 prepared above for about 50 min or one hour, rinsed in PrOH/water (55/45) for about 25 min, rinsed with PB for about 50-60 minutes, and then are packaged/sealed in polypropylene lens packaging shells (blisters) with 0.65 mL of the IPC-25 saline (half of the IPC-25 saline is added prior to inserting the lens). The sealed lens packages are autoclaved for about 45 minutes at about 121° C., forming SiHy contact lenses with a cross-linked hydrophilic coating (i.e., a hydrogel coating) thereon.

Preparation of Water Gradient SiHy Contact Lenses (Lenses 21-2)

Water Gradient SiHy Contact lenses (Lenses 21-2) are prepared according to a method comprising at least two dip-coating steps and one buffered saline rinsing step between each pair of dip-coating steps for forming the base coating as follows.

After de-molding, cast-molded SiHy contact lenses (prepared in Example 3) are extracted with PrOH for 180 minutes for lens extraction, dip-coated in the PMAA-1 prepared above for about 25 minutes, rinsed in PB for about 10 min, rinsed in deionized (DI) $H_2O$ for 10 minutes, then again dip-coated in PMAA-1 for 25 minutes and rinsed in PB twice for 25 minutes each. Then are packaged/sealed in polypropylene lens packaging shells (blisters) with 0.65 mL of the IPC-25 saline (half of the IPC-25 saline is added prior to inserting the lens). The sealed lens packages are autoclaved for about 45 minutes at about 121° C., forming SiHy contact lenses with a cross-linked hydrophilic coating (i.e., a hydrogel coating) thereon.

Characterization of Resultant Water Gradient SiHy Contact Lenses

Resultant water gradient SiHy contact lenses are tested for the following properties: lubricity by friction rating; PU; and coating intactness by Sudan Black (SB) Staining test, according to the procedures described in Example 1. WBUT are measured according to the procedures described in Example with the following modifications: the lens is removed from the test tube and placed on a pedestal submerged in PBS; the pedestal is then raised out of the PBS solution (t=0), and a video camera monitors the fluid flowing off the lens surface; when the lens surface fluid breaks, this WBUT time is recorded. Optionally, a stop watch can be used to measure the time between when the pedestal is raised out of the PBS and when the lens surface fluid breaks. The pedestal is withdrawn, pulling the lens beneath the surface of the PBS. At least 3 spots per lenses are measured, and at least 3 lenses are measured to obtain an average WBUT measurement for each lens group.

The lenses are tested directly out of package (DOOP), or after being subjected to 30 cycles of digital rubbing treatment (30 DRT), or after being subjected to Simulated Abrasion Cycling Treatment (SACT), according to the procedures described in Example 1. The results are reported in Table 14.

TABLE 14

| Lenses | Optical power (diopter) | Friction rating | PU μg/lens | SB Staining DOOP | SB Staining 30 DRT | WBUT (s) SACT |
|---|---|---|---|---|---|---|
| 21-1 | −3.00 | 0 | 0.20 ± 0.02 | no | light | 11 ± 4.2 |
| 21-1 | −12.00 | 0 | 0.14 ± 0.02 | no | light | 5 ± 2.3 |
| 21-2 | −3.00 | 0 | 0.34 ± 0.03 | no | no | 20 ± 2.4 |
| 21-2 | −12.00 | 0 | 0.25 ± 0.05 | no | no | 16 ± 4.4 |

The results in Table 14 indicate that both methods can produce water gradient SiHy contact lenses with good lubricity (a friction rating of about 0). But, a method of the invention can be used to produce water gradient contact lenses (lenses 21-2) with more durable hydrogel coating thereon, as shown by passing Sudan black staining test (no SB staining) after 30 cycles of digital rubbing treatment and by having a longer WBUT after Simulated Abrasion Cycling Treatment, compared to lenses produced by a control method.

Example 22

SBC Solution: 0.1% Sodium Bicarbonate Rinse Solution

SBC rinse solution is prepared by dissolving sodium bicarbonate in a given volume of purified water (distilled or deionized) to have the following composition: ca. 0.1 w/w % $NaHCO_3$.

Preparation of Water Gradient SiHy Contact Lenses (Lenses 22-1) (Control)

Water Gradient SiHy Contact lenses (Lenses 22-1) are prepared according to a method comprising one sole dip-coating step for forming the base coating as follows.

After de-molding, cast-molded SiHy contact lenses (prepared in Example 3) are extracted with PrOH for 180 minutes for lens extraction, dip-coated in the PMAA-1 prepared in Example 21 for about 50 min or one hour, rinsed in SBC for about 50-60 minutes, and then are packaged/sealed in polypropylene lens packaging shells (blisters) with 0.65 mL of the IPC-25 saline (half of the IPC-25 saline is added prior to inserting the lens) prepared in Example 21. The sealed lens packages are autoclaved for about 45 minutes at about 121° C., forming SiHy contact lenses with a cross-linked hydrophilic coating (i.e., a hydrogel coating) thereon.

Preparation of Water Gradient SiHy Contact Lenses (Lenses 22-2)

Water Gradient SiHy Contact lenses (Lenses 22-2) are prepared according to a method comprising at least two dip-coating steps and one saline rinsing step between each pair of dip-coating steps for forming the base coating as follows.

After de-molding, cast-molded SiHy contact lenses (prepared in Example 3) are extracted with n-propanol (nPA) for 180 minutes for lens extraction, dip-coated in the PMAA-1 prepared in Example 21 for about 25 minutes, rinsed in SBC for about 10 min, rinsed in DI H2O for 10 minutes, then again dip-coated in PMAA-1 for 25 minutes and rinsed in SBC twice for 25 minutes each. Then are packaged/sealed in polypropylene lens packaging shells (blisters) with 0.65 mL of the IPC-25 saline (half of the IPC-25 saline is added prior to inserting the lens). The sealed lens packages are autoclaved for about 45 minutes at about 121° C., forming SiHy contact lenses with a cross-linked hydrophilic coating (i.e., a hydrogel coating) thereon.

Characterization of Resultant Water Gradient SiHy Contact Lenses

Resultant water gradient SiHy contact lenses are tested for the following properties: lubricity by friction rating; PU; and coating intactness by Sudan Black (SB) Staining test, according to the procedures described in Example 1. WBUT is measured according to the procedures described in Example 21.

The lenses are tested directly out of package (DOOP), or after being subjected to 30 cycles of digital rubbing treatment (30 DRT), according to the procedures described in Example 1. The results are reported in Table 15.

TABLE 15

| Lenses | Optical power (diopter) | Friction rating | PU μg/lens | SB Staining DOOP | SB Staining 30 DRT |
|---|---|---|---|---|---|
| 22-1 | −3.00 | 0 | 0.25 ± 0.01 | no | light |
| 22-1 | −12.00 | 0 | 0.16 ± 0.03 | no | heavy |
| 22-2 | −3.00 | 0 | 0.22 ± 0.02 | no | no |
| 22-2 | −12.00 | 0 | 0.20 ± 0.02 | no | no |

The results in Table 15 indicate that both methods can produce water gradient SiHy contact lenses with good lubricity (a friction rating of about 0). But, a method of the invention can be used to produce water gradient contact lenses (lenses 22-2) with more durable hydrogel coating thereon, as shown by passing Sudan black staining test (no SB staining) after 30 cycles of digital rubbing treatment, compared to lenses produced by a control method.

Example 23

PMAA Solution (PMAA-2):

A solution of polymethacrylic acid (PMAA) is prepared by adding adequate amount of PMAA (Mn~400-600 kDa, from ProChem.) in PrOH/water (50 wt % water) mixture to have a concentration of about 0.04 wt. %. After PMAA is fully dissolved, the pH is adjusted by adding sulfuric acid to the PMAA solution to about 2. The prepared PMAA solution is filtered to remove any particulate or foreign matter.

SBC Solution: 0.1% Sodium Bicarbonate Rinse Solution

SBC rinse solution is prepared by dissolving sodium bicarbonate in a given volume of purified water (distilled or deionized) to have the following composition: ca. 0.1 w/w % $NaHCO_3$.

Preparation of Water Gradient SiHy Contact Lenses (Lenses 23-1) (Control)

Water Gradient SiHy Contact lenses (Lenses 23-1) are prepared according to a method comprising one sole dip-coating step for forming the base coating as follows.

After de-molding, cast-molded SiHy contact lenses (prepared in Example 3) are extracted with PrOH for 180 minutes for lens extraction, dip-coated in the PMAA-2 prepared above for about 50 min or one hour, rinsed in SBC for about 50-60 minutes, and then are packaged/sealed in polypropylene lens packaging shells (blisters) with 0.65 mL of the IPC-25 saline (half of the IPC-25 saline is added prior to inserting the lens). The sealed lens packages are autoclaved for about 45 minutes at about 121° C., forming SiHy contact lenses with a cross-linked hydrophilic coating (i.e., a hydrogel coating) thereon.

Preparation of Water Gradient SiHy Contact Lenses (Lenses 23-2)

Water Gradient SiHy Contact lenses (Lenses 23-2) are prepared according to a method comprising at least two dip-coating steps and one saline rinsing step between each pair of dip-coating steps for forming the base coating as follows.

After de-molding, cast-molded SiHy contact lenses (prepared in Example 3) are extracted with PrOH for 180 minutes for lens extraction, dip-coated in the PMAA-2 prepared above for about 25 minutes, rinsed in SBC for about 10 min, rinsed in DI H2O for 10 minutes, then again dip-coated in PMAA-2 for 25 minutes and rinsed in SBC twice for 25 minutes each. Then are packaged/sealed in polypropylene lens packaging shells (blisters) with 0.65 mL of the IPC-25 saline (half of the IPC-25 saline is added prior to inserting the lens). The sealed lens packages are autoclaved for about 45 minutes at about 121° C., forming SiHy contact lenses with a cross-linked hydrophilic coating (i.e., a hydrogel coating) thereon.

Characterization of Resultant Water Gradient SiHy Contact Lenses

Resultant water gradient SiHy contact lenses are tested for the following properties: lubricity by friction rating; PU; and coating intactness by Sudan Black (SB) Staining test; according to the procedures described in Example 1. WBUT is measured according to the procedures described in Example 21.

The lenses are tested directly out of package (DOOP), or after being subjected to 30 cycles of digital rubbing treatment (30 DRT), or after being subjected to Simulated Abrasion Cycling Treatment (SACT), according to the procedures described in Example 1. The results are reported in Table 16.

TABLE 16

| Lenses | Optical power (diopter) | Friction rating | PU µg/lens | SB Staining DOOP | 30 DRT | WBUT (s) SACT |
|---|---|---|---|---|---|---|
| 23-1 | −3.00 | 0 | 0.24 ± 0.07 | no | light | 15 ± 2.9 |
| 23-1 | −12.00 | 0 | 0.16 ± 0.02 | no | light | 7 ± 1.9 |
| 23-2 | −3.00 | 0 | 0.14 ± 0.05 | no | no | 17 ± 5.4 |
| 23-2 | −12.00 | 0 | 0.13 ± 0.04 | no | no | 11 ± 5.7 |

The results in Table 16 indicate that both methods can produce water gradient SiHy contact lenses with good lubricity (a friction rating of about 0). But, a method of the invention can be used to produce water gradient contact lenses (lenses 23-2) with more durable hydrogel coating thereon, as shown by passing Sudan black staining test (no SB staining) after 30 cycles of digital rubbing treatment and by having a longer WBUT after Simulated Abrasion Cycling Treatment, compared to lenses produced by a control method.

Example 24

PMAA Solution (PMAA-2):

A solution of polymethacrylic acid (PMAA) is prepared by adding adequate amount of PMAA (Mn~400-600 kDa, from ProChem.) in nPA/water (50 wt % water) mixture to have a concentration of about 0.04 wt. %. After PMAA is fully dissolved, the pH is adjusted by adding sulfuric acid to the PMAA solution to about 2. The prepared PMAA solution is filtered to remove any particulate or foreign matter.

SBC Solution: 0.1% Sodium Bicarbonate Rinse Solution

SBC rinse solution is prepared by dissolving sodium bicarbonate in a given volume of purified water (distilled or deionized) to have the following composition: ca. 0.1 w/w % NaHCO$_3$.

Preparation of Water Gradient SiHy Contact Lenses (Lenses 24-1)

Water Gradient SiHy Contact lenses (Lenses 24-1) are prepared according to a method comprising at least two dip-coating steps and one saline rinsing step between each pair of dip-coating steps for forming the base coating as follows.

After de-molding, cast-molded SiHy contact lenses (prepared in Example 3) are extracted with PrOH for 180 minutes for lens extraction, dip-coated in the PMAA-2 prepared above for about 25 minutes, rinsed in SBC for about 10 min, rinsed in DI H2O for 10 minutes, then again dip-coated in PMAA-2 for 25 minutes and rinsed in SBC twice for 25 minutes each. Then are packaged/sealed in polypropylene lens packaging shells (blisters) with 0.65 mL of the IPC-25 saline (half of the IPC-25 saline is added prior to inserting the lens) prepared in Example 21. The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing.

Water Gradient SiHy Contact Lenses (Lenses 24-2)

Water Gradient SiHy Contact lenses (Lenses 24-2) are prepared according to a method comprising at least two dip-coating steps and one saline rinsing step between each pair of dip-coating steps for forming the base coating as follows.

After de-molding, cast-molded SiHy contact lenses (prepared in Example 3) are extracted with PrOH for 180 minutes for lens extraction, dip-coated in the PMAA-2 prepared above for about 25 minutes, rinsed in SBC for about 20 min, rinsed in DI H2O for 10 minutes, then again dip-coated in PMAA-2 for 25 minutes and rinsed in SBC twice for 25 minutes each. Then are packaged/sealed in polypropylene lens packaging shells (blisters) with 0.65 mL of the IPC-25 saline (half of the IPC-25 saline is added prior to inserting the lens). The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing.

Characterization of Resultant Water Gradient SiHy Contact Lenses

Resultant water gradient SiHy contact lenses are tested for the following properties: lubricity by friction rating; PU; and coating intactness by Sudan Black (SB) Staining test, according to the procedures described in Example 1. WBUT is measured according to the procedures described in Example 21.

The lenses are tested directly out of package (DOOP), or after being subjected to 30 cycles of digital rubbing treatment (30 DRT), or after being subjected to Simulated Abrasion Cycling Treatment (SACT), according to the procedures described in Example 1. The results are reported in Table 17.

TABLE 17

| Lenses | Optical power (diopter) | Friction rating | PU μg/lens | SB Staining DOOP | 30 DRT | WBUT (s) SACT |
|---|---|---|---|---|---|---|
| 6-1 | −3.00 | 0 | 0.21 ± 0.03 | no | no | 11 ± 4.2 |
| 6-1 | −12.00 | 0 | 0.18 ± 0.03 | no | no | 5 ± 2.3 |
| 6-2 | −3.00 | 0 | 0.23 ± 0.05 | no | no | 19 ± 5.2 |
| 6-2 | −12.00 | 0 | 0.21 ± 0.05 | no | no | 17 ± 5.5 |

The results in Table 17 indicate that the duration of saline-rinsing step can affect to some extent the durability as shown by having a longer WBUT after Simulated Abrasion Cycling Test for lenses 24-2 which are produce according to a method comprising a longer saline rinsing step between two dip-coating steps.

Example 25

Preparation of Polymerizable Compositions

A lens formulation (polymerizable composition) is prepared to have the following composition (in unit parts): MSi1 (34); GA (6); NVP (40); MMA (9); EGMA (10.2); TEGDMA (0.4); AMA (0.1); Norbloc (1.8); Vazo 64 (0.5); RB 247 (0.01); and TAA (1). The formulation is prepared by adding listed components in their targeted amounts into a clean bottle, with a stir bar to mix at 600 rpm for 30 minutes at room temperature. After all the solid is dissolved, a filtration of the formulation is carried out by using 2.7 μm glass-microfiber-filter (GMF).

Cast-Molded SiHy Contact Lenses

SiHy contact lenses are cast-molded as described in Example 4.

Characterization of Uncoated SiHy Contact Lenses

The obtained SiHy contact lenses are subjected to the post-molding processes as described in Example 4 before lens characterization. The SiHy lenses have an oxygen permeability of about 93 barrers, a bulk elastic modulus of about 0.69 MPa, a water content of about 52% by weight, a WBUT of zero second, and a friction rating of 4.

SiHy Lenses with PAA Base Coating

SiHy contact lenses each with a PAA base coating thereon are prepared as described in Example 4.

Water Gradient SiHy Contact Lenses

SiHy contact lenses with a PAA base coating thereon, prepared above, are placed in polypropylene lens packaging shells (one lens per shell) with 0.55 mL or 0.65 ml of the IPC-2 saline (about half of the saline may be added prior to inserting the lens) prepared in Example 4. The blisters are then sealed with foil and autoclaved for about 45 minutes at about 121° C., forming SiHy contact lenses with a cross-linked hydrophilic coating (i.e., a hydrogel coating) thereon.

Surface Properties of Water Gradient SiHy Contact Lenses

The resultant water gradient SiHy contact lenses directly out of package are lubricious (having a friction rating of 1) and have a WBUT of more than 10 seconds, a water contact angle by sessile drop (static) of about 30 degrees, and a PU (polyquaternium-1 uptake) of about 9 μg/lens.

Example 26

PMAA Solution (PMAA-1)

A solution of polymethacrylic acid (PMAA) is prepared by adding adequate amount of PMAA (Mn~400-600 kDa, from ProChem.) in PrOH/water (50 wt % water) mixture to have a concentration of about 0.04 wt. %. After PMAA is fully dissolved, the pH is adjusted by adding formic acid to the PMAA solution to about 2. The prepared PMAA solution is filtered to remove any particulate or foreign matter.

Phosphate Buffered Solutions PB-1a, -1b and -1c

PB-1a with pH of about 7.1 and about 23 mM of phosphate salts are prepared by dissolving about 0.236% $Na_2HPO_4 \cdot 2H_2O$ and 0.134% $NaH_2PO_4 \cdot H_2O$ in water. PB-1b with pH of about 7.1 and about 11.5 mM of phosphate salts are prepared by dissolving about 0.118% $Na_2HPO_4 \cdot 2H_2O$ and 0.067% $NaH_2PO_4 \cdot H_2O$ in water. PB-1c with pH of about 7.1 and about 5.8 mM of phosphate salts are prepared by dissolving about 0.059% $Na_2HPO_4 \cdot 2H_2O$ and 0.034% $NaH_2PO_4 \cdot H_2O$ in water.

Phosphate Buffered Saline Solution (PBS-1) for IPC Saline Preparation

PBS-1 is prepared by dissolving $NaH_2PO_4 \cdot H_2O$, $Na_2HPO_4 \cdot 2H_2O$ and in a given volume of purified water (distilled or deionized) to have the following composition: ca. 0.174 w/w % $NaH_2PO_4 \cdot H_2O$, ca. 0.711 w/w/% $Na_2HPO_4 \cdot 2H_2O$, and ca. 1.920 w/w % NaCl.

IPC Saline (IPC-25)

The IPC-25 saline prepared in Example 21 is used in this example.

Water Gradient SiHy Contact Lenses

After de-molding, cast-molded SiHy contact lenses (prepared in Example 3) are extracted with PrOH for 180 minutes for lens extraction, dip-coated in the PMAA-1 prepared above for about 50 min or one hour, rinsed in nPA/water (55/45) for about 25 min rinsed with PB-1a, or PB-1b, or PB-1c prepared above for about 50-60 minutes, and then are packaged/sealed in polypropylene lens packaging shells (blisters) with 0.65 mL of the IPC-25 saline (half of the IPC-25 saline is added prior to inserting the lens). The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing.

The resultant water gradient SiHy contact lenses is fairly lubricious (having a friction rating of 0), and a PU (polyquaternium-1 uptake) of 0.35±0.03, 0.43±0.04, 0.52±0.07 μg/lens for lenses with diopter −3.00 and 0.21±0.02, 0.26±0.00, 0.52±0.07 μg/lens for lenses with diopter −12.00, when rinsed with PB-1a, PB-1b, PB-1c, respectively Example 27

Phosphate Buffered Solutions PB-2a, -2b and -2c

PB-2a with pH of about 7.5 and about 23 mM of phosphate salts are prepared by dissolving about 0.312%

$Na_2HPO_4 \cdot 2H_2O$ and 0.076% $NaH_2PO_4 \cdot H_2O$ in water. PB-2b with pH of about 7.5 and about 11.5 mM of phosphate salts are prepared by dissolving about 0.156% $Na_2HPO_4 \cdot 2H_2O$ and 0.038% $NaH_2PO_4 \cdot H_2O$ in water. PB-2c with pH of about 7.5 and about 5.8 mM of phosphate salts are prepared by dissolving about 0.078% $Na_2HPO_4 \cdot 2H_2O$ and 0.019% $NaH_2PO_4 \cdot H_2O$ in water.

Water Gradient SiHy Contact Lenses

After de-molding, cast-molded SiHy contact lenses (prepared in Example 3) are extracted with PrOH for 180 minutes for lens extraction, dip-coated in the PMAA-1 prepared in Example 26 for about 50 min or one hour, rinsed in PrOH/water (55/45) for about 25 min rinsed with PB-2a, PB-2b, PB-2c prepared above for about 50-60 minutes, and then are packaged/sealed in polypropylene lens packaging shells (blisters) with 0.65 mL of the IPC-25 saline (half of the IPC-25 saline is added prior to inserting the lens) prepared in Example 26. The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing. The resultant water gradient SiHy contact lenses is fairly lubricious (having a friction rating of 0), and a PU (polyquaternium-1 uptake) 0.24±0.13, 0.32±0.05, 0.38±0.05 µg/lens for lenses with diopter −3.00 and 0.11±0.03, 0.16±0.04, 0.18±0.01. µg/lens for lenses with diopter −12.00, when rinsed with PB-2a, PB-2b, PB-2c, respectively.

Example 28

Phosphate Buffered Solution (PB-3)

PB-3 (~23 mM, pH~7.4) is prepared ca. 0.077 w/w % $NaH_2PO_4 \cdot H_2O$, ca. 0.48 w/w/% $Na_2HPO_4 \cdot 2H_2O$ in Di-water.

Water Gradient SiHy Contact Lenses

After de-molding, cast-molded SiHy contact lenses (prepared in Example 3) are extracted with PrOH for 180 minutes for lens extraction, dip-coated in the PMAA-1 solution prepared in Example 26 for about 50 min or one hour, rinsed in PrOH/water (55 vol %/45 vol %) for about 25 min rinsed with PB-3 prepared above for about 50-60 minutes, and then are packaged/sealed in polypropylene lens packaging shells (blisters) with 0.65 mL of the IPC-25 saline (half of the IPC-25 saline is added prior to inserting the lens) prepared in Example 26. The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing. The resultant water gradient SiHy contact lenses is fairly lubricious (having a friction rating of 0), and a PU (polyquaternium-1 uptake) of 0.19±0.06 µg/lens (n=6).

Example 29

PMAA Solution (PMAA-2)

A solution of polymethacrylic acid (PMAA) is prepared by adding adequate amount of PMAA-2 (Mn~400-600 kDa, from ProChem.) in PrOH/water (60 wt % water) mixture to have a concentration of about 0.04 wt. %. After PMAA is fully dissolved, the pH is adjusted by adding formic acid to the PMAA solution to about 2. The prepared PMAA solution is filtered to remove any particulate or foreign matter.

Water Gradient SiHy Contact Lenses

After de-molding, cast-molded SiHy contact lenses (prepared in Example 3) are extracted with PrOH for 180 minutes for lens extraction, dip-coated in the PMAA-2 solution prepared above for about 50 min or one hour, rinsed in PrOH/water (60 vol %/40 vol %) for about 25 min rinsed with PB-3 prepared in Example 28 for about 50-60 minutes, and then are packaged/sealed in polypropylene lens packaging shells (blisters) with 0.65 mL of the IPC-25 saline (half of the IPC-25 saline is added prior to inserting the lens) prepared in Example 26. The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing. The resultant water gradient SiHy contact lenses is fairly lubricious (having a friction rating of 0), and a PU (polyquaternium-1 uptake) of 0.20±0.04 µg/lens (n=6).

Example 30

Phosphate Buffered Solution (PB-4, ~15 mM, PH ~8.2)

PB-4 is prepared by dissolving $NaH_2PO_4 \cdot H_2O$ and $Na_2HPO_4 \cdot 2H_2O$, in a given volume of purified water (distilled or deionized) to have the following composition: ca. 0.044 w/w % $NaH_2PO_4 \cdot H_2O$ and ca. 0.388 w/w/% $Na_2HPO_4 \cdot 2H_2O$. After fully dissolved, the pH is adjusted to 8.2 by adding Water Gradient SiHy Contact Lenses After de-molding, cast-molded SiHy contact lenses (prepared in Example 3) are extracted with PrOH for 180 minutes for lens extraction, dip-coated in the PMAA-1 solution prepared in Example 26 for about 50 min or one hour, rinsed with PB-4 prepared above for about 50-60 minutes, and then are packaged/sealed in polypropylene lens packaging shells (blisters) with 0.65 mL of the IPC-25 saline (half of the IPC-25 saline is added prior to inserting the lens) prepared in Example 26. The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing. The resultant water gradient SiHy contact lenses is fairly lubricious (having a friction rating of 0), and a PU (polyquaternium-1 uptake) of 0.13±0.05 µg/lens (n=12).

Example 31

Water Gradient SiHy Contact Lenses

After de-molding, cast-molded SiHy contact lenses (prepared in Example 3) are extracted with PrOH for 180 minutes for lens extraction, dip-coated in the PMAA-1 solution prepared in Example 26 for about 50 min or one hour, rinsed with PB-3 prepared in Example 28 for about 50-60 minutes, and then are packaged/sealed in polypropylene lens packaging shells (blisters) with 0.65 mL of the IPC-25 saline (half of the IPC-25 saline is added prior to inserting the lens) prepared in Example 26. The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing. The resultant water gradient SiHy contact lenses is fairly lubricious (having a friction rating of 0), and a PU (polyquaternium-1 uptake) of 0.38±0.04 µg/lens (n=12).

Example 32

Preparation of PMAA Solution (PMAA-3)
Same preparation procedure as shown in Example 26 except using different PMAA raw material (Mw~800 kDa from GEO Specialty Chemicals, Inc).
Phosphate Buffered Saline (PBS) for IPC Saline Preparation
Prepared using the same procedure as in Example 26.
Phosphate Buffered Solution (PB-5, 15 mM, pH 7.8)
PB-5 is prepared by dissolving $NaH_2PO_4 \cdot H_2O$ and $Na_2HPO_4 \cdot 2H_2O$, in a given volume of purified water (distilled or deionized) to have the following composition: ca. 0.028 wt/vol % $NaH_2PO_4 \cdot H_2O$ and ca. 0.231 wt/vol % $Na_2HPO_4 \cdot 2H_2O$ with final solution pH ca. 7.8.
Water Gradient SiHy Contact Lenses
After de-molding, cast-molded SiHy contact lenses (prepared in Example 3) are extracted with PrOH for 180 minutes for lens extraction, dip-coated in the PMAA-3 solution prepared above for about 50 min or one hour, rinsed in PrOH/water (55 vol %/45 vol %) for about 25 min, rinsed with PB-5 prepared above for about 50-60 minutes, and then are packaged and sealed in polypropylene lens packaging shells (blisters) with 0.65 mL of the IPC-25 saline (half of the IPC-25 saline is added prior to inserting the lens) prepared in Example 26. The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing. The resultant water gradient SiHy contact lenses is fairly lubricious (having a friction rating of 0), and a PU (polyquaternium-1 uptake) of 0.17±0.04 µg/lens (n=18).

Example 33

Water Gradient SiHy Contact Lenses
After de-molding, cast-molded SiHy contact lenses (prepared in Example 3) are extracted with PrOH for 210 minutes for lens extraction, dip-coated in the PMAA-3 solution prepared in Example 32 for about 70-80 minutes rinsed in PrOH/water (50 vol %/50 vol %) for about 25 min rinsed with PB-5 prepared in Example 32 for about 50-60 minutes, all above solutions have a temperature of 21-23° C. Lenses are then packaged/sealed in polypropylene lens packaging shells (blisters) with 0.65 mL of the IPC-25 saline (half of the IPC-25 saline is added prior to inserting the lens) prepared in Example 26. The sealed lens packages are autoclaved for about 45 minutes at about 121° C., forming SiHy contact lenses with a cross-linked hydrophilic coating (i.e., a hydrogel coating) thereon. The resultant water gradient SiHy contact lenses have a PU (polyquaternium-1 uptake) of 0.40±0.05 µg/lens (n=6).

Example 34

Water Gradient SiHy Contact Lenses
After de-molding, cast-molded SiHy contact lenses (prepared in Example 3) are extracted with PrOH for 210 minutes for lens extraction, dip-coated in the PMAA-3 solution prepared in Example 32 for about 70-80 minutes rinsed in PrOH/water (50 vol %/50 vol %) for about 25 min rinsed with PB-5 prepared in Example 32 for about 50-60 minutes, all above solutions have a temperature of 24-26° C. Lenses are then packaged/sealed in polypropylene lens packaging shells (blisters) with 0.65 mL of the IPC-25 saline (half of the IPC-25 saline is added prior to inserting the lens) prepared in Example 26. The sealed lens packages are autoclaved for about 45 minutes at about 121° C., forming SiHy contact lenses with a cross-linked hydrophilic coating (i.e., a hydrogel coating) thereon. The resultant water gradient SiHy contact lenses have a PU (polyquaternium-1 uptake) of 0.37±0.07 µg/lens (n=6).

Example 35

Water Gradient SiHy Contact Lenses
After de-molding, cast-molded SiHy contact lenses (prepared in Example 3) are extracted with PrOH for 210 minutes for lens extraction, dip-coated in the PMAA-3 solution prepared in Example 32 for about 70-80 minutes rinsed in PrOH/water (50/50) for about 25 min rinsed with PB-5 prepared in Example 32 for about 50-60 minutes, all above solutions have a temperature of 18-20° C. Lenses are then packaged/sealed in polypropylene lens packaging shells (blisters) with 0.65 mL of the IPC-25 saline (half of the IPC-25 saline is added prior to inserting the lens) prepared in Example 26. The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing. The resultant water gradient SiHy contact lenses have a PU (polyquaternium-1 uptake) of 0.33±0.07 µg/lens (n=6).

Example 36

Phosphate Buffered (PB-6)
PB-6 is prepared by dissolving $NaH_2PO_4 \cdot H_2O$ and $Na_2HPO_4 \cdot 2H_2O$, in a given volume of purified water (distilled or deionized) to have the following composition: ca. 0.041 wt/vol % $NaH_2PO_4 \cdot H_2O$ and ca. 0.214 wt/vol % $Na_2HPO_4 \cdot 2H_2O$.
Water Gradient SiHy Contact Lenses
After de-molding, cast-molded SiHy contact lenses (prepared in Example 3) are extracted with PrOH for 210 minutes for lens extraction, dip-coated in the PMAA-3 solution prepared in Example 32 for about 70-80 minutes, PrOH and PMAA solutions have a temperature of 24-26° C. Then rinsed in PrOH/water (50 vol %/50 vol %) for about 25 min and rinsed with PB-6 prepared above for about 50-60 minutes, rinse and PB solutions have a temperature of 21-23° C. Lenses are then packaged/sealed in polypropylene lens packaging shells (blisters) with 0.65 mL of the IPC-25 saline (half of the IPC-25 saline is added prior to inserting the lens) prepared in Example 26. The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing. The resultant water gradient SiHy contact lenses is fairly lubricious (having a friction rating of 0), and a PU (polyquaternium-1 uptake) of 0.46±0.09 µg/lens (n=6).

Example 37

IPC Saline (IPC-26)
Mix about 75 wt % of the MPC-containing copolymer solution prepared in Example 26, about 4 wt % PAE solution, and about 15 wt % of a phosphate salt solutions (about 0.31 wt % $NaH_2PO_4 \cdot H_2O$, 1.24 wt % $Na_2HPO_4 \cdot 2H_2O$), Adjust pH to ~7.3 by 1N NaOH. React the mixture in a water bath at 62° C. to 63° C. for 4 hours and 15 min to form water-soluble thermally-crosslinkable polymeric material (i.e., "in-package crosslinking agent) or "IPC agent"). Remove the mixture from water bath and cool down in a room temperature water bath. Dilute the mixture about 10 folds using PBS-1 prepared in Example 26 and water and adjust pH to about 7.3 as needed. The final IPC saline may also contain low concentration of peroxide (e.g. 5 ppm) and sodium citrate dihydrate (e.g. 0.07%). Filter the mixture by 0.22 μm PES sterile filter unit.

Water Gradient SiHy Contact Lenses

After de-molding, cast-molded SiHy contact lenses (prepared in Example 3) are extracted with PrOH for 210 minutes for lens extraction, dip-coated in the PMAA-3 solution prepared in Example 32 for about 70-80 minutes, PrOH and PMAA solutions have a temperature of 24-26° C. Then rinsed in PrOH/water (50/50) for about 25 min and rinsed with PB-6 prepared in Example 36 for about 50-60 minutes, rinse and PB solutions have a temperature of 21-23° C. Lenses are then packaged/sealed in polypropylene lens packaging shells (blisters) with 0.65 mL of the IPC-26 saline (half of the IPC-26 saline is added prior to inserting the lens). The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing. The resultant water gradient SiHy contact lenses is fairly lubricious (having a friction rating of 0), and a PU (polyquaternium-1 uptake) of 0.43±0.06 μg/lens (n=6).

Example 38

Water Gradient SiHy Contact Lenses

After de-molding, cast-molded SiHy contact lenses (prepared in Example 3) are extracted with PrOH for 180 minutes for lens extraction, dip-coated in the PMAA-3 solution prepared in Example 32 for about 50-60 minutes. Rinsed in PrOH/water (55 vol %/45 vol %) for about 25 min, then rinsed with PB-5 prepared in Example 32 for about 50-60 minutes. The PrOH, PMAA, and rinse solutions have a temperature of about 21-23° C., and PB solutions have a temperature of about 24-26° C. Lenses are then packaged/sealed in polypropylene lens packaging shells (blisters) with 0.65 mL of the IPC-25 saline (half of the IPC-25 saline is added prior to inserting the lens) prepared in Example 26. The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing. The resultant water gradient SiHy contact lenses is fairly lubricious (having a friction rating of 0), and a PU (polyquaternium-1 uptake) of 0.27±0.03 μg/lens (n=6).

Example 39

Water Gradient SiHy Contact Lenses

After de-molding, cast-molded SiHy contact lenses (prepared in Example 3) are extracted with PrOH for 180 minutes for lens extraction, dip-coated in the PMAA-3 solution prepared in Example 32 for about 50-60 minutes. Rinsed in PrOH/water (55/45) for about 25 min, then rinsed with PB-5 prepared in Example 32 for about 50-60 minutes. The PrOH, PMAA, and rinse solutions have a temperature of about 21-23° C., and PB solutions have a temperature of about 17-19° C. Lenses are then packaged/sealed in polypropylene lens packaging shells (blisters) with 0.65 mL of the IPC-25 saline (half of the IPC-25 saline is added prior to inserting the lens) prepared in Example 26. The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing. The resultant water gradient SiHy contact lenses is fairly lubricious (having a friction rating of 0), and a PU (polyquaternium-1 uptake) of 0.16±0.01 μg/lens (n=6).

Example 40

SBC Solution: 0.1% Sodium Bicarbonate Rinse Solution

SBC rinse solution is prepared by dissolving sodium bicarbonate in a given volume of purified water (distilled or deionized) to have the following composition: ca. 0.1 w/w % $NaHCO_3$. The final pH adjusted to 8.6 by using 5N NaOH.

Water Gradient SiHy Contact Lenses

After de-molding, cast-molded SiHy contact lenses (prepared in Example 3) are extracted with PrOH for 180 minutes for lens extraction, dip-coated in the PMAA-1 solution prepared in Example 26 for about 50 min, rinsed with SBC for about 50 minutes, and then are packaged/sealed in polypropylene lens packaging shells (blisters) with 0.65 mL of the IPC-25 saline (half of the IPC-25 saline is added prior to inserting the lens) prepared in Example 26. The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing. The resultant water gradient SiHy contact lenses is lubricious (having a friction rating of 0), and a PU (polyquaternium-1 uptake) of 0.25±0.04 μg/lens (n=6).

Example 41

Preparation of PMAA Solution (PMAA-4)

Same preparation procedure as shown in Example 26 except using PMAA is 0.02%

SBC-1 solution: 0.1% Sodium Bicarbonate Rinse Solution

SBC-1 rinse solution is prepared by dissolving sodium bicarbonate in a given volume of purified water (distilled or deionized) to have the following composition: ca. 0.1 w/w % $NaHCO_3$. The final pH adjusted to about 9 by using 5N NaOH Water Gradient SiHy Contact Lenses After de-molding, cast-molded SiHy contact lenses (prepared in Example 3) are extracted with PrOH for 180 minutes for lens extraction, dip-coated in the PMAA-4 solution prepared above for about 50 min, rinsed with SBC-1 prepared above for about 50 minutes, and then are packaged/sealed in polypropylene lens packaging shells (blisters) with 0.65 mL of the IPC-25 saline (half of the IPC-25 saline is added prior to inserting the lens) prepared in Example 26. The sealed lens packages are autoclaved for about 45 minutes at about 121° C., forming SiHy contact lenses with a cross-linked hydrophilic coating (i.e., a hydrogel coating) thereon. The coating uniformity or intactness is tested by Sudan black dye testing and the coating passed Sudan black dye testing. The resultant water gradient SiHy contact lenses is lubricious (having a friction rating of 0), and a PU (polyquaternium-1 uptake) of 0.13±0.04 µg/lens (n=3).

Example 42

Nano-indentation tests have been performed with eight different contact lenses without any hydrogel coating thereon and four water gradient SiHy contact lenses: ACUVUE 2® (uncoated non-silicone hydrogel contact lenses commercially available from Johnson & Johnson); ACUVUE® Oasys (uncoated SiHy contact lenses commercially-available from Johns & Johnson); Biofinity® (uncoated SiHy contact lenses commercially-available from CooperVision); MyDay® (Uncoated SiHy contact lenses commercially available from CooperVision); delefilcon A lenses without any surface treatment (SiHy lens bodies of DAILIES® TOTAL1® from Alcon); AIROPTIX® Night & Day® (plasma-coated SiHy contact lenses commercially available from Alcon); naturally-wettable SiHy contact lenses without any surface treatment of Example 3; uncoated SiHy contact lenses of Example 25; DAILIES® TOTAL1® (water gradient SiHy contact lenses commercially available from Alcon); water gradient SiHy contact lenses of Example 25; water gradient SiHy lenses of Example 28; and water gradient SiHy contact lenses of Example 29, according to the procedures described in Example 1. All the tested contact lenses have an optical power of -3.00 diopters. The bulk elastic modulus (E') of the commercial SiHy contact lenses are manufacturer generated data (see, Table 1 in G. Young's article in Contact Lens & Anterior Eye 33 (2010), 210-214; CooperVision's press release on Jun. 17, 2013 entitled "CooperVision Biofinity Is Fastest Growing Contact Lens Brand In The U.S."; CooperVision's press release on Jun. 25, 2015 entitled "CooperVision Introduces MyDay® Lenses in the U.S.", all of which are incorporated by reference in their entireties). The bulk elastic modulus of uncoated SiHy lenses of delefilcon A and Examples 3 and 25 and of water gradient SiHy contact lenses of Examples 25, 28 and 29, are determined according to the procedure described in Example 1.

The nano-indentation tests of Biofinity®, uncoated SiHy contact lenses of Example 3, delefilcon A lenses, DAILIES® TOTAL1®, and water gradient SiHy contact lenses of Examples 25, 28 and 29 are performed using a Piuma probe having a tip radius of 9.5 UM and a stiffness of 0.500 N/m; and the nano-indentation tests of ACUVUE 20, MyDay®, AIROPTIX® Night & Day®, ACUVUE® Oasys, and uncoated SiHy contact lenses of Example 25 are performed using a Piuma probe having a tip radius of 9.0 UM and a stiffness of 4.710 N/m.

The average indentation forces, (IF)t, at an indentation depth of 400 nm are reported in Table 18.

TABLE 18

| Contact lenses under tests | $(IF)_t$ (µN)[1] | SD[2] | E' (MPa)[3] |
|---|---|---|---|
| Contact lenses without any hydrogel coating | | | |
| ACUVUE 2 ® | 0.18 | 0.05 | 0.3 |
| Biofinity ® | 1.20 | 0.17 | 0.75 |
| Uncoated SiHy contact lenses of Example 3 | 0.82 | 0.08 | 0.62 |
| MyDay ® | 0.70 | 0.25 | 0.4 |
| AIROPTIX ® Night & Day ® | 2.80 | 0.38 | 1.5 |
| ACUVUE ® Oasys | 0.84 | 0.13 | 0.72 |
| Uncoated SiHy contact lenses of Example 25 | 0.95 | 0.40 | 0.69 |
| Uncoated delefilcon A contact lenses | 1.68 | 0.37 | 0.78 |
| Water Gradient Contact Lenses | | | |
| Water gradient SiHy contact lenses of Example 25 | 0.17 | 0.07 | 0.69 |
| DAILIES ® TOTAL1 ® | 0.39 | 0.08 | 0.78 |
| Water gradient SiHy contact lenses of Example 28 | 0.26 | 0.11 | 0.64 |
| Water gradient SiHy contact lenses of Example 29 | 0.09 | 0.01 | 0.64 |

[1] $(IF)_t$ stands for indentation force at an indentation depth of 400 nm;
[2] SD stands for standard deviation for $(IF)_t$;
[3] E' stands for bulk elastic modulus.

Figure 6:
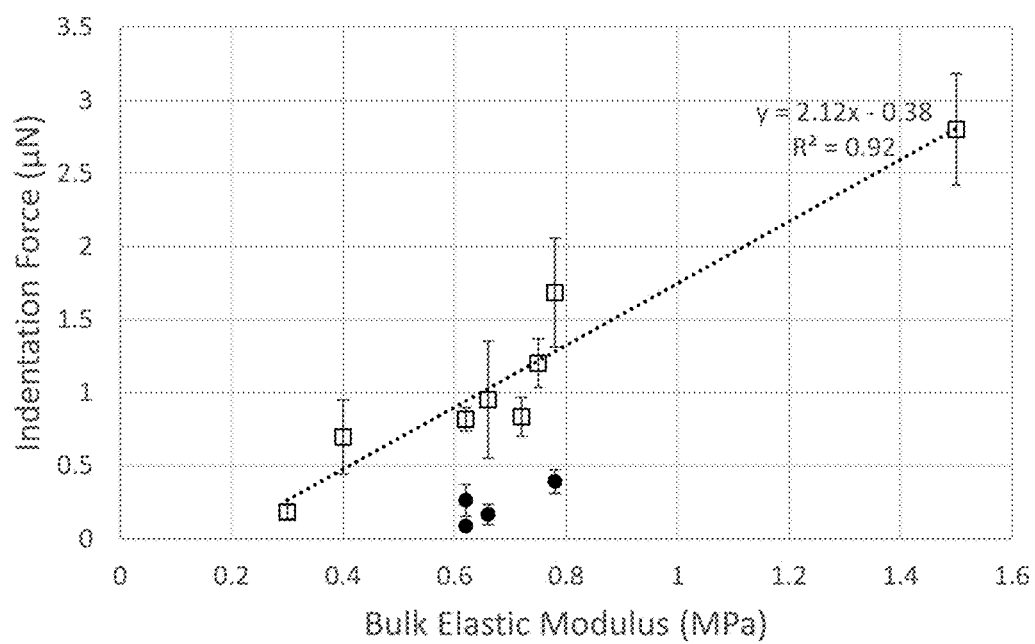
FIG. 6 shows indentation forces at an indentation depth of 400 nm as function of the bulk elastic modulus of contact lenses as measured in the nano-indentation tests of Example 42 with a nano-indentation instrument (Optics11 Puima).

FIG. 6 shows the indentation forces at an indentation depth of 400 nm (i.e., surface compression force at an indentation depth of 400 nm) as function of the bulk elastic (Young's) modulus of contact lenses. The indentation force at an indentation depth of 400 nm shows a good linear fit with the bulk elastic modulus with respect to those contact lenses without a hydrogel coating thereon. This implies that these materials all have similar Poisson's ratio. The best linear fit is Y=2.12·X−0.38, $R^2$=0.92.

However, water gradient contact lenses (each having a hydrogel coating thereon) do not follow the same trend and have indentation force values much lower than expected from the linear fit trend. Table 19 shows the values of reduction in indentation force at an indentation depth of 400 nm for water gradient contact lenses, which are calculated based on the following equation $$\Delta(IF)_{400\,nm} = 1 - \frac{(IF)_t}{2.12 \cdot E' - 0.38}$$

in which $(IF)_t$ is the measured indentation force at an indentation depth of 400 nm of the water gradient contact lens and E' is the bulk elastic modulus (E') of the water gradient contact lens.

TABLE 19

| | E' (MPa) | $(IF)_t$ | $\Delta\,(IF)_{400nm}$ |
|---|---|---|---|
| Water gradient SiHy contact lenses of Example 25 | 0.69 | 0.17 | 84% |
| DAILIES ® TOTAL1 ® | 0.78 | 0.39 | 69% |
| Water gradient SiHy contact lenses of Example 28 | 0.64 | 0.26 | 72% |
| Water gradient SiHy contact lenses of Example 29 | 0.64 | 0.09 | 91% |

These results shows that the hydrogel coatings makes a softer surface on the lens than other contact lenses without any hydrogel coating thereon, while the lens bulk maintains a high elastic modulus.

All the publications, patents, and patent application publications, which have been cited herein above in this application, are hereby incorporated by reference in their entireties.

What is claimed is:

1. A contact lens, having:
a normalized surface compression force at an indentation depth of 400 nm of about 12 µN/MPa or lower as determined in microindentation tests with a 1 mm microindentation probe;
a polyquaternium-1 uptake of about 0.40 micrograms/lens or less (or about 0.30 micrograms/lens or less); and
a water-break-up time of at least 10 seconds and/or a friction rating of about 2.0 or lower after 30 cycles of digital rubbing treatment after simulated abrasion cycling treatment,
wherein the contact lens comprises an anterior surface, an opposite posterior surface, and a layered structural configuration, wherein the layered structural configuration comprises, in a direction from the anterior surface to the posterior surface, an anterior outer hydrogel layer, an inner layer of a lens material, and a posterior outer hydrogel layer.

2. The contact lens of claim 1, wherein the contact lens has a polyquaternium-1 uptake of about 0.30 micrograms/lens or less.

3. The contact lens of claim 1, wherein the lens material is a silicone hydrogel material that comprises (i) repeating units of at least one polysiloxane vinylic monomer and/or repeating units of at least one polysiloxane vinylic crosslinker and (ii) repeating units of at least one hydrophilic vinylic monomer.

4. The contact lens of claim 2, wherein the silicone hydrogel material comprises repeating units of at least one hydrophilic N-vinyl amide monomer.

5. The contact lens of claim 2, wherein the silicone hydrogel material comprises repeating units of at least one silicone-containing vinylic monomer having a bis(trialkylsilyloxy) alkylsilyl or tris(trialkylsilyloxy) silyl group.

6. The contact lens of claim 2, wherein the silicone hydrogel material comprises repeating units of one or more blending vinylic monomers.

7. The contact lens of claim 2, wherein the silicone hydrogel material comprises repeating units of one or more non-silicone vinylic crosslinking agents.

8. The contact lens of claim 2, wherein the silicone hydrogel material has: an oxygen permeability of at least 50 barrers; and/or an equilibrium water content of from about 10% to about 70% by weight.

9. The contact lens of claim 8, wherein the silicone hydrogel material is not naturally wettable.

10. The contact lens of claim 8, wherein the silicone hydrogel material is naturally wettable.

11. The contact lens of claim 8, wherein the anterior and posterior outer hydrogel layers independent of each another are a crosslinked hydrophilic polymeric material which comprises at least 25% by mole of repeating monomeric units of at least one hydrophilic vinylic monomer selected from the group consisting of an alkyl (meth)acrylamide, N-2-dimethylaminoethyl (meth)acrylamide, dimethylaminoethyl (meth)acrylate, a hydroxyl-containing acrylic monomer, a N-vinyl amide monomer, a methylene-containing pyrrolidone monomer, a (meth)acrylate monomer having a $C_1$-$C_4$ alkoxyethoxy group, a vinyl ether monomer, an allyl ether monomer, and combinations thereof.

12. The contact lens of claim 8, wherein the anterior and posterior outer hydrogel layers independent of each another are a crosslinked hydrophilic polymeric material which comprises at least 25% by mole of repeating monomeric units of at least one phosphrylcholine-containing vinylic monomer.

13. The contact lens of claim 8, wherein the anterior and posterior outer hydrogel layers independent of each another are a crosslinked hydrophilic polymeric material which comprises poly(ethylene glycol) chains.

14. The contact lens of claim 13, wherein the poly(ethylene glycol) chains are derived from: (1) a pol (ethylene glycol) having one sole functional group of —$NH_2$, —SH or —COOH; (2) a poly(ethylene glycol) having two terminal functional groups selected from the group consisting of —$NH_2$, —COOH, —SH, and combinations thereof; (3) a multi-arm poly(ethylene glycol) having one or more functional groups selected from the group consisting of —$NH_2$, —COOH, —SH, and combinations thereof; or (4) combinations thereof.

15. The contact lens of claim 8, wherein the anterior and posterior outer hydrogel layers independent of each another are substantially free of silicone.

16. The contact lens of claim 8, wherein the contact lens further comprises two transition layers of a polymeric material, wherein each of the two transition layers is located between the inner layer and one of the anterior and posterior outer hydrogel layers.

17. The contact lens of claim 16, wherein the two transition layers merge at the peripheral edge of the contact lens to completely enclose the inner layer of the lens material.

18. The contact lens of claim 17, wherein the two transition layers have a thickness of at least about 0.05 µm when being fully hydrated.

19. The contact lens of claim 18, wherein each of the two transition layers is a layer of a polyanionic polymer which is neutralized and crosslinked by a polyaziridine which has at least two aziridine groups and a number average molecular weight of 2000 Daltons or less.

20. The contact lens of claim 19, wherein the polyanionic polymer is a carboxyl-containing polymer comprising at least 60% by mole of repeating units of one or more carboxyl-containing acrylic monomer.

21. The contact lens of claim 19, wherein the polyanionic polymer is polyacrylic acid, polymethacrylic acid, poly (ethylacrylic acid), poly(acrylic acid-co-methacrylic acid), poly[ethylacrylic acid-co-(meth)acrylic acid], poly(N,N-2-acrylamidoglycolic acid), poly[(meth)acrylic acid-co-acrylamide], poly[(meth)acrylic acid-co-vinylpyrrolidone], poly[ethylacrylic acid-co-acrylamide], poly[ethylacrylic acid-co-vinylpyrrolidone], poly[(meth)acrylic acid-co-vinylacetate], poly[ethylacrylic acid-co-vinylacetate], or combinations thereof.

22. The contact lens of claim 19, wherein the polyanionic polymer is a graft polymer which is grafted onto the inner layer, wherein the graft polymer comprises repeating units of at least one carboxyl-containing vinylic monomer.

23. The contact lens of claim 22, wherein the polyanionic polymer is a graft polymer which is grafted onto the inner layer, wherein the graft polymer comprises repeating units of at least one carboxyl-containing acrylic monomer.

24. The contact lens of claim 19, wherein the polyaziridine is trimethylolpropane tris(2-methyl-1-aziridinepropionate), pentaerythritol tris[3-(1-aziridinyl) propionate], trimethylolpropane tris(3-aziridinopropionate), a Michael reaction product of a vinylic crosslinker having at least two (meth)acryloyl groups with 2-methylaziridine or aziridine, or a combination thereof.

\* \* \* \* \*